United States Patent
Tanaka et al.

(10) Patent No.: US 9,623,705 B2
(45) Date of Patent: *Apr. 18, 2017

(54) METHOD FOR PRODUCING MODIFIED CONJUGATED DIENE POLYMER/COPOLYMER, MODIFIED CONJUGATED DIENE POLYMER/COPOLYMER, AND RUBBER COMPOSITION AND TIRE USING THE SAME

(75) Inventors: Ken Tanaka, Tokyo (JP); Noriko Mori, Tokyo (JP); Yuki Itoh, Tokyo (JP); Yoichi Ozawa, Tokyo (JP); Ryuji Nakagawa, Tokyo (JP); Junko Matsushita, Tokyo (JP); Shigeaki Matsuo, Tokyo (JP); Kouji Masaki, Tokyo (JP); Fumihiro Shiraishi, Tokyo (JP); Fuminori Oota, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 12/921,448

(22) PCT Filed: Mar. 10, 2009

(86) PCT No.: PCT/JP2009/054554
§ 371 (c)(1),
(2), (4) Date: Mar. 14, 2011

(87) PCT Pub. No.: WO2009/113546
PCT Pub. Date: Sep. 17, 2009

(65) Prior Publication Data
US 2011/0146877 A1 Jun. 23, 2011

(30) Foreign Application Priority Data

Mar. 10, 2008 (JP) ................ 2008-060255
Mar. 10, 2008 (JP) ................ 2008-060256
Mar. 10, 2008 (JP) ................ 2008-060257
Mar. 9, 2009 (JP) ................ 2009-055465

(51) Int. Cl.
C08C 19/22 (2006.01)
C08C 19/25 (2006.01)
C08C 19/44 (2006.01)
C08K 5/544 (2006.01)
B60C 1/00 (2006.01)
(Continued)

(52) U.S. Cl.
CPC ............... B60C 1/00 (2013.01); C08C 19/00 (2013.01); C08C 19/44 (2013.01); C08F 8/42 (2013.01); C08L 7/00 (2013.01); C08L 9/00 (2013.01); C08L 15/00 (2013.01); C08L 21/00 (2013.01); C08C 19/22 (2013.01); C08C 19/25 (2013.01); C08K 3/0033 (2013.01); C08K 5/0091 (2013.01); C08K 5/057 (2013.01); C08K 5/098 (2013.01); C08K 5/544 (2013.01); C08K 5/5415 (2013.01); Y10T 152/10846 (2015.01)

(58) Field of Classification Search
CPC ......... C08C 19/44; C08C 19/20; C08C 19/22; C08C 19/24; C08C 19/25; C08C 19/30; C08C 19/00; B60C 1/00; C08L 15/00; C08L 9/00; C08F 8/42; C08K 5/5415; C08K 5/544
USPC ......... 525/331.9, 332.9, 342, 374, 379, 380; 152/547, 564, 525
See application file for complete search history.

(56) References Cited

U.S. PATENT DOCUMENTS

2003/0015272 A1 1/2003 Teratani et al.
2004/0254301 A1* 12/2004 Tsukimawashi et al. ..... 525/271
(Continued)

FOREIGN PATENT DOCUMENTS

EP 1 245 585 A2 10/2002
EP 1 297 974 A1 4/2003
(Continued)

OTHER PUBLICATIONS

European Search Report, dated Apr. 5, 2012, in European Patent Application No. 09719692.7.

Primary Examiner — Roberto Rabago
(74) Attorney, Agent, or Firm — Sughrue Mion, PLLC

(57) ABSTRACT

The invention provides a method for producing a modified conjugated diene (co)polymer, the method including comprising: a modification reaction step including causing an organic silane compound to react with a conjugated diene (co)polymer having an active site at the active site, the organic silane compound having a characteristic group for forming a silanol group through hydrolysis and, in the vicinity of the characteristic group, (i) a functional group which binds the organic silane compound to the conjugated diene (co)polymer via addition to or substitution at the active site and which promotes reaction between the silanol group and a reinforcing filler after the addition or substitution reaction, or (ii) a functional group which promotes reaction between the silanol group and a reinforcing filler, and a hydrolyzation step performed after the modification reaction step; a modified conjugated diene (co)polymer having, at a molecular end of the conjugated diene (co) polymer, a silanol group, and a functional group in the vicinity of the silanol group, the functional group accelerating reaction between the silanol group and the reinforcing filler; a rubber composition containing the (co)polymer and carbon black having specific characteristics; and a tire formed from the rubber composition.

17 Claims, 1 Drawing Sheet

(51) Int. Cl.
  C08C 19/00 (2006.01)
  C08F 8/42 (2006.01)
  C08L 7/00 (2006.01)
  C08L 9/00 (2006.01)
  C08L 15/00 (2006.01)
  C08L 21/00 (2006.01)
  *C08K 5/5415* (2006.01)
  *C08K 3/00* (2006.01)
  *C08K 5/00* (2006.01)
  *C08K 5/057* (2006.01)
  *C08K 5/098* (2006.01)

(56) References Cited

U.S. PATENT DOCUMENTS

| | | |
|---|---|---|
| 2005/0159554 A1 | 7/2005 | Endou et al. |
| 2006/0247365 A1 | 11/2006 | Hochi |
| 2007/0265397 A1 | 11/2007 | Shibata et al. |
| 2009/0163668 A1 | 6/2009 | Yamada et al. |
| 2009/0272484 A1* | 11/2009 | Seevers et al. .............. 156/118 |
| 2010/0222502 A1 | 9/2010 | Tanaka et al. |
| 2011/0146877 A1 | 6/2011 | Tanaka et al. |
| 2012/0091620 A1* | 4/2012 | Mahabir ................... 264/209.1 |

FOREIGN PATENT DOCUMENTS

| | | |
|---|---|---|
| EP | 1 457 501 A1 | 9/2004 |
| EP | 1 479 698 A1 | 11/2004 |
| EP | 1 505 087 A1 | 2/2005 |
| EP | 1 535 762 A1 | 6/2005 |
| EP | 1 726 598 A1 | 11/2006 |
| EP | 1 860 136 A1 | 11/2007 |
| EP | 1 873 168 A1 | 1/2008 |
| JP | 63-186748 A | 8/1988 |
| JP | 06-057767 A | 3/1994 |
| JP | 11-310019 A | 11/1999 |
| JP | 2002-103912 A | 4/2002 |
| JP | 2004-067987 A | 3/2004 |
| JP | 2004-168903 A | 6/2004 |
| JP | 2004-168904 A | 6/2004 |
| JP | 2006169381 A | 6/2006 |
| JP | 2008-208376 A | 9/2008 |
| JP | 5473360 B2 | 4/2014 |
| WO | 01/34658 A1 | 5/2001 |
| WO | WO 2006/058599 A1 * | 6/2006 |
| WO | 2007/034785 A1 | 3/2007 |
| WO | 2007/040252 A1 | 4/2007 |
| WO | 2009113546 A1 | 9/2009 |

\* cited by examiner

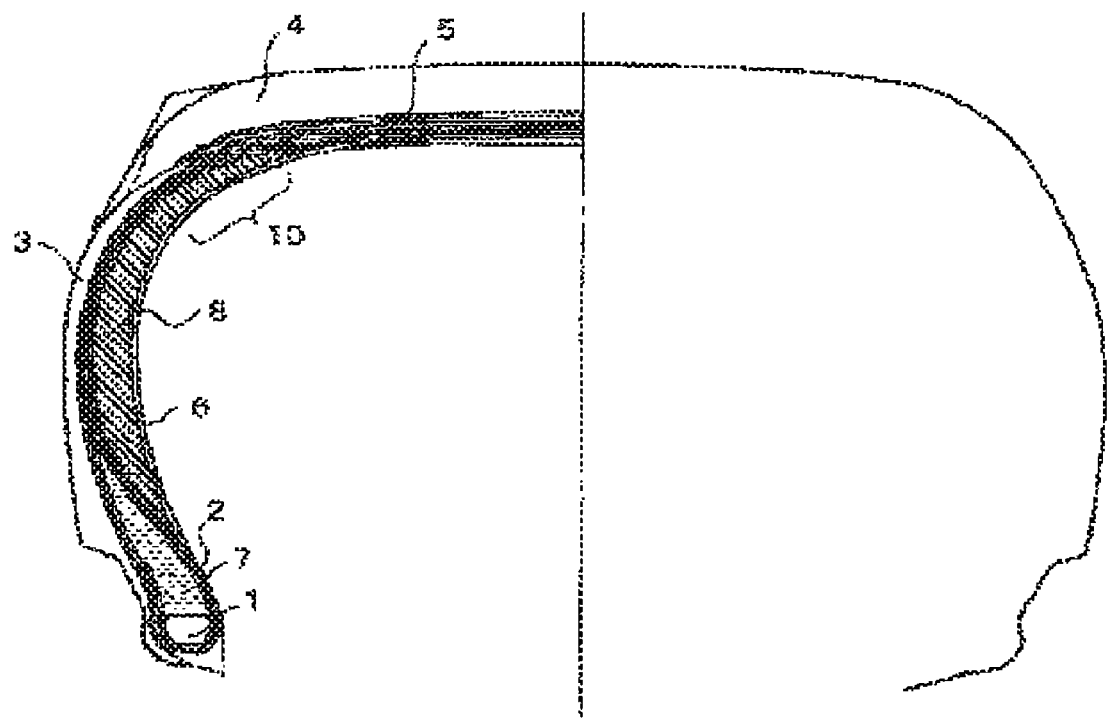

METHOD FOR PRODUCING MODIFIED CONJUGATED DIENE POLYMER/COPOLYMER, MODIFIED CONJUGATED DIENE POLYMER/COPOLYMER, AND RUBBER COMPOSITION AND TIRE USING THE SAME

TECHNICAL FIELD

The present invention relates to a method for producing a modified conjugated diene (co)polymer, to a modified conjugated diene (co)polymer, to a rubber composition containing the (co)polymer, and to a tire produced from the rubber composition.

BACKGROUND ART

In recent years, social demand with respect to energy conservation and resource saving has increased. In order to reduce fuel consumption of automobiles, demand has arisen for various rubber materials having low-loss performance and breakage resistance for providing tires of high durability.

One generally employed technique for improving rolling resistance of a tire is use of a low-heat-buildup rubber composition. In order to attain this performance, use of a modified polymer into which a functional group having interaction with a filler has been incorporated is very effective means.

When a technique for improving the rolling resistance of tire based on reduction of the amount of reinforcing filler is employed, durability of the tire is unavoidably impaired. However, it has already been known that both low-loss performance and durability can be attained by incorporating a modification group into the polymer to be employed. The interaction between the reinforcing filler and the polymer is known to vary depending on the type of the modification functional group to be incorporated into the polymer, and the performance of the tire produced therefrom is also known to vary.

Hitherto, in order to produce such a low-heat-buildup rubber composition, a variety of modified rubbers containing silica or carbon black serving as a filler have been developed. Among the techniques for producing such modified rubbers, there have been proposed particularly effective approaches in which the polymerization active site of a conjugated diene (co)polymer produced through anionic polymerization in the presence of an organic lithium is modified with an alkoxysilane derivative having a functional group interacting with a filler (see, for example, Patent Document 1 or 2).

When a reinforcing filler is incorporated into a rubber composition employing the modified polymer produced through the aforementioned method, heat-buildup-suppressing performance is obtained. However, in this case, a volatile organic compound (VOC); i.e., a volatile alcohol, is released from alkoxysilane contained in the modified conjugated diene (co)polymer during kneading, hot-rolling, or extrusion of an unvulcanized rubber composition, thereby generating air bubbles in an extrusion product of the unvulcanized rubber composition, resulting in a drop in processability (workability of unvulcanized rubber composition), which is problematic. In addition, the volatile organic compound (VOC) is not preferred in the working environment.

Studies conducted by the present inventors previously revealed that a modified polymer having a primary amino group exhibits high interaction with carbon black and provides a rubber composition having excellent low-loss performance. Regarding incorporation of the primary amino group into a polymer, for example, Patent Document 3 discloses a rubber ingredient containing a conjugated diene polymer having a primary amino group and an alkoxysilyl group, and a rubber composition containing carbon black having an $N_2SA$ of 30 to 100 $m^2/g$.

However, when the above technique is employed, alkoxysilyl groups remaining in the polymer might be released as alcoholic matter to the atmosphere during polymer blending, which is also problematic.

Meanwhile, in recent tires, particularly run-flat tires, there is provided a side-reinforcing layer formed of a rubber composition or a composite of a rubber composition and fiber or the like in order to enhance the toughness of the conventional sidewall part (see, for example, Patent Document 4).

When a tire is in a running state under reduced internal pressure thereof due to blowout or the like (i.e., run-flat running state), the sidewall and the bead filler of the tire considerably deform and generate heat. In the progress of heat generation, the temperature is elevated to 200° C. or higher in some cases.

Under such circumstances, even a tire having a side-reinforcing layer is broken due to a load exceeding the breakage limit of the side-reinforcing layer and the bead filler.

One technique for prolonging the time before such breakage occurs includes incorporating a large amount of sulfur into a rubber composition for forming a side-reinforcing layer or a bead filler, to thereby elevate elasticity of the rubber composition and suppress deformation of the sidewall part and the bead filler of the tire. However, when the technique is employed, the rolling resistance of the tire under normal running conditions increases, problematically elevating fuel consumption.

Patent Document 5 discloses that a side-reinforcing layer and a bead filler of a tire are formed from a rubber composition comprising a variety of modified conjugated diene-aromatic vinyl copolymers and a heat-resistance-improver.

Patent Document 6 discloses that a side-reinforcing layer and a bead filler of a tire are formed from a rubber composition comprising a specific conjugated diene-based copolymer and a phenolic resin.

All these techniques are developed for the purpose of increasing elastic modulus of the rubber composition for forming the side-reinforcing layer and the bead filler and preventing the elastic modulus from decreasing at high temperature. Therefore, the durability of run-flat tires is remarkably improved, but rolling resistance under normal running conditions is considerably impaired.

Thus, there is demand for a rubber composition which exhibits excellent heat-buildup-suppression performance, which can enhance both durability in running after blowing out as well as low rolling resistance under ordinary running conditions, and which is suitable for forming a side-reinforcing layer and a bead filler.

Patent Document 1: Japanese Patent Publication (kokoku) No. Hei 6-57767
Patent Document 2: WO 03/029299, pamphlet
Patent Document 3: Japanese Patent Application Laid-Open (kokai) No. 2006-307095

Patent Document 4: Japanese Patent Application Laid-Open (kokai) No. Hei 11-310019
Patent Document 5: WO 02/02356, pamphlet
Patent Document 6: Japanese Patent Application Laid-Open (kokai) No. 2004-74960

DISCLOSURE OF THE INVENTION

Problems to be Solved by the Invention

Under such circumstances, an object of the present invention is to provide a modified conjugated diene (co)polymer having remarkable heat-buildup-suppressing property and generating a minimized amount of volatile organic compounds (VOC), as well as a method for producing the same. Another object of the invention is to provide a rubber composition comprising the modified conjugated diene (co)polymer, and a tire formed from the rubber composition, particularly, a tire which can provide enhanced durability in running after blowing out as well as improved rolling resistance under ordinary running conditions.

Means for Solving the Problems

In order to attain the aforementioned objects, the present inventors have conducted extensive studies, and have found that a modified conjugated diene (co)polymer which generates a minimized amount of volatile organic compounds (VOC) can be produced by providing a specific hydrolyzation step and, preferably, an additional condensation reaction step, in reaction steps to produce the modified conjugated diene (co)polymer. The inventors have also found that when a tire is formed from a rubber composition containing the aforementioned modified conjugated diene (co)polymer, a tire having desired performance can be produced. The present invention has been accomplished on the basis of these findings.

Accordingly, the present invention provides the following.

1. A method for producing a modified conjugated diene (co)polymer, the method comprising:

a modification reaction step including causing an organic silane compound to react with a conjugated diene (co)polymer having an active site at the active site, the organic silane compound having a characteristic group for forming a silanol group through hydrolysis and, in the vicinity of the characteristic group, (i) a functional group which binds the organic silane compound to the conjugated diene (co)polymer via addition to or substitution at the active site and which promotes reaction between the silanol group and a reinforcing filler after the addition or substitution reaction, or (ii) a functional group which promotes reaction between the silanol group and a reinforcing filler, and a hydrolyzation step performed after the modification reaction step.

2. A method for producing a modified conjugated diene (co)polymer as described in 1 above, wherein the characteristic group for forming a silanol group through hydrolysis is an alkoxysilane group, and 100 or more in number of the alkoxysilane groups form silanol groups through hydrolysis.

3. A method for producing a modified conjugated diene (co)polymer as described in 1 or 2 above, wherein the organic silane compound is an organic silane compound represented by formula (1):

[F1]

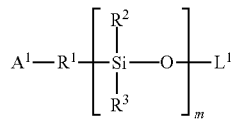

(wherein $R^1$ represents a single bond or a C1 to C20 divalent hydrocarbon group; each of $R^2$ and $R^3$ represents a hydrogen atom or a C1 to C20 monovelant hydrocarbon group; —$OL^1$ represents a hydrolyzable functional group which forms a silanol group with Si through hydrolysis; $A^1$ represents a functional group which binds the organic silane compound to the conjugated diene (co)polymer via addition to or substitution at the active site and which promotes reaction between the silanol group and the reinforcing filler after the addition or substitution reaction; and m is an integer of 1 to 10) or an organic silane compound represented by formula (2):

[F2]

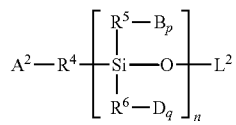

(wherein $R^4$ represents a single bond or a C1 to C20 hydrocarbon group; each of $R^5$ and $R^6$ represents a single bond, a hydrogen atom, or a C1 to C20 hydrocarbon group; -$OL^2$ represents a hydrolyzable functional group which forms a silanol group with Si through hydrolysis; $A^2$ represents a functional group which reacts with the active site or a functional group which binds the organic silane compound to the conjugated diene (co)polymer via addition to or substitution at the active site; each of B and D represents a group containing at least one functional group which promotes reaction between the silanol group and the reinforcing filler; each of p and q is an integer of 0 to 5; (p+q) is 1 or more; and n is an integer of 1 to 10).

4. A modified conjugated diene (co)polymer having, at a molecular end of the conjugated diene (co)polymer, a silanol group, and a functional group in the vicinity of the silanol group, the functional group accelerating reaction between the silanol group and the reinforcing filler.

5. A modified conjugated diene (co)polymer represented by formula (3):

[F3]

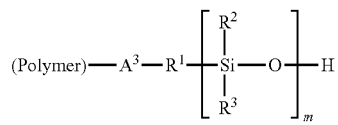

(wherein $R^1$ represents a single bond or a C1 to C20 divalent hydrocarbon group; each of $R^2$ and $R^3$ represents a hydrogen atom or a C1 to C20 monovelant hydrocarbon group; $A^3$ represents a functional group which promotes reaction between a silanol group and a reinforcing filler; and m is an integer of 1 to 10) or a modified conjugated diene (co)polymer represented by formula (4):

[F4]

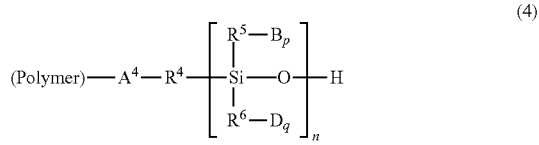

(4)

(wherein $R^4$ represents a single bond or a C1 to C20 hydrocarbon group; each of $R^5$ and $R^6$ represents a single bond, a hydrogen atom, or a C1 to C20 hydrocarbon group; $A^4$ represents a single bond, a C1 to C20 hydrocarbon group, or a functional group which promotes reaction between a silanol group and a reinforcing filler; each of B and D represents a group containing at least one functional group which promotes reaction between the silanol group and the reinforcing filler; each of p and q is an integer of 0 to 5; (p+q) is 1 or more; and n is an integer of 1 to 10).

6. A rubber composition comprising a modified conjugated diene (co)polymer as recited in 4 or 5 above.

7. A rubber composition comprising 100 parts by mass of a rubber ingredient containing a modified conjugated diene (co)polymer as recited in 4 or 5 above in an amount of 10 to 100 mass % and a diene-based rubber in an amount of 90 to 0 mass %, and 10 to 200 parts by mass of a reinforcing filler.

8. A pneumatic tire formed from a rubber composition as recited in 6 or 7 above.

9. A rubber composition comprising 100 parts by mass of a rubber ingredient containing a modified conjugated diene (co)polymer as recited in 4 or 5 above, and 10 to 100 parts by mass of (B) carbon black having a nitrogen adsorption specific surface area ($N_2SA$) of 20 to 100 m²/g.

10. A rubber composition as described in 9 above, wherein the modified conjugated diene (co)polymer (A) is a modified conjugated diene-based polymer (a-1) having a structure represented by formula (11):

[F5]

(11)

(wherein $R^{21}$ represents a C1 to C20 hydrocarbyl group and $R^{22}$ represents a C1 to C12 alkylene group) and/or a modified conjugated diene-based polymer (a-2) having a structure represented by formula (12):

[F6]

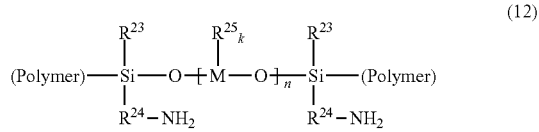

(12)

(wherein $R^{23}$ represents a C1 to C20 hydrocarbyl group; $R^{24}$ represents a C1 to C12 alkylene group; $R^{25}$ represents a C1 to C20 hydrocarbyl group, a C2 to C20 hydrocarbylcarboxyl group, a —OH group, or a C5 to C20 1,3-dicarbonyl-containing group; when a plurality of $R^{25}$ are present, they may be identical to or different from one another; M represents Ti, Sn, Al, Si, or Bi; k is (valence of M)–2; and n is 0 or 1).

11. A rubber composition as described in 9 above, wherein the modified conjugated diene (co)polymer (A) is a modified conjugated diene-based polymer (a-1) having an end structure represented by formula (11):

[F7]

(11)

(wherein $R^{21}$ represents a C1 to C20 hydrocarbyl group and $R^{22}$ represents a C1 to C12 alkylene group), which is produced by causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end for modification and, subsequently performing hydrolysis reaction and deprotection reaction.

12. A rubber composition as described in 9 above, wherein the modified conjugated diene (co)polymer (A) is a modified conjugated diene-based polymer (a-2) represented by formula (12):

[F8]

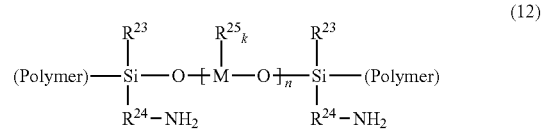

(12)

(wherein $R^{23}$ represents a C1 to C20 hydrocarbyl group; $R^{24}$ represents a C1 to C12 alkylene group; $R^{25}$ represents a C1 to C20 hydrocarbyl group, a C2 to C20 hydrocarbylcarboxyl group, a —OH group, or a C5 to C20 1,3-dicarbonyl-containing group; when a plurality of $R^{25}$ are present, they may be identical to or different from one another; M represents Ti, Sn, Al, Si, or Bi; k is (valence of M)–2; and n is 0 or 1), which is produced by performing (a) a modification step of causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end; (b) a condensation reaction step of performing condensation reaction involving the compound containing a bi-functional silicon atom in the presence of at least one condensation-accelerating agent selected from among a titanium-containing agent, a tin-containing agent, an aluminum-containing agent, a silicon-containing agent, a zirconium-containing agent, and a bismuth-containing agent; and (c) a step of performing hydrolysis reaction and deprotection reaction.

13. A tire formed from a rubber composition as recited in any of 9 to 12 above.

14. A tire comprising a bead core, a carcass layer, a tread rubber layer, an inner liner, a side-reinforcing layer, and a bead filler, wherein the side-reinforcing layer and/or the bead filler is formed from a rubber composition comprising 100 parts by mass of a rubber ingredient containing 10 mass % or more of a modified conjugated diene (co)polymer as recited in 4 or 5 above, and 10 to 100 parts by mass of carbon black having a nitrogen adsorption specific surface area of 20 to 90 m$^2$/g.

15. A tire as described in 14 above, wherein the modified conjugated diene (co)polymer is produced through modification reaction between an end of a conjugated diene-based polymer and a primary amino group or an alkoxysilane compound containing a precursor that can form a primary amino group through hydrolysis, to thereby incorporate into the end the primary amino group or the precursor that can form a primary amino group through hydrolysis; and adding a condensation-accelerating agent to the modification reaction system in the course of and/or after the modification reaction.

16. A tire as described in 14 or 15 above, wherein the rubber composition comprises the rubber ingredient in an amount of 100 parts by mass and sulfur in an amount of 1 to 10 parts by mass.

Effects of the Invention

The present invention enables provision of a method for producing a modified conjugated diene (co)polymer having remarkable heat-buildup-suppressing property and generating minimized amount of volatile organic compounds (VOC); a modified conjugated diene (co)polymer having such properties; a rubber composition comprising the modified conjugated diene (co)polymer; and a tire formed from the rubber composition, particularly, a tire which can provide enhanced durability in running after blowing out as well as improved rolling resistance under ordinary running conditions.

BRIEF DESCRIPTION OF THE DRAWINGS

FIG. 1 A schematic cross-sectional view of an embodiment of the tire of the present invention.

BEST MODES FOR CARRYING OUT THE INVENTION

The method of the present invention for producing a modified conjugated diene (co)polymer will be described in detail.

[Method for Producing a Modified Conjugated Diene (Co) Polymer]

The method of the present invention for producing a modified conjugated diene (co)polymer is characterized by comprising a modification reaction step including causing an organic silane compound to react with a conjugated diene (co)polymer having an active site at the active site, the organic silane compound having a characteristic group for forming a silanol group through hydrolysis and, in the vicinity of the characteristic group, (i) a functional group which binds the organic silane compound to the conjugated diene (co)polymer via addition to or substitution at the active site and which promotes reaction between the silanol group and a reinforcing filler after the addition or substitution reaction or (ii) a functional group which promotes reaction between the silanol group and a reinforcing filler; a hydrolyzation step performed after the modification reaction step; and preferably, a condensation reaction step of performing condensation reaction in the presence of a condensation-accelerating agent. Through performing these steps, an molecular chain end of the modified conjugated diene (co)polymer of the present invention is imparted with a silanol group.

In the present invention, the aforementioned characteristic group for forming a silanol group through hydrolysis is preferably an alkoxysilane group which forms a silanol group through hydrolysis, and 100 or more in number of the alkoxysilane groups form silanol groups, from the viewpoint of attaining the effects of the present invention.

In the present invention, the term "conjugated diene (co)polymer" encompasses a conjugated diene polymer and a conjugated diene copolymer.

The characteristic group for forming a silanol group through hydrolysis must form a silanol group when reacted with a reinforcing filler, particularly silica. When the characteristic group is a silanol group before hydrolysis, the group has high reactivity to silica. In this case, dispersibility of silica in the rubber composition and the heat-buildup-property property of the rubber composition are enhanced, which is very advantageous. Furthermore, when the characteristic group for forming a silanol group through hydrolysis is an alkoxy group, the alkoxy group generates volatile organic compounds (VOC, particularly alcohol). However, when the group has been converted to a silanol group, no VOC is generated, which is preferred under working circumstances.

As used herein, the expression "a functional group is present in the vicinity of the characteristic group that forms a silanol group in an organic silane compound" refers to the functional group is present in the organic silane compound preferably within a distance from the characteristic group equivalent to 1 to 20 carbon atoms (silicon atom(s) may intervene), more preferably 1 to 15 carbon atoms (silicon atom(s) may intervene), still more preferably 1 to 12 carbon atoms (silicon atom(s) may intervene), particularly preferably 1 to 10 carbon atoms (silicon atom(s) may intervene), yet more preferably 1 to 5 carbon atoms (silicon atom(s) may intervene).

The same is applied to the term "vicinity" of "a functional group in the vicinity of the silanol group."

The organic silane compound having a characteristic group for forming a silanol group through hydrolysis and, in the vicinity of the characteristic group, (i) a functional group which binds the organic silane compound to the conjugated diene (co)polymer via addition to or substitution at the active site and which promotes reaction between the silanol group and a reinforcing filler after the addition or substitution reaction or (ii) a functional group which promotes reaction between the silanol group and a reinforcing filler is preferably an organic silane compound represented by formula (1):

[F9]

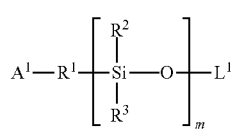

(1)

(wherein $R^1$ represents a single bond or a C1 to C20 divalent hydrocarbon group; each of $R^2$ and $R^3$ represents a hydrogen atom or a C1 to C20 monovelant hydrocarbon group; —$OL^1$ represents a hydrolyzable functional group which forms a silanol group with Si through hydrolysis; $A^1$ represents a functional group which binds the organic silane compound to the conjugated diene (co)polymer via addition to or substitution at the active site and which promotes reaction between the silanol group and the reinforcing filler after the addition or substitution reaction; and m is an integer of 1 to 10). Notably, the expression "$R^1$ represents a single bond" refers to, of formula (1), the state that $A^1$ and Si are directly bonded via a single bond in formula (1) bonded. The same is applied to $R^4$, $R^5$, $R^6$, and $A^4$. Alternatively, the organic silane compound is preferably an organic silane compound represented by formula (2):

[F10]

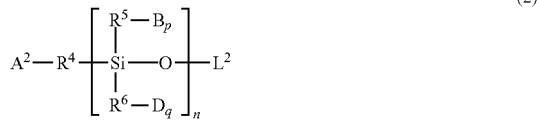

(2)

(wherein $R^4$ represents a single bond or a C1 to C20 hydrocarbon group; each of $R^5$ and $R^6$ represents a single bond, a hydrogen atom, or a C1 to C20 hydrocarbon group; —$OL^2$ represents a hydrolyzable functional group which forms a silanol group with Si through hydrolysis; $A^2$ represents a functional group which reacts with the active site or a functional group which binds the organic silane compound to the conjugated diene (co)polymer via addition to or substitution at the active site; each of B and D represents a group containing at least one functional group which promotes reaction between the silanol group and the reinforcing filler; each of p and q is an integer of 0 to 5; (p+q) is 1 or more; and n is an integer of 1 to 10).

Examples of preferred hydrolyzable functional groups for forming a silanol group with Si through hydrolysis include a C1 to C20 alkoxy group, a phenoxy group, a benzyloxy group, and —$OM_{(1/x)}$. Among them, a C1 to C20 alkoxy group is preferred, with a C1 to C12 alkoxy group being particularly preferred. Specific examples of the C1 to C20 alkoxy group include methoxy, ethoxy, propoxy, isopropoxy, n-butoxy, and tert-butoxy.

In the aforementioned formula —$OM_{(1/x)}$, M is a metal atom selected from among a Group 1 element (excluding hydrogen; i.e., alkali metal); a Group 2 to Group 12 element; a Group 13 element (excluding boron); a Group 14 element (excluding carbon and silicon); a Group 15 element (excluding nitrogen, phosphorus, and arsenic); and a rare earth element. x represents the valency of the metal atom. The Group 2 element includes Be, Mg, and alkaline earth metals. Among these metal atoms, alkali metals, Mg, alkaline earth metals, Sn, Al, Ti, and Fe are more preferred, with Li, Na, K, Mg, Ca, Ba, Sn, Al, Ti, and Fe are particularly preferred.

In the aforementioned formula (1), the functional group $A^1$ serves as a functional group which binds the organic silane compound to the conjugated diene (co)polymer via addition to or substitution at the active site and which promotes reaction between the silanol group and a reinforcing filler after the addition or substitution reaction. Examples of the functional group $A^1$ include a (thio)epoxy group (including a glycidoxy group), a (thio)isocyanato group, a nitrile group (cyano group), a pyridyl group, an N-alkylpyrrolidonyl group, an N-alkylimidazolyl group, an N-alkylpyrazolyl, a (thio)ketone group, a (thio)aldehyde group, an imine residue, an amido group, a ketimine group, an isocyanuric acid triester residue, a C1 to C20 (thio)carboxylic acid hydrocarbyl ester residue, a C1 to C20 (thio)carboxylic acid metallic salt residue, a C1 to C20 carboxylic anhydride residue, a C1 to C20 carboxyl halide residue, and a carbonic acid dihydrocarbyl ester residue. The halogen atom in the a C1 to C20 carboxyl halide residue is preferably chlorine, bromine, or fluorine. The C1 to C20 carboxylic anhydride residue is preferably a maleic anhydride residue, a phthalic anhydride residue, or an acetic anhydride residue. Each of these groups or residues is bonded to the active site of the conjugated diene (co) polymer and promotes reaction with silica.

In the aforementioned formula (2), the functional group $A^2$ serves as a functional group which reacts with the active site or a functional group which binds the organic silane compound to the conjugated diene (co)polymer via addition to or substitution at the active site. Examples of the functional group $A^2$ include functional groups represented by the following formula (2-a):

$$-R^d SiX_3 \qquad (2\text{-a})$$

(wherein $R^d$ represents a single bond, a C1 to C10 substituted or non-substituted alkylene group, or —$OR^e$ ($R^e$ represents a C1 to C10 substituted or non-substituted alkylene); X represents a halogen atom or a C1 to C10 alkoxy group; and a plurality of Xs may be identical to or different from one another), a (thio)epoxy group, a (thio)isocyanato group, a nitrile group, an imidazolyl group, a ketimine group, a (thio)ketone group, and a protected primary or secondary amino group.

In the method of the present invention for producing a modified conjugated diene (co)polymer, the functional group $A^2$ which reacts with the active site of the conjugated diene (co)polymer refers to a functional group $A^2$ which can chemically react with the active site. Examples of preferred such functional groups $A^2$ include a C1 to C20 alkoxy group, a phenoxy group, a benzyloxy group, and a halogen group. Among them, a C1 to C20 alkoxy group is more preferred, with a C1 to C12 alkoxy group being particularly preferred. Specific examples of the C1 to C20 alkoxy group include methoxy, ethoxy, propoxy, isopropoxy, n-butoxy, and tert-butoxy. The halogen is preferably chlorine, bromine, or fluorine.

In the aforementioned formula (2), examples of B and D each containing at least one functional group which promotes reaction between the silanol group and the reinforcing filler include a primary amino group, a secondary amino group, a protected primary or secondary amino group, a tertiary amino group, a cyclic amino group, an oxazolyl group, an imidazolyl group, an aziridinyl group, a (thio) ketone group, a (thio)aldehyde group, an amido group, a (thio)epoxy group (including a glycidoxy group), a (thio) isocyanato group, a nitrile group (cyano group), a pyridyl group, an N-alkylpyrrolidonyl group, an N-alkylimidazolyl group, an N-alkylpyrazolyl group, an imino group, an amido group, a ketimine group, an imine residue, an isocyanuric acid triester residue, a C1 to C20 (thio)carboxylic acid hydrocarbyl ester residue, a C1 to C20 (thio)carboxylic acid metallic salt residue, a C1 to C20 carboxylic anhydride residue, a C1 to C20 carboxyl halide residue, a carbonic acid dihydrocarbyl ester residue, and functional groups represented by formula -E-F-G.

In the formula -E-F-G, E represents an imino group, a divalent imine residue, a divalent pyridine residue, or a divalent amide residue; F represents a C1 to C20 alkylene group, a phenylene group, or a C8 to C20 aralkylene group; and G represents a primary amino group, a secondary amino group, a protected primary or secondary amino group, a tertiary amino group, a cyclic amino group, an oxazolyl group, an imidazolyl group, an aziridinyl group, a ketimine group, a nitrile group (cyano group), an amido group, a pyridine group, or a (thio)isocyanato group.

Specific examples of the functional group represented by formula -E-F-G include —NH—$C_2H_4$—$NH_2$, —NH—$C_2H_4$—$N(CH_3)_2$, and these groups in which —$C_2H_4$— is substituted by —$C_6H_{12}$— or phenylene.

In the aforementioned formula (2), a silicon-containing group in which a halogen atom or an alkoxy group is bonded to the silicon atom, or the group —$R^dSiX_3$ represented by formula (2-a) is a group which is bonded to the active site of the conjugated diene (co)polymer. The (thio)epoxy group, (thio)isocyanato group, nitrile group, imidazolyl group, ketimine group, (thio)ketone group, and protected primary or secondary amino group is a group which promotes reaction with silica.

When the functional group which promotes reaction between a silanol group and a reinforcing filler is present in the vicinity of the silanol group, a stabilized structure is thought to be provided. The stabilized structure is thought to be formed from a hydroxyl group present on the reinforcing filler (particularly silica), the silanol group, and atoms each having an unpaired electron (oxygen, sulfur, or nitrogen) of the functional group which promotes reaction between a silanol group and a reinforcing filler. By virtue of the stabilized structure, reactivity of silanol group to silica is enhanced. Thus, the heat-buildup-suppressing of the rubber composition of the present invention employing the modified conjugated diene (co)polymer of the present invention can be enhanced.

In the aforementioned formula (1) or (2), specific examples of the C1 to C20 hydrocarbon group represented by $R^1$, $R^4$, $R^5$ (p=1), or $R^6$ (q=1) include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, and cyclohexane-1,4-diyl. Of these, propane-1,3-diyl is particularly preferred.

When p is 0 or q is 0, each of $R^5$ and $R^6$ is a hydrogen atom or a C1 to C20 monovelant hydrocarbon group, similar to $R^2$ and $R^3$. That is, $R^5$ has a valency of (p+1), and $R^6$ has a valency of (q+1).

In the aforementioned formula (1) or (2), specific examples of the C1 to C20 monovalent hydrocarbon group represented by $R^2$, $R^3$, $R^5$ (p=0), or $R^6$ (q=0) include methyl, ethyl, propyl, isopropyl, n-butyl, sec-butyl, tert-butyl, n-pentyl, n-hexyl, n-heptyl, n-octyl, and stearyl. Of these, methyl or ethyl are particularly preferred.

One specific embodiment of the organic silane compound represented by the aforementioned formula (1) is a silane compound containing a (thio)epoxy group. Specific examples include (2-glycidoxyethyl)dimethylmethoxysilane, (2-glycidoxyethyl)diethylmethoxysilane, (2-glycidoxyethyl)dimethylethoxysilane, (2-glycidoxyethyl)diethylethoxysilane, (3-glycidoxypropyl)dimethylmethoxysilane, (3-glycidoxypropyl)diethylmethoxysilane, (3-glycidoxypropyl)dimethylethoxysilane, (3-glycidoxypropyl)diethylethoxysilane, 2-(3,4-epoxycyclohexyl)ethyl(dimethyl)methoxysilane, 2-(3,4-epoxycyclohexyl)ethyl(diethyl)methoxysilane, 2-(3,4-epoxycyclohexyl)ethyl(dimethyl)ethoxysilane, 2-(3,4-epoxycyclohexyl)ethyl(diethyl)ethoxysilane, and epoxy-to-thioepoxy substituted compounds thereof. Among them, (3-glycidoxypropyl)dimethylmethoxysilane, (3-glycidoxypropyl)diethylmethoxysilane, 2-(3,4-epoxycyclohexyl)ethyl(dimethyl)methoxysilane, and 2-(3,4-epoxycyclohexyl)ethyl(diethyl)methoxysilane are particularly preferred.

Another specific embodiment of the organic silane compound represented by the aforementioned formula (1) is a silane compound containing an imine residue. Specific examples include N-(1,3-dimethylbutylidene)-3-(dimethylethoxysilyl)-1-propanamine, N-(1,3-dimethylbutylidene)-3-(diethylethoxysilyl)-1-propanamine, N-(1-methylethylidene)-3-(dimethylethoxysilyl)-1-propanamine, N-(1-methylethylidene)-3-(diethylethoxysilyl)-1-propanamine, N-ethylidene-3-(dimethylethoxysilyl)-1-propanamine, N-ethylidene-3-(diethylethoxysilyl)-1-propanamine, N-(1-methylpropylidene)-3-(dimethylethoxysilyl)-1-propanamine, N-(1-methylpropylidene)-3-(diethylethoxysilyl)-1-propanamine, N-(4-N,N-dimethylaminobenzylidene)-3-(dimethylethoxysilyl)-1-propanamine, N-(4-N,N-dimethylaminobenzylidene)-3-(diethylethoxysilyl)-1-propanamine, N-(cyclohexylidene)-3-(dimethylethoxysilyl)-1-propanamine, and N-(cyclohexylidene)-3-(diethylethoxysilyl)-1-propanamine. Among them, N-(1-methylpropylidene)-3-(dimethylethoxysilyl)-1-propanamine, N-(1-methylpropylidene)-3-(diethylethoxysilyl)-1-propanamine, N-(1,3-dimethylbutylidene)-3-(dimethylethoxysilyl)-1-propanamine, and N-(1,3-dimethylbutylidene)-3-(diethylethoxysilyl)-1-propanamine are are preferred.

Another specific embodiment of the organic silane compound represented by the aforementioned formula (1) is a silane compound containing an imino (amidino) group. Specific examples include 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, 1-[3-(diethylmethoxysilyl)propyl]-4,5-dihydroimidazole, 3-[10-(dimethylethoxysilyl)decyl]-4-oxazoline, 3-[10-(diethylethoxysilyl)decyl]-4-oxazoline, 3-(1-hexamethyleneimino)propyl(dimethylethoxy)silane, 3-(1-hexamethyleneimino)propyl(diethylethoxy)silane, (1-hexamethyleneimino)methyl(dimethylmethoxy)silane, (1-hexamethyleneimino)methyl(diethylmethoxy)silane, 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, and 1-[3-(diethylmethoxysilyl)propyl]-4,5-dihydroimidazole. Among them, 3-(1-hexamethyleneimino)propyl(dimethylethoxy)silane, 3-(1-hexamethyleneimino)propyl(diethylethoxy)silane, (1-hexamethyleneimino)methyl(dimethylmethoxy)silane, (1-hexamethyleneimino)methyl(diethylmethoxy)silane, 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, and 1-[3-(diethylmethoxysilyl)propyl]-4,5-dihydroimidazole are preferred.

Another specific embodiment of the organic silane compound represented by the aforementioned formula (1) is a silane compound containing an carboxylic acid ester group. Specific examples include (3-methacryloyloxypropyl)dimethylethoxysilane, (3-methacryloyloxypropyl)diethylethoxysilane, (3-methacryloyloxypropyl)dimethylmethoxysilane, (3-methacryloyloxypropyl)diethylmethoxysilane, (3-methacryloyloxypropyl)dimethylisopropoxysilane, and (3-methacryloyloxypropyl)diethylisopropoxysilane. Among them, (3-methacryloyloxypropyl)dimethylmethoxysilane and (3-methacryloyloxypropyl)diethylmethoxysilane are preferred.

Another specific embodiment of the organic silane compound represented by the aforementioned formula (1) is a silane compound containing an isocyanato group. Specific examples include (3-isocyanatopropyl)dimethylmethoxysilane, (3-isocyanatopropyl)diethylmethoxysilane, (3-isocyanatopropyl)dimethylethoxysilane, (3-isocyanatopropyl)diethylethoxysilane, (3-isocyanatopropyl)dimethylisopropoxysilane, and (3-isocyanatopropyl)diethylisopropoxysilane. Among them, (3-isocyanatopropyl)dimethylethoxysilane and (3-isocyanatopropyl)diethylethoxysilane are preferred.

Another specific embodiment of the organic silane compound represented by the aforementioned formula (1) is a silane compound containing an carboxylic acid anhydride. Specific examples include 3-(dimethylethoxy)silylpropylsuccinic anhydride, 3-(diethylethoxy)silylpropylsuccinic anhydride, 3-(dimethylmethoxy)silylpropylsuccinic anhydride, and 3-(diethylmethoxy)silylpropylsuccinic anhydride. Among them, 3-(dimethylethoxy)silylpropylsuccinic anhydride and 3-(diethylethoxy)silylpropylsuccinic anhydride are preferred.

An embodiment of the organic silane compound represented by the aforementioned formula (2) is a hydrocarbyloxysilane compound having two primary amino groups each protected by a protective trialkylsilyl group —SiR$^a$R$^b$R$^c$ (wherein each of R$^a$, R$^b$, and R$^c$ represents a C1 to C12 alkyl group (preferably methyl, ethyl, propyl, propyl, or butyl). Specific examples of preferred hydrocarbyloxysilane compounds having two protected primary amino groups include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, and N,N-bis(trimethylsilyl)aminoethylmethyldiethoxysilane. Among them, N,N-bis(trimethylsilyl)aminopropylmethyldimethoxysilane and N,N-bis(trimethylsilyl)aminopropylmethyldiethoxysilane are particularly preferred.

Another embodiment of the organic silane compound represented by the aforementioned formula (2) is a hydrocarbyloxysilane compound having one secondary amino group protected by a protective trialkylsilyl group —SiR$^a$R$^b$R$^c$ (wherein R$^a$, R$^b$, and R$^c$ have the same meanings as defined above). Specific examples of the hydrocarbyloxysilane compound having one protected secondary amino groups of preferred compound include N,N-methyl(trimethylsilyl)aminopropylmethyldimethoxysilane, N,N-ethyl(trimethylsilyl)aminopropylmethyldimethoxysilane, N,N-methyl(trimethylsilyl)aminopropylmethyldiethoxysilane, N,N-ethyl(trimethylsilyl)aminopropylmethyldiethoxysilane, N,N-methyl(trimethylsilyl)aminoethylmethyldimethoxysilane, N,N-ethyl(trimethylsilyl)aminoethylmethyldimethoxysilane, N,N-methyl(trimethylsilyl)aminoethylmethyldiethoxysilane, and N,N-ethyl(trimethylsilyl)aminoethylmethyldiethoxysilane.

Another specific embodiment of the organic silane compound represented by the aforementioned formula (2) is a hydrocarbyloxysilane compound containing an imine residue. Specific examples of preferred compound include N-(1,3-dimethylbutylidene)-3-(methyldiethoxysilyl)-1-propanamine, N-(1-methylethylidene)-3-(methyldiethoxysilyl)-1-propanamine, N-ethylidene-3-(methyldiethoxysilyl)-1-propanamine, N-(1-methylpropylidene)-3-(methyldiethoxysilyl)-1-propanamine, N-(4-N,N-dimethylaminobenzylidene)-3-(methyldiethoxysilyl)-1-propanamine, N-(cyclohexylidene)-3-(methyldiethoxysilyl)-1-propanamine, and methyldimethoxysilyl analogues, ethyldiethoxysilyl analogues, ethyldimethoxysilyl analogues, and other analogues to these methyldiethoxysilyl compounds. Among them, N-(1-methylpropylidene)-3-(methyldiethoxysilyl)-1-propanamine and N-(1,3-dimethylbutylidene)-3-(methyldiethoxysilyl)-1-propanamine are particularly preferred.

Another specific embodiment of the organic silane compound represented by the aforementioned formula (2) is a hydrocarbyloxysilane compound containing an acyclic tertiary amino group. Specific examples of preferred compound include 3-dimethylaminopropyl(diethoxy)methylsilane, 3-dimethylaminopropyl(dimethoxy)methylsilane, 3-diethylaminopropyl(diethoxy)methylsilane, 3-diethylaminopropyl(dimethoxy)methylsilane, 2-dimethylaminoethyl(diethoxy)methylsilane, and 2-dimethylaminoethyl(dimethoxy)methylsilane. Among them, 3-dimethylaminopropyl(dimethoxy)methylsilane and 3-dimethylaminopropyl(diethoxy)methylsilane are particularly preferred.

Another specific embodiment of the organic silane compound represented by the aforementioned formula (2) is a hydrocarbyloxysilane compound containing an acyclic secondary amino group. Specific examples of preferred compounds include 3-methylaminopropyl(diethoxy)methylsilane, 3-methylaminopropyl(dimethoxy)methylsilane, 3-ethylaminopropyl(diethoxy)methylsilane, 3-ethylaminopropyl(dimethoxy)methylsilane, 2-methylaminoethyl(diethoxy)methylsilane, and 2-methylaminoethyl(dimethoxy)methylsilane. Among them, 3-methylaminopropyl(diethoxy)methylsilane and 3-methylaminopropyl(dimethoxy)methylsilane are particularly preferred.

Another specific embodiment of the organic silane compound represented by the aforementioned formula (2) is a hydrocarbyloxysilane compound containing a cyclic tertiary amino group. Specific examples of preferred compounds include 3-(1-hexamethyleneimino)propyl(methyldiethoxy)silane, 3-(1-hexamethyleneimino)propyl(methyldimethoxy)silane, (1-hexamethyleneimino)methyl(methyldimethoxy)silane, (1-hexamethyleneimino)methyl(methyldiethoxy)silane, 2-(1-hexamethyleneimino)ethyl(methyldiethoxy)silane, 2-(1-hexamethyleneimino)ethyl(methyldimethoxy)silane, 3-(1-pyrrolidinyl)propyl(methyldiethoxy)silane, 3-(1-pyrrolidinyl)propyl(methyldimethoxy)silane, 3-(1-heptamethyleneimino)propyl(methyldiethoxy)silane, 3-(1-dodecamethyleneimino)propyl(methyldiethoxy)silane, 3-(1-hexamethyleneimino)propyl(ethyldiethoxy)silane, and 3-[10-(methyldiethoxysilyl)decyl]-4-oxazoline. Among them, 3-(1-hexamethyleneimino)propyl(methyldiethoxy)silane and (1-hexamethyleneimino)methyl(methyldimethoxy)silane are more preferred, with 3-(1-hexamethyleneimino)propyl(methyldiethoxy)silane being particularly preferred.

Another specific embodiment of the organic silane compound represented by the aforementioned formula (2) is a hydrocarbyloxysilane compound containing an amidine group. Specific examples include N-(3-methyldimethoxysilylpropyl]-4,5-dihydroimidazole and N-(3-methyldiethoxysilylpropyl)-4,5-dihydroimidazole. Of these, N-(3-methyldiethoxysilylpropyl)-4,5-dihydroimidazole is preferred.

Another specific embodiment of the organic silane compound represented by the aforementioned formula (2) is a hydrocarbyloxysilane compound containing an epoxy group. Specific examples of preferred compounds include (2-glycidoxyethyl)methyldimethoxysilane, (2-glycidoxyethyl)methyldiethoxysilane, (2-glycidoxyethyl)ethyldimethoxysilane, (2-glycidoxyethyl)ethyldiethoxysilane, (3-glycidoxypropyl)methyldimethoxysilane, (3-glycidoxypropyl) methyldiethoxysilane, (3-glycidoxypropyl) ethyldimethoxysilane, (3-glycidoxypropyl) ethyldiethoxysilane, 2-(3,4-epoxycyclohexyl)ethyl (methyldimethoxy)silane, 2-(3,4-epoxycyclohexyl)ethyl (methyldiethoxy)silane, 2-(3,4-epoxycyclohexyl)ethyl (ethyldimethoxy)silane, and 2-(3,4-epoxycyclohexyl)ethyl (ethyldiethoxy)silane. Among them, (3-glycidoxypropyl) methyldimethoxysilane and (3-glycidoxypropyl) methyldiethoxysilane are particularly preferred.

Also preferred are hydrocarbyloxysilane compounds each containing an epithio group derived through substitution of the epoxy group by the epithio group.

Another specific embodiment of the organic silane compound represented by the aforementioned formula (2) is a hydrocarbyloxysilane compound containing an isocyanate group. Specific examples include (3-isocyanatopropyl) methyldimethoxysilane, (3-isocyanatopropyl)methyldiethoxysilane, (3-isocyanatopropyl)ethyldimethoxysilane, (3-isocyanatopropyl)ethyldiethoxysilane, (3-isocyanatopropyl)methyldiisopropoxysilane, and 3-(isocyanatopropyl) ethyldiisopropoxysilane. Among them, (3-isocyanatopropyl)methyldiethoxysilane is preferred.

Another specific embodiment of the organic silane compound represented by the aforementioned formula (2) is a hydrocarbyloxysilane compound containing a carboxylic acid hydrocarbyl ester residue. Specific examples include 3-methacryloyloxypropylmethyldiethoxysilane, 3-methacryloyloxypropylmethyldimethoxysilane, 3-methacryloyloxypropylethyldimethoxysilane, 3-methacryloyloxypropylethyldiethoxysilane, and 3-methacryloyloxypropylmethyldiisopropoxysilane. Among them, 3-methacryloyloxypropylmethyldimethoxysilane and 3-methacryloyloxypropylmethyldiethoxysilane are preferred.

Another specific embodiment of the organic silane compound represented by the aforementioned formula (2) is a hydrocarbyloxysilane compound containing a carboxylic anhydride residue. Specific examples include 3-(methyldiethoxysilyl)propylsuccinic anhydride and 3-(methyldimethoxysilyl)propylsuccinic anhydride. Among them, 3-(methyldiethoxysilyl)propylsuccinic anhydride is preferred.

Further specific embodiment include 2-(methyldimethoxysilylethyl)pyridine, 2-(methyldiethoxysilylethyl)pyridine, and 2-cyanoethylmethyldiethoxysilane.

Among the various organic silane compounds represented by the aforementioned formula (2), hydrocarbyloxysilane compounds having an amino group or an imine residue are preferred, from the viewpoint of improvement of heat-buildup-suppressing property. Among such hydrocarbyloxysilane compounds, the aforementioned hydrocarbyloxysilane having a protected primary amino group is particularly preferred. This is because, through incorporation of a primary amino group into a molecular chain end of the modified conjugated diene (co)polymer, the heat-buildup-suppressing performance of the rubber composition to which the modified conjugated diene (co)polymer is added is remarkably improved.

If desired, the method of the present invention for producing a modified conjugated diene (co)polymer may further include, before the modification reaction step in which the aforementioned organic silane compound is reacted, a preliminary modification reaction step in which a hydrocarbyloxysilane compound is caused to react with the active site of the conjugated diene (co)polymer.

In the preliminary modification reaction step, the hydrocarbyloxysilane compound employed preferably has a plurality of hydrocarbyloxysilyl groups. This is because, even when one hydrocarbyloxysilyl group is transformed by the reaction with the active site of the conjugated diene (co) polymer, the modification reaction step essential to the method of the present invention for producing a modified conjugated diene (co)polymer can be carried out by the remaining hydrocarbyloxysilyl group(s).

In the method of the present invention for producing a modified conjugated diene (co)polymer, examples of the conjugated diene monomer for producing the conjugated diene (co)polymer include 1,3-butadiene, isoprene, 1,3-pentadiene, 2,3-dimethyl-1,3-butadiene, 2-phenyl-1,3-butadiene, and 1,3-hexadiene. These dienes may be used singly or in combination of two or more species. Among them, 1,3-butadiene is particularly preferred.

Examples of the aromatic vinyl monomer for producing the conjugated diene (co)polymer include styrene; α-methylstyrene, 1-vinylnaphthalene, 3-vinyltoluene, ethylvinylbenzene, divinylbenzene, 4-cyclohexylstyrene, and 2,4,6-trimethylstyrene. These compounds may be used singly or in combination of two or more species. Among them, styrene is particularly preferred.

In the method of the present invention for producing a modified conjugated diene (co)polymer, the conjugated diene (co)polymer is preferably polybutadiene, polyisoprene, butadiene-isoprene copolymer, styrene-butadiene copolymer, styrene-isoprene copolymer, or styrene-isoprene-butadiene terpolymer. Of these, polybutadiene and styrene-butadiene copolymer are particularly preferred.

Hereinafter, the method of the present invention for producing a modified conjugated diene (co)polymer will be described in detail. In the modification reaction step of the production method of the present invention, in order to react the active site of the conjugated diene (co)polymer with the organic silane compound represented by formula (1) or (2), at least 10% of the polymer chains of the employed conjugated diene (co)polymer preferably have living or pseudo-living property. The polymerization reaction of living nature is preferably anionic polymerization or coordination anionic polymerization. Of these, anionic polymerization is particularly preferred, since the aforementioned preliminary modification reaction step is not required.

In the modification reaction step of the production method of the present invention, the active site of the conjugated diene (co)polymer may be either of an active end (active site at molecular chain end) of the backbone or an active site of a side chain. In the case where the active site of the conjugated diene (co)polymer is obtained through anionic polymerization or coordination anionic polymerization, the active end is preferred.

The organic alkali metal compound serving as the aforementioned anionic polymerization initiator is preferably an organic lithium compound. No particular limitation is imposed on the lithium compound serving as a polymerization initiator, and hydrocarbyllithium and a lithiumamide compound are preferably used. When hydrocarbyllithium is used, a conjugated diene (co)polymer which has a hydrocarbyl group at a polymerization-initiating end and a polymerization active site at the other end is produced, whereas when the lithiumamide compound is used, a conjugated diene (co)polymer which has a nitrogen-containing group at a polymerization-initiating end and a polymerization active site at the other end is produced.

The hydrocarbyllithium is preferably a compound having a C2 to C20 hydrocarbyl group. Specific examples include ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, and a reaction product of diisopropenylbenzene with butyllithium. Among them, n-butyllithium is preferred.

Examples of the lithiumamide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, and lithium methylphenethylamide. Among them, cyclic lithiumamides such as lithium hexamethyleneimide, lithium pyrrolidide, lithium piperidide, lithium heptamethyleneimide and lithium dodecamethyleneimide are preferred in terms of interaction with carbon black and polymerization initiating ability. Particularly preferred are lithium hexamethyleneimide and lithium pyrrolidide.

Generally, these lithiumamide compounds for use in polymerization may be prepared in advance from a secondary amine and a lithium compound. Alternatively, the amide compounds may also be prepared in the polymerization system (in-situ). The polymerization initiator is preferably employed in an amount 0.2 to 20 mmol per 100 g of the monomer.

No particular limitation is imposed on the method for producing a conjugated diene (co)polymer through anionic polymerization employing the aforementioned lithium compound serving as a polymerization initiator, and any conventionally known methods may be employed.

In a specific procedure, a conjugated diene monomer or a mixture of a conjugated diene monomer and an aromatic vinyl compound is anionically polymerized in the presence of the lithium compound serving as a polymerization initiator and an optional randomizer in an organic solvent which is inert to the reaction, to thereby produce a conjugated diene (co)polymer of interest. Examples of the hydrocarbon solvent include aliphatic, alicyclic, and aromatic hydrocarbon compounds.

As compared with the case where a catalyst containing a lanthanum-series rare earth element compound is used, use of the organic lithium compound as a polymerization initiator leads to effective production of a conjugated diene polymer having an active end and a conjugated diene-aromatic vinyl copolymer having an active end.

The hydrocarbon solvent is preferably a C3 to C8 hydrocarbon. Specific examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These hydrocarbons may be used singly or in combination of two or more species.

The monomer solution (in solvent) preferably has a monomer concentration of 5 to 50 mass %, more preferably 10 to 30 mass %. When a mixture of a conjugated diene monomer and an aromatic vinyl monomer is allowed to be copolymerized, the aromatic vinyl monomer content of the fed monomer mixture is preferably 55 mass % or less.

The randomizer, which may be used in accordance with needs, is a compound which is capable of controlling a microstructure of a conjugated diene (co)polymer (e.g., increasing 1,2-butadiene units in a butadiene-styrene copolymer or 3,4-bonds in an isoprene polymer) or controlling of the monomer unit composition distribution profile of a conjugated diene compound-aromatic vinyl compound copolymer (e.g., randomization in butadiene units and styrene units in a butadiene-styrene copolymer). No particular limitation is imposed on the type of randomizer, and any of compounds known as a randomizer may appropriately employed. Specific examples of the randomizer include ethers and tertiary amines such as dimethoxybenzene, tetrahydrofuran, dimethoxyethane, diethylene glycol dibutyl ether, diethylene glycol dimethyl ether, 2,2-bis(2-tetrahydrofuryl)propane, triethylamine, pyridine, N-methylmorpholine, N,N,N',N'-tetramethylethylenediamine and 1,2-piperidinoethane. Further, potassium salts such as potassium t-amylate and potassium t-butoxide and sodium salts such as sodium t-amylate may also be employed.

These randomizers may be used singly or in combination of two or more species. The randomizer is preferably employed in an amount 0.01 to 1000 mole equivalents per mole of the lithium compound.

The polymerization reaction is preferably carried out at 0 to 150° C., more preferably 20 to 130° C. The polymerization reaction may be carried out under generated pressure. In a general procedure, the pressure is preferably selected such that the monomer is maintained virtually as a liquid phase. That is, a higher pressure may be employed in accordance with needs, although depending on the individual substances to be polymerized, polymerization solvent, and polymerization temperature. Such pressure may be obtained through an appropriate method such as applying pressure to a reactor by use of gas inert to the polymerization reaction.

Next will be described the polymerization catalyst system in coordination anionic polymerization. As the polymerization catalyst system in coordination anionic polymerization, a catalyst containing lanthanum-series rare earth element compound is used in organic solvent.

As a catalyst containing a lanthanum-series rare earth element compound, preferably used is a catalyst system for polymerizing conjugated diene monomer(s) which catalyst contains:

ingredient (A): a rare earth element compound falling within the atomic number range of 57 to 71 in the periodic table, or a reaction product thereof with a Lewis base;

ingredient (B): an organic aluminum compound represented by the following formula (5):

$$AlR^7R^8R^9 \qquad (5)$$

(wherein $R^7$ and $R^8$, which may be identical to or different from each other, each represent a C1 to C10 hydrocarbyl group or a hydrogen atom; $R^9$ represents a C1 to C10 hydrocarbyl group, and $R^9$ may be identical to or different from $R^7$ or $R^8$); and ingredient (C): at least one species selected from among a Lewis acid, a complex of a metal halide and a Lewis base, and an organic compound containing active halogen.

In the present invention, preferably, the catalyst system containing a lanthanum-series rare earth element compound further contains contain, in addition to the ingredients (A) to (C), ingredient (D); i.e., an organic aluminumoxy compound (i.e., aluminoxane). In a more preferred mode, the catalyst system is preliminarily prepared in the presence of the aforementioned ingredients (A) to (D) and a conjugated diene monomer(s).

In the present invention, the ingredient (A) containing a compound containing a rare earth element falling within the atomic number range of 57 to 71 in the periodic table, or a reaction product thereof with a Lewis base. Among the rare earth elements falling within the atomic number range of 57 to 71, neodymium, praseodymiumu, cerium, lanthanum, gadolinium, samarium, and a mixture thereof are preferred, with neodymium being particularly preferred.

The rare earth element compound is preferably a salt thereof which can be dissolved in hydrocarbon solvent. Specific examples include carboxylic acid salts, alkoxides, β-diketone complexes, phosphoric acid salts, and phosphorous acid salt of the rare earth elements. Among them, carboxylic acid salts and phosphoric acid salts are preferred, with carboxylic acid salts being particularly preferred.

Examples of the hydrocarbon solvent include C4 to C10 saturated aliphatic hydrocarbons such as butane, pentane, hexane, and heptane; C5 to C20 saturated alicyclic hydrocarbons such as cyclopentane, cyclohexane; monoolefins such as 1-butene and 2-butene; aromatic hydrocarbons such as benzene, toluene, and xylene; and halo-hydrocarbons such as methylene chloride, chloroform, trichloroethylene, perchloroethylene, 1,2-dichloroethane, chlorobenzene, bromobenzene, and chlorotoluene.

Examples of the rare earth element carboxylic acid salt include compounds represented by the following formula (6):

$$(R^{10}\text{—}CO_2)_3M^1 \qquad (6)$$

(wherein $R^{10}$ represents a C1 to C20 hydrocarbyl group and $M^1$ represents a rare earth element falling within the atomic number range of 57 to 71). $R^{10}$ may be saturated or unsaturated and is preferably an alkyl group or an alkenyl group, which may be linear, branched, or cyclic. The carboxyl group is bonded to a primary, secondary, or tertiary carbon atom. Specific examples of the carboxylic acid salt include salts of octanoic acid, 2-ethylhexanoic acid, oleic acid, neodecanoic acid, stearic acid, benzoic acid, nephthenic acid, versatic acid (product name, Shell Chemicals, carboxylic acid in which a carboxyl group is bonded to a tertiary carbon atom). Of these, salts of 2-ethylhexanoic acid, neodecanoic acid, naphthenic acid, and versatic acid are preferred.

Examples of the rare earth element alkoxide include compounds represented by the following formula (7):

$$(R^{11}O)_3M^2 \qquad (7)$$

(wherein $R^{11}$ a C1 to C20 hydrocarbyl group and $M^2$ represents a rare earth element falling within the atomic number range of 57 to 71). Examples of the alkoxy group $R^{11}O$ include 2-ethylhexyloxy, oleyloxy, stearyloxy, phenoxy, and benzyloxy. Of these, 2-ethylhexyloxy and benzyloxy are preferred.

Examples of the rare earth element β-diketone complex include acetylacetone complexes, benzoylacetone complexes, propionitrileacetone complexes, valerylacetone complexes, and ethylacetylacetone complexes of the rare earth elements. Among them, acetylacetone complexes and ethylacetylacetone complexes are preferred.

Examples of the rare earth element phosphoric acid salt and phosphorous acid salt include salts of the rare earth element with an acid such as bis(2-ethylhexyl)phosphoric acid, bis(1-methylheptyl)phosphoric acid, bis(p-nonylphenyl)phosphoric acid, bis(polyethylene glycol-p-nonylphenyl)phosphoric acid, (1-methylheptyl)(2-ethylhexyl)phosphoric acid, (2-ethylhexyl) (p-nonylphenyl)phosphoric acid, mono-2-ethylhexyl 2-ethylhexylphosphonate, mono-p-nonylphenyl 2-ethylhexylphosphonate, bis(2-ethylhexyl)phosphinic acid, bis(1-methylheptyl)phosphinic acid, bis(p-nonylphenyl)phosphinic acid, (1-methylheptyl)(2-ethylhexyl) phosphinic acid, and (2-ethylhexyl)(p-nonylphenyl) phosphinic acid. Among them, salts of the rare earth elements with bis(2-ethylhexyl)phosphoric acid, bis(1-methylheptyl)phosphoric acid, mono-2-ethylhexyl 2-ethylhexylphosphonate, and bis(2-ethylhexyl)phosphinic acid are preferred.

Among these rare earth element compounds, phosphoric acid salts and carboxylic acid salts of neodymium are more preferred. Particularly, neodymium branched carboxylic acid salts such as neodymium 2-ethylhexanoate, neodymium neodecanoate, and neodymium versatic acid salt are most preferred.

The ingredient (A) may be a reaction product between the rare earth element compound and a Lewis base. By the action of the Lewis base, the reaction product exhibits enhanced solubility of the rare earth element compound in the solvent and can be stored in a stable state for a long period of time. The Lewis base, which is employed for facilitating dissolution of the rare earth element compound and enabling long-term stable storage, is used in an amount of 0 to 30 mol with respect to 1 mole of rare earth element, preferably 1 to 10 mol. The Lewis base is employed in a mixture with the rare earth element compound or a reaction product therebetween. Examples of the Lewis base include acetylacetone, tetrahydrofuran, pyridine, N,N-dimethylformamide, thiophene, diphenyl ether, triethylamine, an organic phosphorus compound, and monohydric or dihydric alcohol.

The aforementioned rare earth element compound or a reaction product between the compound and Lewis base, serving as the ingredient (A), may be used singly or in combination of two or more species.

In the present invention, examples of the organic aluminum compound represented by formula (5), serving as the ingredient (B) of the catalyst system for use in polymerization to produce an end-active polymer, trimethylaluminum, triethylaluminum, tri(n-propyl)aluminum, triisopropylaluminum, tri(n-butyl)aluminum, triisobutylaluminum, tri-t-butylaluminum, tripentylaluminum, trihexylaluminum, tricyclohexylaluminum, and trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride; and ethylaluminum dihydride, n-propylaluminum dihydride, and isobutylaluminum dihydride. Among them, triethylaluminum, trisobutylaluminum, diethylaluminum hydride, and diisobutylaluminum hydride are preferred. The aforementioned organic aluminum compounds, serving as the ingredient (B), may be used singly or in combination of two or more species.

In the present invention, the ingredient (C) of the catalyst system for use in polymerization to produce an end-active polymer is at least one halogen compound selected from among a Lewis acid, a complex of a metal halide and a Lewis base, and an organic compound containing active halogen.

The Lewis acid has Lewis acidic property and can be dissolved in hydrocarbon. Specific examples include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, and silicon tetrachloride. Of these, diethylaluminum chloride, ethylaluminum sesquichloride, ethylaluminum dichloride, diethylaluminum bromide, ethylaluminum sesquibromide, and ethylaluminum dibromide are preferred.

Alternatively, a reaction product between alkylaluminum and halogen; e.g., triethylaluminum and bromine, may also be used.

Examples of the metal halide forming the complex between the metal halide and Lewis base include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Among them, magnesium chloride, calcium chloride, barium chloride, manganese chloride, zinc chloride, and copper chloride are preferred, with magnesium chloride, manganese chloride, zinc chloride, and copper chloride being particularly preferred.

The Lewis base forming the complex between the metal halide and Lewis base is preferably a phosphorus compound, a carbonyl compound, a nitrogen compound, an ether compound, an alcohol, etc. Specific examples include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol. Among them, tri-2-ethylhexyl phosphate, tricresyl phosphate, acetylacetone, 2-ethylhexanoic acid, versatic acid, 2-ethylhexyl alcohol, 1-decanol, and lauryl alcohol are preferred.

In the reaction, the Lewis base is generally used in an amount of 0.01 to 30 mol with respect to 1 mole of metal halide, preferably 0.5 to 10 mol. Through employment of the reaction product with the Lewis base, the amount of metal remaining in the polymer can be reduced.

Examples of the organic compound containing active halogen include benzyl chloride.

Examples of aluminoxane, serving as ingredient (D), include methylaluminoxane, ethylaluminoxane, propylaluminoxane, butylaluminoxane, and chloroaluminoxane. By adding aluminoxane serving as the ingredient (D) to the catalyst system, the formed polymer has a sharp molecular weight distribution profile, and catalytic activity can be enhanced.

In the present invention, the amounts of catalyst system ingredients and the compositional proportions among them are appropriately selected in accordance with purpose and need of each ingredient. The ingredient (A) is preferably used in an amount of 0.00001 to 1.0 mmol with respect to 100 g of 1,3-butadiene, more preferably 0.0001 to 0.5 mmol. By controlling the amount of ingredient (A) to fall within the above ranges, excellent polymerization activity can be attained, and no demineralization is needed.

The ratio in amount (by mole) of ingredient (A) to (B) is generally 1:1 to 1:700, preferably 1:3 to 1:500.

The ratio in halogen content (by mole) of ingredient (A) to (C) is generally 1:0.1 to 1:30, preferably 1:0.2 to 1:15, more preferably 1:2.0 to 1:5.0.

The ratio of aluminum content of ingredient (D) to amount of ingredient (A) (by mole) is generally 1:1 to 700:1, preferably 3:1 to 500:1. By controlling the catalyst amount and compositional proportions among ingredients to fall within the above ranges, high catalytic activity can be attained, and no catalyst residue removal step is needed, which is preferred.

In addition to the aforementioned ingredients (A) to (C), hydrogen gas may be added to the polymerization system so as to control the molecular weight of the formed polymer.

In addition to the aforementioned ingredients (A) to (C) and an optional ingredient (D), a small amount of conjugated diene monomer such as 1,3-butadiene may be used as a catalyst ingredient. Specifically, the diene monomer may be used in an amount of 0 to 1,000 mol with respect to 1 mole of the compound serving as the ingredient (A). Although the conjugated diene monomer such as 1,3-butadiene is not essential as a catalyst ingredient, use in combination of the diene monomer further enhances catalytic activity, which is advantageous.

In one production procedure of the aforementioned catalyst, the ingredients (A) to (C) are dissolved in a solvent, and an optional conjugated diene monomer such as 1,3-butadiene is caused to react with the solution.

In this procedure, no particular limitation is imposed on the order of addition of the ingredients. In addition to the above ingredients, aluminoxane may be added as the ingredient (D). From the viewpoints of enhancement of polymerization activity and shortening of polymerization initiation induction time, preferably, these ingredients are mixed together, the mixture is allowed to react, followed by aging.

The aging temperature is about 0 to about 100° C., preferably 20 to 80° C. When the aging temperature is lower than 0° C., aging tends to be insufficient, whereas when the temperature is in excess of 100° C., a drop in catalytic activity and broadening of the molecular weight distribution profile may occur.

No particular limitation is imposed on the aging time, and aging may be performed in a contact manner in the production line before addition of the ingredients to the polymerization tank. An aging time of 0.5 minutes or longer is generally sufficient. The aging system is stable for several days.

The conjugated diene (co)polymer having end activity is produced through solution polymerization of a conjugated diene monomer or a mixture of a conjugated diene monomer and another conjugated diene monomer in an organic solvent in the presence of the catalyst system containing a lanthanum-series rare earth element compound. The polymerization solvent employed is an inert organic solvent. Examples of the organic solvent include C4 to C10 saturated aliphatic hydrocarbons such as butane, pentane, hexane, and heptane; C5 to C20 saturated alicyclic hydrocarbons such as cyclopentane and cyclohexane; monoolefins such as 1-butene and 2-butene; aromatic hydrocarbons such as benzene, toluene, and xylene; and halo-hydrocarbons such as methylene chloride, chloroform, carbon tetrachloride, trichloroethylene, perchloroethylene, 1,2-dichloroethane, chlorobenzene, bromobenzene, and chlorotoluene.

Of these, C5 to C6 aliphatic hydrocarbons, particularly alicyclic hydrocarbons, preferred. These solvents may be used singly or in combination of two or more species.

The monomer solution used in the coordination anionic polymerization preferably has a monomer concentration of 5 to 50 mass %, more preferably 10 to 30 mass %.

In the present invention, the reaction temperature in coordination anionic polymerization is preferably −80 to 150° C., more preferably −20 to 120° C. The polymerization reaction may be performed under non-controlled pressure. However, generally, the reaction is preferably performed under such a high pressure that the monomer(s) is(are) maintained in a liquid state. That is, the pressure, which varies depending on the substances to be polymerized, polymerization solvent employed, and polymerization temperature, may be desirably as high as possible. Such high pressure can be obtained through, for example, pressurization of the reactor by use of a gas which is inert to the polymerization reaction.

In the modification of the active end of the conjugated diene (co)polymer having the active end which (co)polymer is produced through coordination anionic polymerization, the following procedure is preferred from the viewpoint of smoothly proceeding modification reaction. Specifically, the hydrocarbyloxysilane compound is reacted in advance in the aforementioned preliminary modification reaction step, and the product is reacted with an organic silane compound having a characteristic group for forming a silanol group through hydrolysis and, in the vicinity of the characteristic group, (i) a functional group which binds the organic silane compound to the conjugated diene (co)polymer via addition to or substitution at the active site and which promotes reaction between the silanol group and a reinforcing filler after the addition or substitution reaction, or (ii) a functional group which promotes reaction between the silanol group and a reinforcing filler.

In the aforementioned anionic polymerization and coordination anionic polymerization, all the materials involved in polymerization such as a polymerization initiator, a solvent, and monomers are preferably used after removal of reaction inhibitors such as water, oxygen, carbon dioxide, protic compounds, etc.

The polymerization reaction may be performed in a batch manner or a continuous manner.

Thus, the conjugated diene (co)polymer having an active end is produced.

In the modification reaction step of the method of the present invention for producing a modified conjugated diene (co)polymer, the active end of the thus-produced conjugated diene (co)polymer having the active end is reacted with the aforementioned organic silane compound represented by formula formula (1) or (2). The silane compound is preferably added in a stoichiometric amount or more with respect to the amount of the active end of the conjugated diene (co)polymer.

The modification reaction step and preliminary modification reaction step of the present invention are generally performed under the same temperature and pressure conditions as employed in the polymerization reaction.

Next, the hydrolyzation step of the method of the present invention for producing a modified conjugated diene (co) polymer will be described. In the hydrolyzation step, after completion of the modification reaction step, hydrolysis is performed in the presence of water under acidic, neutral, or alkaline conditions. Through hydrolysis, the hydrolyzable functional group bonded to the modified conjugated diene (co)polymer is effectively hydrolyzed, to thereby form a silanol group at an end or a side chain of the modified conjugated diene (co)polymer.

The amount (by mole) of water used in the hydrolysis reaction is preferably in excess of the amount (by mole) of the initiator (e.g., Li), for example, 2 to 4 times. The hydrolysis time is generally about 10 minutes to several hours.

In the case where hydrolysis is performed under alkaline conditions, preferably, a basic compound such as an alkali metal hydroxide (e.g., sodium hydroxide or potassium hydroxide), preferably sodium hydroxide is added. In the case where hydrolysis is performed under acidic conditions, preferably, an acidic compound such as an inorganic acid (e.g., hydrochloric acid, sulfuric acid, or nitric acid), a carboxylic acid (e.g., acetic acid or formic acid), or silicon tetrachloride is added.

In the present invention, between the modification reaction step and the hydrolyzation step, or after the hydrolyzation step, a condensation reaction step in which condensation is performed in the presence of a condensation-accelerating agent may be performed.

The condensation-accelerating agent employed in the condensation reaction is preferably added after modification reaction and before start of condensation reaction. When the agent is added before modification reaction, in some cases, the agent is directly reacted with the active end, thereby failing to incorporate a hydrocarbyloxy group into the active end. When the agent is added after start of condensation reaction, in some cases, the condensation-accelerating agent cannot be uniformly dispersed in the reaction system, thereby reducing catalytic performance.

The timing of addition of the condensation-accelerating agent is generally 5 minutes to 5 hours after the start of modification reaction, preferably 15 minutes to 1 hour after the start of modification reaction, in the case where a condensation reaction step is provided between the modification reaction step and the hydrolyzation step. In the case where a condensation reaction step is provided after the hydrolyzation step, the timing of addition of the condensation-accelerating agent is generally 5 minutes to 5 hours after the start of hydrolysis reaction, preferably 10 minutes to 2 hours after the start of hydrolysis reaction.

The condensation-accelerating agent preferably contains a metallic element, more preferably at least one metal belonging to the Group 2 to Group 15 of the periodic table.

The condensation-accelerating agent containing a metallic element preferably contains at least one species selected from among Ti, Sn, Bi, Zr, and Al, in the form of metal alkoxide, carboxylic acid salt, or acetylacetonato complex.

As a condensation-accelerating agent containing Ti as a metallic component is preferably a titanium (Ti) alkoxide, a Ti carboxylic acid salt, or an acetylacetonato Ti complex.

Specific examples include tetrakis(2-ethyl-1,3-hexanediolato)titanium, tetrakis(2-methyl-1,3-hexanediolato)titanium, tetrakis(2-propyl-1,3-hexanediolato)titanium, tetrakis(2-butyl-1,3-hexanediolato)titanium, tetrakis(1,3-hexanediolato)titanium, tetrakis(1,3-pentanediolato)titanium, tetrakis(2-methyl-1,3-pentanediolato)titanium, tetrakis(2-ethyl-1,3-pentanediolato)titanium, tetrakis(2-propyl-1,3-pentanediolato)titanium, tetrakis(2-butyl-1,3-pentanediolato)titanium, tetrakis(1,3-heptanediolato)titanium, tetrakis(2-methyl-1,3-heptanediolato)titanium, tetrakis(2-ethyl-1,3-heptanediolato)titanium, tetrakis(2-propyl-1,3-heptanediolato)titanium, tetrakis(2-butyl-1,3-heptanediolato)titanium, tetrakis(2-ethylhexoxy)titanium, tetramethoxytitanium, tetraethoxytitanium, tetra-n-propoxytitanium, tetraisopropoxytitanium, tetra-n-butoxytitanium, tetra-n-butoxytitanium oligomer, tetraisobutoxytitanium, tetra-sec-butoxytitanium, tetra-tert-butoxytitanium, bis(oleato)bis(2-ethylhexanoato)titanium, titanium dipropoxybis(triethanolamminate), titanium dibutoxybis(triethanolamminate), titanium tributoxystearate, titanium tripropoxystearate, titanium tripropoxyacetylacetonate, titanium dipropoxybis(acetylacetonate), titanium tripropoxy (ethylacetoacetate), titanium propoxyacetylacetonatebis (ethylacetoacetate), titanium tributoxyacetylacetonate, titanium dibutoxybis(acetylacetonate), titanium tributoxyethylacetoacetate, titanium butoxyacetylacetonatebis(ethylacetoacetate), titanium tetrakis(acetylacetonate), titanium diacetylacetonatebis(ethylacetoacetate), bis(2-ethylhexanoato)titanium oxide, bis(laurato)titanium oxide, bis(naphthenato)titanium oxide, bis(stearato)titanium oxide, bis(oleato)titanium oxide, bis(linolato)titanium oxide, tetrakis(2-ethylhexanoato)titanium, tetrakis(laurato)titanium, tetrakis(naphthenato)titanium, tetrakis(stearato)titanium, tetrakis(oleato)titanium, tetrakis(linolato)titanium, titanium di-n-butoxide bis(2,4-pentanedionate), titanium oxide bis (stearate), titanium oxide bis(tetramethylheptanedionate), titanium oxide bis(pentanedionate), and titanium tetra(lactate).

Of these, tetrakis(2-ethyl-1,3-hexanediolato)titanium, tetrakis(2-ethylhexoxy)titanium, and titanium di-n-butoxide bis(2,4-pentanedionate) are preferred.

Examples of preferred condensation-accelerating agents containing Sn as a metallic component include Sn(II) compounds represented by $Sn(OCOR^{31})_2$ (wherein $R^{31}$ represents a C2 to C19 alkyl group), Sn(IV) compounds represented by $R^{32}{}_xSnA^5{}_yB^1{}_{4-y-x}$ (wherein $R^{32}$ represents a C1 to C30 aliphatic hydrocarbon group; x is an integer of 1 to 3; y is 1 or 2; $A^5$ represents a group selected from among a C2 to C30 carboxyl group, a C5 to C20 β-dicarbonyl group, a C3 to C20 hydrocarbyloxy group, or a siloxy group tri-substituted by a C1 to C20 hydrocarbyl group and/or a C1 to C20 hydrocarbyloxy group; and $B^1$ represents a hydroxyl group or a halogen).

More specific examples of preferred tin carboxylic acid salts include tin(II) dicarboxylic acid salt, dihydrocarbyltin (IV) dicarboxylic acid salt (including bis(hydrocarbyldicarboxylic acid) salt), bis(β-diketonato), alkoxy halide, monocarboxylic acid salt hydroxide, alkoxy (trihydrocarbylsiloxide), alkoxy (dihydrdocarbylalkoxysiloxide), and bis (trihydrocarbylsiloxide), and bis (dihydrocarbylalkoxysiloxide). The hydrocarbyl group bonded to tin preferably has 4 or more carbon atoms, particularly preferably 4 to 8 carbon atoms.

Examples of the condensation-accelerating agent containing Zr, Bi, or Al as a metallic component (e.g., alkoxide, carboxylic acid salt, or acetylacetonato complex thereof) include the following (a) to (e):
(a) bismuth carboxylic acid salts;
(b) zirconium alkoxides;
(c) zirconium carboxylic acid salts;
(d) aluminum alkoxides; and
(e) aluminum carboxylic acid salts.

Specific examples include tris(2-ethylhexanoato)bismuth, tris(laurato)bismuth, tris(naphthenato)bismuth, tris(stearato) bismuth, tris(oleato)bismuth, tris(linolato)bismuth, tetraethoxyzirconium, tetra-n-propoxyzirconium, tetraisopropoxyzirconium, tetra-n-butoxyzirconium, tetra-sec-butoxyzirconium, tetra-tert-butoxyzirconium, tetra(2-ethylhexoxy)zirconium, zirconium tributoxystearate, zirconium tributoxyacetylacetonate, zirconium butoxybis(acetylacetonate), zirconium tributoxyethylacetoacetate, zirconium butoxyacetylacetonate bis(ethylacetoacetate), zirconium tetrakis(acetylacetonate), zirconium diacetylacetonate bis (ethylacetoacetate), bis(2-ethylhexanoato)zirconium oxide, bis(laurato)zirconium oxide, bis(naphthenato)zirconium oxide, bis(stearato)zirconium oxide, bis(oleato)zirconium oxide, bis(linolato)zirconium oxide, tetrakis(2-ethylhexanoato)zirconium, tetrakis(laurato)zirconium, tetrakis (naphthenato)zirconium, tetrakis(stearato)zirconium, tetrakis(oleato)zirconium, tetrakis(linolato)zirconium, triethoxyaluminum, tri-n-propoxyaluminum, triisopropoxyaluminum, tri-n-butoxyaluminum, tri-sec-butoxyaluminum, tri-tert-butoxyaluminum, tri(2-ethylhexoxy)aluminum, aluminum dibutoxystearate, aluminum dibutoxyacetylacetonate, aluminum butoxybis(acetylacetonate), aluminum dibutoxyethylacetoacetate, aluminum tris (acetylacetonate), aluminum tris(ethylacetoacetate), tris(2-ethylhexanoato)aluminum, tris(laurato)aluminum, tris (naphthenato)aluminum, tris(stearato)aluminum, tris(oleato) aluminum, and tris(linolato)aluminum.

Among them, tris(2-ethylhexanoato)bismuth, tetra-n-propoxyzirconium, tetra-n-butoxyzirconium, bis(2-ethylhexanoato)zirconium oxide, bis(oleato)zirconium oxide, triisopropoxyaluminum, tri-sec-butoxyaluminum, tris(2-ethylhexanoato)aluminum, tris(stearato)aluminum, zirconium tetrakis(acetylacetonate), and aluminum tris (acetylacetonate) are preferred.

The amount of the condensation-accelerating agent is preferably 0.1 to 10 parts by mass with respect to 100 parts by mass of the rubber ingredients of the rubber composition mentioned hereinbelow, more preferably 0.5 to 5 parts by mass. Through controlling the amount of the condensation-accelerating agent so as to fall within the above range, condensation reaction effectively proceeds.

In the present invention, condensation reaction is preferably carried out in an aqueous solution. The condensation reaction temperature is preferably 85 to 180° C., more preferably 100 to 170° C., particularly preferably 110 to 150° C. Through controlling the temperature during condensation reaction to fall within the above range, condensation reaction can be effectively completed, whereby aging reaction as elapse of time or other deterioration in quality of the produced modified conjugated diene-based polymer can be prevented.

The time of condensation reaction is generally about 5 minutes to about 10 hours, preferably about 15 minutes to about 5 hours. Through controlling the condensation reaction time to fall within the above range, condensation reaction can be smoothly completed.

The pressure of the reaction system during condensation reaction is generally 0.01 to 20 MPa, preferably 0.05 to 10 MPa.

No particular limitation is imposed on the mode of condensation reaction, and a batch-type reactor may be employed. Alternatively, the reaction may be carried out in a continuous manner by means of an apparatus such as a multi-step continuous reactor. In the course of condensation reaction, removal of solvent may be simultaneously performed.

After completion of the aforementioned hydrolyzation step or the hydrolyzation step and the condensation reaction step, for example, a solution of 2,6-di-t-butyl-p-cresol (BHT) in isopropanol is added to the polymerization reaction system, whereby polymerization reaction is terminated.

Thereafter, a solvent removal treatment (e.g., steam stripping (i.e., partial pressure of the solvent is reduced by feeding steam into the reaction mixture)) and a vacuum drying treatment are performed, to thereby yield the modified conjugated diene (co)polymer of the present invention.

In the modification reaction step, when a hydrocarbyloxysilane compound having a protected primary amino group is employed as the organic silane compound represented by formula (2), a deprotection treatment is also performed. In the deprotection treatment, the protective group bonded to the protected nitrogen atom is eliminated through the aforementioned hydrolyzation step or a solvent removal step employing steam (e.g., steam stripping), to thereby form a primary amino group. In addition, at any step from completion of the modification reaction step via solvent removal to formation of dry polymer, hydrolyzation of the protective group on the primary amino group may be optionally performed in accordance with needs through a various methods, to thereby form a free primary amino group. Thus, the protected primary amino group originating from the hydrocarbyloxysilane compound can be deprotected.

Next, the modified conjugated diene (co)polymer produced through the aforementioned production method of the present invention (hereinafter referred to as "modified conjugated diene (co)polymer I") will be described.

[Modified Conjugated Diene (Co)Polymer I]

The modified conjugated diene (co)polymer I of the present invention has, at a molecular end of the conjugated diene (co)polymer, a silanol group, and a functional group in the vicinity of the silanol group, the functional group accelerating reaction between the silanol group and the reinforcing filler.

More specifically, the modified conjugated diene (co) polymer I of the present invention is a modified conjugated diene (co)polymer represented by formula (3):

[F11]

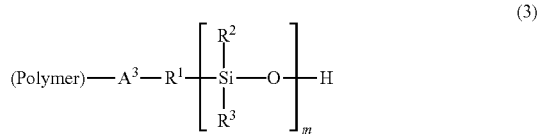

(3)

(wherein $R^1$ represents a single bond or a C1 to C20 divalent hydrocarbon group; each of $R^2$ and $R^3$ represents a hydrogen atom or a C1 to C20 monovelant hydrocarbon group; $A^3$ represents a functional group which promotes reaction between a silanol group and a reinforcing filler; and m is an integer of 1 to 10) or formula (4):

[F12]

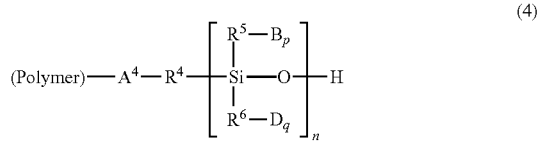

(4)

(wherein $R^4$ represents a single bond or a C1 to C20 hydrocarbon group; each of $R^5$ and $R^6$ represents a single bond, a hydrogen atom, or a C1 to C20 hydrocarbon group; $A^4$ represents a single bond, a C1 to C20 hydrocarbon group, or a functional group which promotes reaction between a silanol group and a reinforcing filler; each of B and D represents a group containing at least one functional group which promotes reaction between the silanol group and the reinforcing filler; each of p and q is an integer of 0 to 5; (p+q) is 1 or more; and n is an integer of 1 to 10, preferably 1 to 6).

The fragment "(Polymer)-" means a polymer chain of the modified conjugated diene (co)polymer.

In the aforementioned formula (3) or (4), specific examples of the C1 to C20 divalent hydrocarbon group represented by $R^1$, $R^4$, $R^5$ (p=1), or $R^6$ (q=1) include the same groups as mentioned in relation to examples of the C1 to C20 hydrocarbon group represented by $R^1$, $R^4$, $R^5$ (p=1), or $R^6$ (q=1) in formula (1) or (2).

In the aforementioned formula (3) or (4), specific examples of the C1 to C20 monovalent hydrocarbon group represented by $R^2$, $R^3$, $R^5$ (p=0), or $R^6$ (q=0) include the same groups as mentioned in relation to examples of the C1 to C20 monovalent hydrocarbon group represented by $R^2$, $R^3$, $R^5$ (p=0), or $R^6$ (q=0) in formula (1) or (2).

In formula (3) or (4), each of the functional groups $A^3$ and $A^4$ which promote reaction between the silanol group and the reinforcing filler is at least one divalent functional group selected from the group consisting of the divalent functional groups having at least one member selected from among a (thio)ether bond, a (thio)urethane bond, an imino bond, and an amido bond; and the divalent functional groups derived from a functional group selected from among a nitrile group (cyano group), a pyridyl group, an N-alkylpyrrolidonyl group, an N-alkylimidazolyl group, an N-alkylpyrazolyl group, a (thio)ketone group, a (thio)aldehyde group, an isocyanuric acid triester residue, a C1 to C20 (thio)carboxylic acid hydrocarbyl ester residue, a C1 to C20 (thio) carboxylic acid metal salt residue, a C1 to C20 carboxylic anhydride residue, a C1 to C20 carboxyl halide residue, and a carbonic acid dihydrocarbyl ester residue.

The divalent functional group selected from the group consisting of the divalent functional groups having at least one bond selected from among a (thio)ether bond, a (thio) urethane bond, an imino bond, and an amido bond may be a (thio)ether bond, a (thio)urethane bond, an imino bond, and an amido bond, or a C1 to C20 divalent hydrocarbon group having a (thio)ether bond, a (thio)urethane bond, an imino bond, and/or an amido bond. Specific examples of the C1 to C20 divalent hydrocarbon group include the same groups as mentioned in relation to examples of the hydrocarbon group represented by $R^1$, $R^4$, $R^5$ (p=1), or $R^6$ (q=1) in formula (1) or (2).

The group $A^3$ in formula (3) and group $A^4$ in formula (4) correspond to a functional group formed through bonding group $A^1$ in formula (1) to the active site of the modified conjugated diene (co)polymer and a functional group formed through bonding group $A^2$ in formula (2) to to the active site of the modified conjugated diene (co)polymer, respectively. The groups $A^3$ and $A^4$ promote reaction between the silanol group formed in the hydrolysis step and the reinforcing filler.

In the aforementioned formula (4), each of B and D containing at least one functional group which promotes reaction between the silanol group and the reinforcing filler is at least one functional group selected from among a primary amino group, a secondary amino group, a protected primary or secondary amino group, a tertiary amino group, a cyclic amino group, an oxazolyl group, an imidazolyl group, an aziridinyl group, a (thio)ketone group, a (thio) aldehyde group, an amido group, a (thio)epoxy group, a glycidoxy group, a (thio)isocyanato group, a nitrile group (cyano group), a pyridyl group, an N-alkylpyrrolidonyl group, an N-alkylimidazolyl group, an N-alkylpyrazolyl group, an imino group, an amido group, a ketimine group, an imine residue, an isocyanuric acid triester residue, a C1 to C20 (thio)carboxylic acid hydrocarbyl ester residue, a C1 to C20 (thio)carboxylic acid metallic salt residue, a C1 to C20 carboxylic anhydride residue, a C1 to C20 carboxyl halide residue, a carbonic acid dihydrocarbyl ester residue, and functional groups represented by formula -E-F-G.

In the formula -E-F-G, E represents an imino group, a divalent imine residue, a divalent pyridine residue, or a divalent amide residue; F represents a C1 to C20 alkylene group, a phenylene group, or a C8 to C20 aralkylene group; and G represents a primary amino group, a secondary amino group, a protected primary or secondary amino group, a tertiary amino group, a cyclic amino group, an oxazolyl group, an imidazolyl group, an aziridinyl group, a ketimine group, a nitrile group (cyano group), an amido group, a pyridine group, or a (thio)isocyanato group.

Specific examples of the functional group represented by formula -E-F-G include the same as described above.

Notably, the functional group which can eliminate and which is in the protected primary or secondary amino group may remain in the modified conjugated diene (co)polymer of the present invention without undergoing deprotection.

As shown in formula (3) or (4), the modified conjugated diene (co)polymer of the present invention preferably has only one silanol group in the molecular chain thereof. When two or more silanol groups are present in the molecular chain, two silanol groups undergo self-condensation, thereby elevating the viscosity of the modified conjugated diene (co)polymer, in some cases, impeding kneading operation.

The modified conjugated diene (co)polymer of the present invention has both a silanol group and, in the vicinoty of the silanol group, a functional group which promotes reaction between the silanol group and a reinforcing filler. Therefore, a silica-blended rubber composition and a carbon black-blended rubber composition containing the (co)polymer of the present invention exhibit improved heat-buildup-suppressing performance, as compared with a modified conjugated diene (co)polymer having a silanol group but no functional group which promotes reaction between the silanol group and a reinforcing filler, or with a modified conjugated diene (co)polymer having a functional group which promotes reaction between the silanol group and a reinforcing filler but no silanol group.

No particular limitation is imposed on the vinyl bond content of the conjugated diene portion of the modified conjugated diene (co)polymer of the present invention. However, the vinyl bond content is preferably 70% or less. When the vinyl bond content is 70% or less, a tire tread produced from the (co)polymer of the invention exhibits improved break and wear characteristics, which is preferred.

The styrene content is preferably 0 to 50 mass %. When the styrene content is 50 mass % or less, the balance between heat-buildup-suppressing performance and wet skid performance is improved.

The vinyl bond content was determined through an IR method (Morello method), and the styrene content was determined through calculation of integral ratios obtained through $^1$H-NMR spectrometry.

The rubber composition of the present invention (hereinafter referred to as "rubber composition I") will next be described.

[Rubber Composition I]

The rubber composition I of the present invention comprises the aforementioned modified conjugated diene (co) polymer I of the present invention and, preferably, an optional condensation-accelerating agent.

In the rubber composition I of the present invention, the modified conjugated diene (co)polymer I contained as an essential ingredient may be produced through the aforementioned production method of the present invention; i.e., may be a modified conjugated diene (co)polymer produced through modification reaction, hydrolysis reaction, and optional condensation reaction employing a condensation-accelerating agent. Alternatively, the modified conjugated diene (co)polymer I may be a modified conjugated diene (co)polymer produced through the same procedure but including no condensation reaction employing a condensation-accelerating agent. A modified conjugated diene (co) polymer I having a polar group which promotes reaction between silica and silanol is preferably used.

Examples of the silane compound for use in producing the modified conjugated diene (co)polymer I include compounds represented by formula (1) or (2). $A^1$, $R^1$ to $R^3$, —$OL^1$, and m in formula (1), and $A^2$, $R^4$ to $R^6$, B, D, —$OL^2$, n, p, and q in formula (2) have the same meanings as defined above.

The rubber composition I of the present invention may further contain a condensation-accelerating agent.

The condensation-accelerating agent may be added during synthesis of the modified conjugated diene (co)polymer, similar to the aforementioned production method of the present invention. Alternatively, the condensation-accelerating agent may be added at the preparation of the rubber composition I. Needless to say, both operations of addition may be combined.

The features of the condensation-accelerating agent are the same as described in relation to the condensation reaction in the method for producing a modified conjugated diene (co)polymer.

When the condensation-accelerating agent is added at the preparation of the rubber composition I, the agent and other ingredients are preferably kneaded together at the first stage generally at about 20 to about 185° C., preferably 60 to 175° C.

The rubber composition I preferably has a condensation-accelerating agent content of 0.1 to 10 parts by mass with respect to 100 parts by mass of the rubber ingredient, more preferably 0.5 to 5 parts by mass, from the viewpoint of reactibity of silica with silanol.

The rubber ingredient of the rubber composition I of the present invention is preferably formed from the modified conjugated diene (co)polymer I represented by formula (3) or (4) in an amount of 10 to 100 mass % and a diene-based rubber in an amount of 90 to 0 mass %. When the amount of the modified conjugated diene (co)polymer 1 is 10 mass % or more, the effects of the present invention can be fully attained. Examples of the diene-based rubber include, excepting the modified conjugated diene (co)polymer I of the present invention, polybutadiene, polyisoprene, polybutadiene-polyisoprene copolymer, styrene-butadiene copolymer, styrene-isoprene copolymer, styrene-isoprene-butadiene terpolymer, ethylene-propylene-diene terpolymer, butyl rubber, and halo-butyl rubber.

The rubber composition I of the present invention, which composition contains 100 parts by mass of the rubber ingredient formed from 10 to 100 mass % of the modified conjugated diene (co)polymer I of the present invention and 90 to 0 mass % of the diene-based rubber, preferably contains a reinforcing filler in an amount of 10 to 200 parts by mass, more preferably 20 to 120 parts by mass, particularly preferably 30 to 100 parts by mass.

The reinforcing filler is preferably carbon black and/or silica. Of these, silica is particularly preferably used as a reinforcing filler.

No particular limitation is imposed on the type of carbon black serving as a reinforcing filler, and GPF, FEF, SRF, HAF, N339, IISAF, ISAF, SAF, etc. are employed. The carbon black used in the invention preferably has a nitrogen adsorption specific area ($N_2SA$, determined in accordance with JIS K 6217-2: 2001) of 20 to 250 m$^2$/g.

As an optional reinforcing filler, silica may be used singly or in combination with carbon black. Any commercial silica products may be used. Among such commercial products, wet silica, dry silica, and colloidal silica are preferably used, with wet silica being particularly preferred. The silica product preferably has a BET specific surface area (determined in accordance with ISO 5794/1) of 100 m$^2$/g or more, more preferably 150 m$^2$/g or more, particularly preferably 170 m$^2$/g or more. Examples of such silica products which may be employed in the invention include commercial products Nipsil AQ (BET specific surface area: 190 m$^2$/g) and Nipsil KQ (products of Tosoh Silica Corporation) and Ultrasil VN3 (BET specific surface area: 175 m$^2$/g) (product of Degussa).

In the rubber composition I of the present invention, when silica is employed as a reinforcing filler, a silane coupling agent may be incorporated into the composition in order to further enhance reinforcing performance and heat-buildup-suppressing performance.

Examples of the silane coupling agent includes bis(3-triethoxysilylpropyl)tetrasulfide, bis(3-triethoxysilylpropyl) trisulfide, bis(3-triethoxysilylpropyl) disulfide, bis(2-triethoxysilylethyl)tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamonyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Among them, bis(3-triethoxysilylpropyl) polysulfide and 3-trimethoxysilylpropylbenzothiazyl tetrasulfide are preferred from the viewpoint of an effect for improving the reinforcing property.

These silane coupling agents may be used singly or in combination of two or more species.

The rubber composition I of the present invention employs, as a rubber component, a modified polymer in which a functional group having a high affinity to silica is introduced into an active site of the molecule thereof. Therefore, the amount of the silane coupling agent can be reduced as compared to the general cases. The amount of the silane coupling agent, which varies depending on the type of the agent, is preferably 1 to 20 mass % based on the silica. Through controlling the amount to fall within the above ranges, the effect of the coupling agent can sufficiently be attained, and gelation of the rubber component is prevented. From the viewpoint of fully attaining the effect of coupling agent and prevention of gelation, the amount of the silane coupling agent is preferably 5 to 15 mass %.

The rubber composition I of the present invention is preferably cross-linkable by sulfur, and sulfur is preferably used as a vulcanizing agent. The amount of vulcanizer is preferably 0.1 to 10 parts by mass as sulfur content (the total amount of sulfur and a sulfur-donor), with respect to 100 parts by mass of the rubber ingredient. Through controlling the amount to fall within the range, the vulcanized rubber composition has sufficient elastic modulus and strength and attains low fuel consumption. From this viewpoint, the sulfur content is more preferably 0.2 to 8 parts by mass.

So long as the objects of the present invention are not impeded, the rubber composition I of the present invention may further contain, in accordance with needs, a variety of chemicals usually used in the rubber industry. Examples of the chemicals include vulcanizing agents (other than sulfur), vulcanization-accelerators, process oils, plasticizers, anti-aging agents, scorch preventives, zinc oxide, stearic acid, thermosetting resins, and thermoplastic resins.

No particular limitation is imposed on the vulcanization-accelerator which may be used in the present invention. Examples of the vulcanization-accelerator include thiazoles such as M (2-mercaptobenzothiazole), DM (dibenzothiazyl disulfide), CZ (N-cyclohexyl-2-benzothiazylsulfenamide), and guanidines such as DPG (diphenylguanidine). The amount of vulcanization-accelerator is preferably 0.1 to 5.0 parts by mass with respect to 100 parts by mass of the rubber ingredient, more preferably 0.2 to 3.0 parts by mass.

Examples of the process oil serving as a softening agent which may be used in the rubber composition I of the present invention include paraffin oil, naphthene oil, and aromatic oil. For the purpose of tensile strength and wear resistance, aromatic oil is employed, and for the purpose of hysteresis loss and low-temperature characteristics, naphthene oil or paraffin oil is employed. The amount of process oil is preferably 0 to 100 parts by mass with respect to 100 parts by mass of the rubber ingredient. When the amount is 100 parts by mass or less, impairment in tensile strength of vulcanized rubber and in heat-buildup-suppressing performance (low fuel consumption) can be prevented.

Examples of the anti-aging agent which may be used in the rubber composition I of the present invention include 3C (N-isopropyl-N'-phenyl-p-phenylenediamine, 6C [N-(1,3-dimethylbutyl)-N'-phenyl-p-phenylenediamine], AW (6-ethoxy-2,2,4-trimethyl-1,2-dihydroquinoline), and diphenylamine-acetone high-temperature condensate. The amount of anti-aging agent is preferably 0.1 to 6.0 parts by mass with respect to 100 parts by mass of the rubber ingredient, more preferably 0.3 to 5.0 parts by mass.

The rubber composition I of the present invention can be formed through kneading the aforementioned ingredients by means of a kneader such as a Banbury mixer, a roller, or an internal mixer. After molding, the product is vulcanized, to thereby provide members of pneumatic tires, and industrial rubber products such as a belt-conveyer and rubber hoses.

The present invention also provides a pneumatic tire formed from the rubber composition I of the present invention (hereinafter may be referred to as "tire I").

The rubber composition II of the present invention will next be described.

[Rubber Composition II]

A characteristic feature of the rubber composition II of the present invention resides in that the composition comprises 100 parts by mass of (A) a rubber ingredient containing the aforementioned modified conjugated diene (co)polymer I, and 10 to 100 parts by mass of (B) carbon black having a nitrogen adsorption specific surface area ($N_2SA$) of 20 to 100 m$^2$/g.

In the rubber composition II of the present invention, the modified conjugated diene (co)polymer I (A) is preferably a modified conjugated diene-based polymer (a-1) having a structure represented by formula (11) and/or a modified conjugated diene-based polymer (a-2) having a structure represented by formula (12).

(Modified Conjugated Diene-Based Polymer (a-1))

In the rubber composition of the present invention, the modified conjugated diene-based polymer (a-1) employed in the rubber ingredient (A) has a molecular chain end represented by the following formula (11):

[F13]

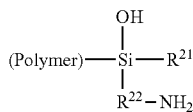

(11)

(wherein $R^{21}$ represents a C1 to C20 hydrocarbyl group and $R^{22}$ represents a C1 to C12 alkylene group).

Examples of the C1 to C20 hydrocarbyl group represented by $R^{21}$ include a C1 to C20 alkyl group, a C2 to C20 alkenyl group, a C6 to C20 aryl group, and a C7 to C20 aralkyl group. Of these, a C1 to C20 alkyl group is preferred. The C1 to C20 alkyl group may be linear, branched, or cyclic. Examples thereof include methyl, ethyl, n-propyl, isopropyl, n-butyl, isobutyl, sec-butyl, tert-butyl, pentyl groups, hexyl groups, octyl groups, decyl groups, dodecyl groups, tetradecyl groups, hexadecyl groups, octadecyl groups, icosyl groups, cyclopentyl, cyclohexyl, methylcyclopentyl, cyclopentylmethyl, methylcyclohexyl, and cyclohexylmethyl. Of these, methyl and ethyl are preferred, from the viewpoints of material availability and other factors.

The group $R^{22}$ is a C1 to C12 alkylene group which may be linear, branched, or cyclic. Specific examples include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, and cyclohexane-1,4-diyl. Of these, ethylene and propane-1,3-diyl are preferred, from the viewpoints of material availability, performance, and other factors.

The fragment "(Polymer)-" means a polymer chain of the conjugated diene-based polymer.

(Production of Modified Conjugated Diene-Based Polymer (a-1))

According to the present invention, the modified conjugated diene-based polymer (a-1) having a molecular chain end represented by formula (11) can be produced at high efficiency.

The method of the present invention for producing a modified conjugated diene-based polymer (a-1) comprises causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end for modification and, subsequently performing hydrolysis reaction and deprotection reaction. Through the production method, the modified conjugated diene-based polymer (a-1) having an end structure represented by formula (11) can be produced.

<Conjugated Diene-Based Polymer Having an Active End>

The conjugated diene-based polymer having an active end employed in the present invention is produced homopolymerization of a diene monomer or copolymerization of a diene monomer with another monomer. No particular limitation is imposed on the production method, and solution polymerization, vapor phase polymerization, or bulk polymerization may be employed. Among them, solution polymerization is particularly preferred. The mode of polymerization may be a batch manner or a continuous manner.

The metal of the active site present in the conjugated diene-based polymer is preferably one species selected from among alkali metals and alkaline earth metals. Among them, alkali metals are preferred, with lithium being particularly preferred.

In the solution polymerization method, a conjugated diene compound or a mixture of a conjugated diene compound and an aromatic vinyl compound is allowed to anionically polymerized in the presence of an organic alkali metal compound (particularly a lithium compound) serving as a polymerization initiator, whereby a polymer of interest can be produced.

In an effective manner, a halogen-containing monomer is used, and the halogen atoms in the polymer are activated by the organic metal compound. For example, bromine atoms of a isobutylene-p-methylstyrene-p-bromomethylstyrene copolymer are lithiated, to thereby provide active sites.

Examples of the aforementioned conjugated diene compound includes 1,3-butadiene, isoprene, 1,3-pentadiene, 2,3-dimethyl-1,3-butadiene, 2-phenyl-1,3-butadiene, and 1,3-hexadiene. These dienes may be used singly or in combination of two or more species. Among them, 1,3-butadiene, isoprene, and 2,3-dimethyl-1,3-butadiene are particularly preferred.

Examples of the aromatic vinyl compound used in copolymerization with these conjugated diene compounds includes styrene, α-methylstyrene, 1-vinylnaphthalene, 3-vinyltoluene, ethylvinylbenzene, divinylbenzene, cyclohexylstyrene, and 2,4,6-trimethylstyrene. These compounds may be used singly or in combination of two or more species. Among them, styrene is particularly preferred.

In the case where the conjugated diene compound and the aromatic vinyl compound are used as comonomers, use of 1,3-butadiene and styrene are particularly preferred, from the viewpoint of practical aspects including availability, and anionic polymerization characteristics including a living property.

When solution polymerization is employed, the monomer concentration of the solution is preferably 5 to 50 mass %, more preferably 10 to 30 mass %. When the conjugated diene compound and the aromatic vinyl compound are used as comonomers, the monomer mixture preferably has an aromatic vinyl compound content falling within a range 0 to 55 mass %.

No particular limitation is imposed on the lithium compound serving as a polymerization initiator, and a hydrocarbyllithium and a lithiumamide compound are preferably used. When a hydrocarbyllithium is used, a conjugated diene-based polymer which has a hydrocarbyl group at a polymerization-initiating end and a polymerization active site at the other end is produced, whereas when the lithiumamide compound is used, a conjugated diene-based polymer which has a nitrogen-containing group at a polymerization-initiating end and a polymerization active site at the other end is produced.

The details of the hydrocarbyllithium and lithiumamide compound are the same as mentioned in relation to the method of the present invention for producing a modified conjugated diene (co)polymer.

No particular limitation is imposed on the method for producing a conjugated diene-based polymer through anionic polymerization employing the aforementioned lithium compound serving as a polymerization initiator, and any conventionally known methods may be employed.

In a specific procedure, a conjugated diene compound or a mixture of a conjugated diene compound and an aromatic vinyl compound is anionically polymerized in the presence of the lithium compound serving as a polymerization initiator and an optional randomizer in an organic solvent which is inert to the reaction, to thereby produce a conjugated diene-based polymer of interest. Examples of the hydrocarbon solvent include aliphatic, alicyclic, and aromatic hydrocarbon compounds.

The hydrocarbon solvent is preferably a C3 to C8 hydrocarbon. Specific examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These hydrocarbons may be used singly or in combination of two or more species.

The randomizer, which may be used in accordance with needs, is a compound which is capable of controlling a microstructure of a conjugated diene-based polymer (e.g., increasing 1,2-butadiene units in a butadiene-styrene copolymer or 3,4-bonds in an isoprene polymer) or controlling of the monomer unit composition distribution profile of a conjugated diene compound-aromatic vinyl compound copolymer (e.g., randomization in butadiene units and styrene units in a butadiene-styrene copolymer). No particular limitation is imposed on the type of randomizer, and any of compounds known as a randomizer may appropriately employed. Specific examples of the randomizer include ethers and tertiary amines such as dimethoxybenzene, tetrahydrofuran, dimethoxyethane, diethylene glycol dibutyl ether, diethylene glycol dimethyl ether, oxoranylpropane oligomers (particularly 2,2-bis(2-tetrahydrofuryl)propane), triethylamine, pyridine, N-methylmorpholine, N,N,N',N'-tetramethylethylenediamine and 1,2-piperidinoethane. Further, potassium salts such as potassium t-amylate and potassium t-butoxide and sodium salts such as sodium t-amylate may also be employed.

These randomizers may be used singly or in combination of two or more species. The randomizer is preferably employed in an amount 0.01 to 1,000 mole equivalents per mole of the lithium compound.

The polymerization reaction is preferably carried out at 0 to 150° C., more preferably 20 to 130° C. The polymerization reaction may be carried out under generated pressure. In a general procedure, the pressure is preferably selected such that the monomer is maintained virtually as a liquid phase. That is, a higher pressure may be employed in accordance with needs, although depending on the individual substances to be polymerized, polymerization solvent, and polymerization temperature. Such pressure may be obtained through an appropriate method such as applying pressure to a reactor by use of gas inert to the polymerization reaction.

In the polymerization, all the raw materials involved in polymerization such as a polymerization initiator, a solvent, monomers, etc. are preferably employed after removing reaction-inhibiting substances such as water, oxygen, carbon dioxide, and protic compounds.

In order to produce an elastomeric polymer, the formed polymer or copolymer preferably has a glass transition temperature (Tg) of −95° C. to −15° C., as determined through differential thermal analysis. Through controlling of the glass transition temperature to fall within the above range, increase in viscosity is prevented, whereby a polymer which can be easily handled can be obtained.

<Compound Containing a Bi-Functional Silicon Atom>

In the present invention, a compound containing a bi-functional silicon atom to which one hydrocarbyloxy group and one reactive group are directly bonded and to which one protected primary amino group is bonded via an alkylene group (hereinafter may be referred to as "modifying agent") is caused to react with the active end of the thus-produced conjugate diene-based polymer having the active end for modification.

Examples of the modifying agent include silicon compounds represented by formula (13), (14), or (15).

[F14]

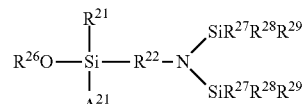

(13)

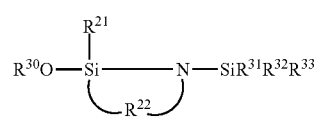

(14)

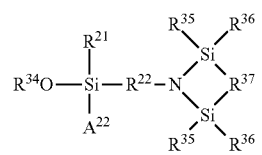

(15)

(wherein each of $R^{26}$ to $R^{36}$ represents a C1 to C20 hydrocarbyl group; $R^{37}$ represents a C1 to C12 alkylene group; each of $A^{21}$ and $A^{22}$ represents a reactive group, specifically, a halogen atom or a C1 to C20 hydrocarbyloxy group; and $R^{21}$ and $R^{22}$ have the same meanings as defined above).

The details of the C1 to C20 hydrocarbyl group are the same as mentioned in relation to the $R^{21}$ in formula (11) and $R^{23}$ in formula (12). Examples of the C1 to C12 alkylene group represented by $R^{37}$ include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, and cyclohexane-1,4-diyl.

When each of the reactive groups $A^{21}$ and $A^{22}$ in the modifying agent is a hydrocarbyloxy group, examples of the modifying agent include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2,2-ethoxymethyl-1-aza-2-silacyclopentane, and 3-(2,2,5,5-tetramethyl(1-aza-2,5-disilacyclopentan)-1-yl)propylmethyldiethoxysilane.

When each of the reactive groups $A^{21}$ and $A^{22}$ is a halogen atom, examples of the modifying agent include N,N-bis(trimethylsilyl)aminopropylmethylmethoxychlorosilane, N,N-bis(trimethylsilyl)aminopropylmethylethoxychlorosilane, N,N-bis(trimethylsilyl)aminoethylmethylmethoxychlorosilane, and N,N-bis(trimethylsilyl)aminoethylmethylethoxychlorosilane.

The modifying agent is preferably N,N-bis(trimethylsilyl)aminopropylmethyldimethoxysilane, N,N-bis(trimethylsilyl)aminopropylmethyldiethoxysilane, 1-trimethylsilyl-2,2-ethoxymethyl-1-aza-2-silacyclopentane, or 3-(2,2,5,5-tetramethyl(1-aza-2,5-disilacyclopentan-1-yl)propylmethyldiethoxysilane.

These modifying agents may be used singly or in combination of two or more species, and may be a partial condensate.

As used herein, the term "partial condensate" means a condensation product in which a part (not entirety) of Si—OR moieties are condensed to form Si—O—Si bonds.

The conjugated diene-based polymer which is subjected to the modification reaction preferably contains at least 10% of living polymer chains.

During modification reaction, the above modifying agent is preferably employed in an amount of 0.5 to 200 mmol/kg (conjugated diene-based polymer), more preferably 1 to 100 mmol/kg (conjugated diene-based polymer), particularly preferably 2 to 50 mmol/kg (conjugated diene-based polymer). In the unit of the amount, the "conjugated diene-based polymer" means the mass of polymer not containing additives such as an anti-aging agent added during or after the production of the diene polymer. Through controlling the amount of the modifying agent employed so as to fall within the above ranges, high dispersibility of carbon black can be attained, and mechanical characteristics, wear resistance, and heat-buildup-suppressing performance after vulcanization can be enhanced.

No particular limitation is imposed on the method of adding the above modifying agent, and one batch addition, divided addition, continuous addition, etc. may be employed. Among them, one batch addition is preferred.

In the present invention, the active end of the conjugated diene-based polymer is subjected to modification reaction, and then hydrolysis reaction and deprotection reaction are performed, whereby the hydrolyzable functional group (e.g., a hydrocarbyloxy group or a halogen atom) bonded to the Si atom is transformed to a hydroxy group, and the protected primary amino group is deprotected to form a corresponding free primary amine.

The hydrolysis reaction is preferably performed through addition of a basic compound and water. The basic compound and water may be added simultaneously. In an alternative manner, the basic compound or an aqueous solution of the basic compound is added to a polymerization reaction system, and the pH of the reaction system is adjusted to 9 to 13, preferably 10 to 11. After confirmation of the pH, water in an amount which exceeds the amount of Li (initiator, by mole); e.g., 2 to 4 times, is added, and the polymerization reaction system is preferably stirred for, for example, 10 minutes to several hours until termination of reaction.

The basic compound is preferably an alkali metal hydroxide such as sodium hydroxide or potassium hydroxide from the viewpoint of cost, with sodium hydroxide being particularly preferred.

After completion of hydrolyzation or deprotection, for example, a solution of 2,6-di-t-butyl-p-cresol (BHT) in isopropanol is added to the polymerization reaction system, whereby polymerization reaction is terminated.

Thereafter, a solvent removal treatment (e.g., steam stripping (i.e., partial pressure of the solvent is reduced by feeding steam into the reaction mixture)) and a vacuum drying treatment are performed, to thereby yield the modified conjugated diene-based polymer (a-1) having a molecular chain end represented by formula (11).

(Modified Conjugated Diene-Based Polymer (a-2))

In the rubber composition II of the present invention, the modified conjugated diene-based polymer (a-2) employed in the rubber ingredient (A) has a molecular chain end represented by the following formula (12):

[F15]

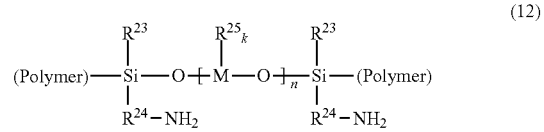

(wherein $R^{23}$ represents a C1 to C20 hydrocarbyl group; $R^{24}$ represents a C1 to C12 alkylene group; $R^{25}$ represents a C1 to C20 hydrocarbyl group, a C2 to C20 hydrocarbylcarboxyl group, a —OH group, or a C5 to C20 1,3-dicarbonyl-containing group; when a plurality of $R^{25}$ are present, they may be identical to or different from one another (when one $R^{25}$ is a —OH group, the other group(s) is(are) preferably a group other than a —OH group); M represents Ti, Sn, Al, Si, or Bi; k is (valence of M)–2; and n is 0 or 1).

The details of the C1 to C20 hydrocarbyl group represented by $R^{23}$ or $R^{25}$ are the same as mentioned in relation to $R^{21}$ in formula (11). Similarly, the details of the C1 to C12 alkylene group represented by $R^{24}$ are the same as mentioned in relation to $R^{22}$ in formula (11).

The fragment "(Polymer)-" means a polymer chain of the conjugated diene-based polymer.

(Production of Modified Conjugated Diene-Based Polymer (a-2))

According to the present invention, the modified conjugated diene-based polymer (a-2) having a molecular chain end represented by formula (12) can be produced at high efficiency.

The method of the present invention for producing a modified conjugated diene-based polymer (a-2) comprises performing (a) a modification step of causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end; (b) a condensation reaction step of performing condensation reaction involving the compound containing a bi-functional silicon atom in the presence of at least one condensation-accelerating agent selected from among a titanium-containing agent, a tin-containing agent, an aluminum-containing agent, a silicon-containing agent, a zirconium-containing agent, and a bismuth-containing agent; and (c) a step of performing hydrolysis reaction and deprotection reaction. Through the production method, the modified conjugated diene-based polymer (a-2) represented by formula (12) can be produced.

In the method for producing a modified conjugated diene-based polymer (a-2), the modification reaction step (a) is the same as the modification reaction in the aforementioned method for producing a modified conjugated diene-based polymer (a-1). However, in the method for producing a modified conjugated diene-based polymer (a-2), after completion of the modification reaction step (a), (b) a step of performing condensation reaction involving the compound containing a bi-functional silicon atom used in the step (a) in the presence of a condensation-accelerating agent is performed.

<Condensation-Accelerating Agent>

The condensation-accelerating agent employed in the step (b) is preferably at least one metal compound selected from among a titanium compound, a tin compound, an aluminum compound, a silicon compound, a zirconium compound, and a bismuth compound. More specifically, examples of preferred titanium compounds include alkoxides, carboxylic acid salts, acetylacetonao complexes of titanium(IV), and salt mixtures thereof. Examples of preferred tin compounds include tin(II) dicarboxylates (particularly bis(hydrocarbylcarboxylic acid) salts), dihydrocarbyltin(IV) dicarboxylic acid salts (including bis(dihydrocarbylcarboxylic acid) salts), bis((β-diketonato)tin(IV), tin(IV) alkoxyhalides, and tin(IV) monocarboxylic acid salt hydroxides. The hydrocarbyl group bonded to tin preferably has 4 or more carbon atoms, particularly preferably 4 to 8 carbon atoms.

Examples of preferred aluminum compounds include aluminum(III) alkoxides, aluminum(III) carboxylic acid salts, aluminum(III) acetylacetonato complexes, and salt mixtures thereof.

Thus, the condensation-accelerating agent is preferably at least one member selected from among alkoxides, carboxylic acid salts, acetylacetonato complexes, of titanium, tin, and aluminum, and salt mixtures thereof.

Among the aforementioned condensation-accelerating agents, titanium compounds are particularly preferred. Specifically, alkoxides, carboxylic acid salts, and acetylacetonato complexes of titanium(Ti) are preferably used.

Specific examples of the titanium condensation-accelerating agent, tin condensation-accelerating agent, aluminum condensation-accelerating agent, bismuth condensation-accelerating agent, and zirconium condensation-accelerating agent are the same as mentioned in relation to the method of the present invention for producing a modified conjugated diene (co)polymer.

In the condensation reaction of the present invention, the condensation-accelerating agent and water are used in combination. Other than pure water, aqueous solutions (e.g., alcohol solution), dispersion micelle in hydrocarbon solvent, etc. are preferably employed. If required, water intrinsically contained in a compound that can release water in the reaction system (e.g., water adsorbed on solid surface or hydration water) may also be effectively used. Thus, in a preferred mode, a solid containing adsorbed water or a compound such as a hydrate that readily releases water is used in combination with the condensation-accelerating agent.

The condensation-accelerating agent and water may separately fed to the reaction system. Alternatively, the agent and water may be mixed immediately before use, and the mixture may be fed to the reaction system. However, long-term storage of the mixture is not preferred, since a metal compound in the mixture may decompose.

When water is fed to the reaction system, it may be mixed with an organic solvent that is compatible with water (e.g., alcohol) to form solution. Needless to say, water may be directly added to a hydrocarbon solution for dispersion through various chemical engineering techniques. Yet alternatively, water may be added after completion of condensation reaction, through a technique, for example, steam stripping.

The amount (by mole ratio) of the condensation-accelerating agent used in the reaction system is preferably 0.1 to 10 with respect to the total amount of hydrocarbyloxy groups present in the reaction system, particularly preferably 0.5 to 5. Through controlling the amount of the condensation-accelerating agent to fall within the ranges, condensation reaction efficiently proceeds.

The amount (by mole ratio) of water is preferably 0.1 or more with respect to the total amount of hydrocarbyloxysilyl groups present in the reaction system. The upper limit of the amount of water varies depending on the purpose and reaction conditions. However, the amount of effective water is preferably 0.5 to 3 mol-eqv. with respect to the total amount of hydrocarbyloxysilyl groups bonded to the active sites of the polymer before condensation treatment.

The condensation reaction employing the condensation-accelerating agent is preferably performed at 20° C. or higher, more preferably 30 to 120° C. The reaction time is 0.5 minutes to 10 hours, preferably 0.5 minutes to 5 hours, more preferably about 0.5 to about 120 minutes, still more preferably 3 to 60 minutes.

The pressure of the reaction system during condensation reaction is generally 0.01 to 20 MPa, preferably 0.05 to 10 MPa.

In the present invention, no particular limitation is imposed on the mode of condensation reaction, and a batch-type reactor may be employed. Alternatively, the reaction may be carried out in a continuous manner by means of an apparatus such as a multi-step continuous reactor. In the course of condensation reaction, removal of solvent may be simultaneously performed.

After performing of the condensation reaction, hydrolysis reaction and deprotection reaction are performed (step (c)). The hydrolysis reaction and deprotection reaction may be performed in the same manner as mentioned in relation to the method for producing a modified conjugated diene-based polymer (a-1).

Similar to the case of the method for producing a modified conjugated diene-based polymer (a-1), after completion of hydrolysis reaction and deprotection reaction are performed (step (c)), for example, a solution of 2,6-di-t-butyl-p-cresol (BHT) in isopropanol is added to the polymerization reaction system, whereby polymerization reaction is terminated. Thereafter, solvent-removal treatment (e.g., steam stripping) and drying (e.g., hot-roller drying or vacuum drying) are performed, whereby a modified conjugated diene-based polymer (a-2) having a molecular chain end whose structure is represented by formula (12) is yielded.

((A) Rubber Ingredient)

The rubber ingredient (A) in the rubber composition II of the present invention may be formed from one species of the modified conjugated diene-based polymer (a-1) having a molecular chain end represented by formula (11) produced through the aforementioned method, or from two or more species thereof in combination. Alternatively, the rubber ingredient (A) may be formed from one species of the modified conjugated diene-based polymer (a-2) having a molecular chain end represented by formula (12), or from two or more species thereof in combination. Yet alternatively, the rubber ingredient (A) may be formed from one or more species of the modified conjugated diene-based polymer (a-1) and one or more species of the modified conjugated diene-based polymer (a-2), in combination.

The modified conjugated diene-based polymer ((a-1) and/or (a-2)) content of the rubber ingredient (A) is preferably 10 mass % or more, more preferably 50 mass % or more. When the modified conjugated diene-based polymer content is 10 mass % or more, the effects of the present invention can be fully attained.

Examples of the additional rubber ingredient used in combination with the modified conjugated diene-based polymer (a-1) and/or (a-2) in the rubber composition II of the present invention include natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, halo-butyl rubber, and mixtures thereof. These rubbers may have a multi-functional (i.e., branched) structure formed by use of a modifying agent such as tin tetrachloride or silicon tetrachloride.

Each of the modified conjugated diene-based polymers (a-1) and (a-2) employed in the rubber composition II of the present invention preferably has a weight average molecular weight (Mw) of $50 \times 10^3$ to $1,000 \times 10^3$, more preferably $100 \times 10^3$ to $600 \times 10^3$. The molecular weight distribution factor (Mw/Mn) is preferably 5 or less, more preferably 3 or less. Through controlling the weight average molecular weight of the modified conjugated diene-based polymer to fall within the above ranges, a decrease in elastic modulus of vulcanized products and an increase in hysteresis loss can be prevented to realize excellent breakage-resistant characteristics, and a rubber composition containing the modified conjugated diene-based polymer can be processed with excellent kneadability. Through controlling the molecular weight distribution factor of the modified conjugated diene-based polymer to fall within the above ranges, processability of a rubber composition containing the modified conjugated diene-based polymer is not reduced to ensure high kneadability, and the physical properties of the rubber composition can be fully improved.

The weight average molecular weight (Mw) and the molecular weight distribution factor were determined by means of a GPC (HLC-8020, product of Tosoh Corporation) with a refractometer as a detector. The values were reduced to single-peak-profile polystyrene as a standard. The column employed is GMHXL (product of Tosoh Corporation), and the eluent employed is tetrahydrofuran.

Each of the modified conjugated diene-based polymers (a-1) and (a-2) employed in the rubber composition II of the present invention preferably has a vinyl bond content (in conjugated diene segments) of 50% or less, more preferably 30% or less, from the viewpoint of enhancement of durability of the rubber composition. The vinyl bond content was determined through an IR method (Morello method).

Meanwhile, The Society of Rubber Industry, Japan has set a goal of reduction in volatile organic compound (VOC) to 65%. Therefore, the rubber composition II of the present invention preferably exhibits a volatile organic compound (VOC) generation amount (measured through the method described hereinbelow) of 65% or less the currently attained level, more preferably 50% or less, particularly preferably 35% or less. When the VOC generation level exceeds 65% the current level, air bubbles may generate in rubber material during extrusion, and a heavy load is imposed on the environment, which is not preferred.

<Measurement of VOC>

A sample is treated with a siloxane-hydrolyzing reagent (0.2 mol/L-toluenesulfonic acid/0.24 mol/L-water) in a solvent (15 mass % n-butanol and 85 mass % toluene). The amount of ethanol is stoichiometrically calculated from [EtOSi] (remaining in an unvulcanized rubber composition) values determined through head space/gas chromatography.

(Carbon Black)

The rubber composition II of the present invention comprises (A) the rubber ingredient in an amount of 100 parts by mass and (B) carbon black having a nitrogen adsorption specific area ($N_2SA$) of 20 to 100 $m^2/g$ in an amount of 10 to 100 parts by mass.

Each of the modified conjugated diene-based polymer (a-1) and (a-2) employed in the rubber composition II of the present invention has a free primary amino group at a molecular chain end. The primary amino group has remarkably high interaction particularly to carbon black having an $N_2SA$ of 100 $m^2/g$ or less, leading to provision of a rubber composition having excellent heat-buildup-suppressing performance (low fuel consumption). However, the primary amino group fails to attain sufficient effects when carbon black having an $N_2SA$ in excess of 100 $m^2/g$. When $N_2SA$ is less than 20 $m^2/g$, reinforcement effect is insufficient, and sufficient durability cannot be obtained. Thus, $N_2SA$ is preferably 20 to 95 $m^2/g$, more preferably 25 to 90 $m^2/g$. Note that the $N_2SA$ is determined in accordance with JIS K 6217-2:2001.

Examples of such carbon black products include HAF, FEF, GPF, SRF, N339, and IISAF-HS(N285).

When the carbon black content with respect to 100 parts by mass of rubber ingredient (A) is less than 10 parts by mass, the rubber composition fails to have sufficient reinforcement effect, whereas when the carbon black content is in excess of 100 parts by mass, difficulty is encountered in kneading or extrusion. Thus, the carbon black content is preferably 20 to 80 parts by mass, more preferably 30 to 70 parts by mass.

(Other Ingredients of Rubber Composition)

The rubber composition II of the present invention is preferably cross-linkable by sulfur, and sulfur is preferably used as a vulcanizing agent. The amount of vulcanizer is preferably 0.1 to 10 parts by mass as sulfur content (the total amount of sulfur and a sulfur-donor), with respect to 100 parts by mass of the rubber ingredient. Through controlling the amount to fall within the range, the vulcanized rubber composition has sufficient elastic modulus and strength and attains low fuel consumption. From this viewpoint, the sulfur content is more preferably 0.5 to 5 parts by mass.

So long as the objects of the present invention are not impeded, the rubber composition II of the present invention may further contain, in accordance with needs, a variety of chemicals usually used in the rubber industry. Examples of the chemicals include vulcanizing agents (other than sulfur), vulcanization-accelerators, process oils, plasticizers, anti-aging agents, scorch preventives, zinc oxide, stearic acid, thermosetting resins, and thermoplastic resins.

No particular limitation is imposed on the vulcanization-accelerator which may be used in the present invention. Examples of the vulcanization-accelerator include thiazoles such as M (2-mercaptobenzothiazole), DM (dibenzothiazyl disulfide), CZ (N-cyclohexyl-2-benzothiadiylsulfenamide), and guanidines such as DPG (diphenylguanidine). The amount of vulcanization-accelerator is preferably 0.1 to 5.0 parts by mass with respect to 100 parts by mass of the rubber ingredient, more preferably 0.2 to 3.0 parts by mass.

Examples of the process oil serving as a softening agent which may be used in the rubber composition II of the present invention include paraffin oil, naphthene oil, and aromatic oil. For the purpose of tensile strength and wear resistance, aromatic oil is employed, and for the purpose of low-temperature characteristics, naphthene oil or paraffin oil is employed. The amount of process oil is preferably 0 to 100 parts by mass with respect to 100 parts by mass of the rubber ingredient. When the amount is 100 parts by mass or less, impairment in tensile strength of vulcanized rubber and in heat-buildup-suppressing performance (low fuel consumption) can be prevented.

Examples of the anti-aging agent which may be used in the rubber composition II of the present invention include 3C (N-isopropyl-N'-phenyl-p-phenylenediamine, 6C [N-(1,3-dimethylbutyl)-N'-phenyl-p-phenylenediamine], AW (6-ethoxy-2,2,4-trimethyl-1,2-dihydroquinoline), and diphenylamine-acetone high-temperature condensate. The amount of anti-aging agent is preferably 0.1 to 6.0 parts by mass with respect to 100 parts by mass of the rubber ingredient, more preferably 0.3 to 5.0 parts by mass.

[Preparation of Rubber Composition II and Production of Tire II]

The rubber composition II of the present invention can be formed through kneading the aforementioned ingredients by means of a kneader such as a Banbury mixer, a roller, or an internal mixer. After molding, the product is vulcanized, to thereby provide members of tires, particularly pneumatic tires, such as a sidewall, a side-reinforcing layer, and a bead filler.

The tire II of the present invention is produced from the rubber composition II of the present invention, from which a sidewall, a side-reinforcing layer, a bead filler, etc. of the tire are formed. The tire II is produced through a conventional method for producing pneumatic tires, run-flat tires, etc. Specifically, the rubber composition of the present invention containing the aforementioned chemicals, in an unvulcanized state, is worked to form tire members. The composition is applied onto a tire-forming machine through a conventional method, whereby a green tire is formed. The green tire is heated under pressure in by means of a vulcanization apparatus, to thereby produce a tire.

The thus-produced tire II of the present invention exhibits reduced rolling resistance under normal running conditions and improved fuel cost performance. In addition, when a side-reinforcing layer and a bead filler of a run-flat tire are produced from the rubber composition, the produced tire exhibits improved fuel cost performance under normal running conditions and improved durability in a run-flat running state.

The tire III of the present invention will next be described.

[Tire III]

Firstly, the tire III of the present invention will be described with reference to the drawing. FIG. 1 is a schematic cross-sectional view of an embodiment of the tire of the present invention.

In a preferred embodiment of the tire III of the present invention shown in FIG. 1, the tire has a carcass layer 2 which toroidally extends between a pair of bead cores 1, 1' and which is formed of at least one radial carcass ply having ends that roll up the bead core 1 from the inside to the outside of the tire; a side rubber layer 3 which is disposed in a side portion of the carcass 2 on the outside with respect the tire axis to form an outer portion; a tread rubber layer 4 which is disposed in a crown region of the carcass layer 2 on the outside with respect the tire axis to form a ground portion; a belt layer 5 which is disposed between the tread rubber layer 4 and the crown region of the carcass 2 to form a reinforcement belt; an inner liner 6 which is disposed on the entire inner surface of the carcass 2 of the tire to form air-seal film; a bead filler 7 which is disposed between the main body of the carcass layer 2 extending from the bead core 1 to the other bead core 1' (not shown) and a rolled up portion which is rolled up by the bead core 1; and at least one side-reinforcing layer 8 which is disposed from a side portion of the bead filler 7 of the side region of the carcass layer to a shoulder region 10 and between the carcass layer 2 and the inner liner 6 and which has a generally crescent cross-section along the tire rotation axis. The side-reinforcing layer 8 and/or the bead filler 7 is formed from the aforementioned rubber composition III comprising 100 parts by mass of a rubber ingredient containing ≥10 mass % of the aforementioned modified conjugated diene (co)polymer I of the present invention, and 10 to 100 parts by mass of carbon black having a nitrogen adsorption specific area of 20 to 90 m$^2$/g.

The modified conjugated diene (co)polymer I employed in the rubber composition III is preferably a modified conjugated diene-based polymer III which is produced through modification reaction between an end of a conjugated diene-based polymer and a primary amino group or an alkoxysilane compound containing a precursor that can form a primary amino group through hydrolysis, to thereby incorporate into the end the primary amino group or the precursor that can form a primary amino group through hydrolysis; and adding a condensation-accelerating agent to the modification reaction system in the course of and/or after the modification reaction. The primary amino group is formed through incorporation of the precursor that can form a primary amino group through hydrolysis in the modification reaction and that is in a state before hydrolysis (i.e., a protected state) and subsequent (i.e., after completion of modification reaction) a solvent-removal treatment employing steam (e.g., steam stripping) or a treatment with water or intentional hydrolysis. However, even though the precursor that can form a primary amino group through hydrolysis remains in the modified conjugated diene-based polymer in a non-hydrolyzed state, the precursor that can form a primary amino group through hydrolysis may be in a non-hydrolyzed state before kneading, since the protective group protecting the primary amino group is eliminated during kneading of the modified conjugated diene-based polymer, to thereby form the primary amino group.

The conjugated diene-based polymer modified with an alkoxysilane compound having no primary amino group has high interaction with silica but low interaction with carbon black. Thus, the effect of reinforcing carbon black is weak. On the other hand, the conjugated diene-based polymer modified with an alkoxysilane compound having a primary amino group has high interaction with carbon black. Thus, the effect of reinforcing carbon black is strong.

Generally, the conjugated diene-based polymer modified with an alkoxysilane compound is further polymerized via reaction between polymer chains thereof, resulting in an increase in viscosity of unvulcanized rubber composition to provide impaired processability. In contrast, the modified conjugated diene-based polymer III of the present invention, which is a conjugated diene-based polymer modified with an alkoxysilane compound having a primary amino group produced by adding a condensation-accelerating agent to the reaction system in the course of and/or after the modification reaction to proceed the condensation reaction in the presence of steam or water, undergoes no excessive further polymerization, not resulting in an increase in viscosity of unvulcanized rubber composition to provide impaired processability.

The rubber composition III of the present invention preferably contains the modified conjugated diene-based polymer III in an amount of 10 mass % or more with respect to 100 parts by mass of the rubber ingredient. When the rubber ingredient (100 parts by mass) has a modified conjugated diene-based polymer III content of 10 mass % or more, the rubber composition fully exhibits heat-buildup-suppressing performance, leading to improvement in durability in the run-flat running state and rolling resistance in under normal running conditions. In order to further improve heat-buildup-suppressing performance of the rubber composition, the rubber ingredient (100 parts by mass) more preferably has a modified conjugated diene-based polymer III content of 52 mass % or more, particularly preferably 55 mass % or more.

The conjugated diene-based polymer III of the present invention is produced homopolymerization of a conjugated diene compound or copolymerization of a conjugated diene compound with an aromatic vinyl compound. No particular limitation is imposed on the production method, and solution polymerization, vapor phase polymerization, or bulk polymerization may be employed. Among them, solution polymerization is particularly preferred. The mode of polymerization may be a batch manner or a continuous manner, and a batch manner is preferred for narrowing the molecular weight distribution profile peak.

The conjugated diene-based polymer preferably has a glass transition temperature of −30° C. or lower.

Examples of the aforementioned conjugated diene compound includes 1,3-butadiene, isoprene, 1,3-pentadiene, 2,3-dimethyl-1,3-butadiene, 2-phenyl-1,3-butadiene, and 1,3-hexadiene. These dienes may be used singly or in combination of two or more species. Among them, 1,3-butadiene is particularly preferred.

Examples of the aromatic vinyl compound used in copolymerization with these conjugated diene compounds includes styrene, α-methylstyrene, 1-vinylnaphthalene, 3-vinyltoluene, ethylvinylbenzene, divinylbenzene, 4-cyclohexylstyrene, and 2,4,6-trimethylstyrene. These compounds may be used singly or in combination of two or more species. Among them, styrene is particularly preferred.

Next, the polymerization reaction system will be described. In order to react the end of a living conjugated diene-based polymer (in a state where polymerization reaction is not terminated) (hereinafter may be referred to as "active end") with a modifying agent to thereby incorporate a primary amino group or a precursor that can form a primary amino group through hydrolysis,
at least 10% of the polymer chains of the employed polymer preferably have living or pseudo-living property. Examples of such living polymerization reaction include anionic polymerization of a conjugated diene compound or a mixture of a conjugated diene and an aromatic vinyl compound in organic solvent in the presence of an alkali metal compound serving as an initiator; and coordination anionic polymerization of a conjugated diene compound or a mixture of a conjugated diene and an aromatic vinyl compound in the presence of a catalyst containing a lanthanum-series rare earth element compound.

The alkali metal compound employed as the anionic polymerization initiator is preferably a lithium compound. No particular limitation is imposed on the lithium compound, and a hydrocarbyllithium and a lithiumamide compound are preferably used. When a hydrocarbyllithium is used, a conjugated diene-based polymer which has a hydrocarbyl group at a polymerization-initiating end and a polymerization active site at the other end is produced, whereas when the lithiumamide compound is used, a conjugated diene-based polymer which has a nitrogen-containing group at a polymerization-initiating end and a polymerization active site at the other end is produced.

The details of the hydrocarbyllithium and lithiumamide compound are the same as mentioned in relation to the method of the present invention for producing a modified conjugated diene (co)polymer.

In one preferred embodiment, a lithiumamide compound is formed in advance in the presence of a soluble ingredient (SOL) as disclosed in Japanese Patent Application Laid-Open (kokai) No. 06-206920 or in the absence of soluble ingredient as disclosed in Japanese Patent Application Laid-Open (kokai) No. 06-199922, and the formed lithiumamide compound is employed as a polymerization initiator. In another preferred embodiment, a lithiumamide compound is formed directly in a polymerization system (in situ) without performing preliminary preparation as disclosed in Japanese Patent Application Laid-Open (kokai) No. 06-199921, and the formed lithiumamide compound is employed as a polymerization initiator.

The polymerization initiator is preferably used in an amount of 0.2 to 20 mmol with respect to 100 g of monomer.

No particular limitation is imposed on the method for producing a conjugated diene (co)polymer through anionic polymerization employing the aforementioned lithium compound serving as a polymerization initiator, and any conventionally known methods may be employed.

In a specific procedure, a conjugated diene monomer or a mixture of a conjugated diene monomer and an aromatic vinyl compound is anionically polymerized in the presence of the lithium compound serving as a polymerization initiator and an optional randomizer in an organic solvent which is inert to the reaction, to thereby produce a conjugated diene (co)polymer of interest having an active end. Examples of the hydrocarbon solvent include aliphatic, alicyclic, and aromatic hydrocarbon compounds.

As compared with the case where a catalyst containing a lanthanum-series rare earth element compound is used, use of the organic lithium compound as a polymerization initiator leads to effective production of a conjugated diene polymer having an active end and a conjugated diene-aromatic vinyl copolymer having an active end.

The hydrocarbon solvent is preferably a C3 to C8 hydrocarbon. Specific examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, methylcyclopentane, and methylcyclohexane. These hydrocarbons may be used singly or in combination of two or more species.

The monomer solution (in solvent) preferably has a monomer concentration of 5 to 50 mass %, more preferably 10 to 30 mass %. When a mixture of a conjugated diene monomer and an aromatic vinyl monomer is allowed to be copolymerized, the aromatic vinyl monomer content of the fed monomer mixture is preferably 55 mass % or less.

The randomizer, which may be used in accordance with needs, is a compound which is capable of controlling a microstructure of a conjugated diene-based polymer (e.g., increasing 1,2-butadiene units in a butadiene-styrene copolymer or 3,4-bonds in an isoprene polymer) or controlling of the monomer unit composition distribution profile of a conjugated diene compound-aromatic vinyl compound copolymer (e.g., randomization in butadiene units and styrene units in a butadiene-styrene copolymer). No particular limitation is imposed on the type of randomizer, and any of compounds known as a randomizer may appropriately employed. Specific examples of the randomizer include ethers and tertiary amines such as dimethoxybenzene, tetrahydrofuran, dimethoxyethane, diethylene glycol dibutyl ether, diethylene glycol dimethyl ether, oxoranylpropane oligomers (particularly 2,2-bis(2-tetrahydrofuryl)propane), triethylamine, pyridine, N-methylmorpholine, N,N,N',N'-tetramethylethylenediamine and 1,2-dipiperidinoethane. Further, potassium salts such as potassium t-amylate and potassium t-butoxide and sodium salts such as sodium t-amylate may also be employed.

These randomizers may be used singly or in combination of two or more species. The randomizer is preferably employed in an amount 0.01 to 1,000 mole equivalents per mole of the lithium compound.

The polymerization reaction is preferably carried out at 0 to 150° C., more preferably 20 to 130° C. The polymerization reaction may be carried out under generated pressure. In a general procedure, the pressure is preferably selected such that the monomer is maintained virtually as a liquid phase. That is, a higher pressure may be employed in accordance with needs, although depending on the individual substances to be polymerized, polymerization solvent, and polymerization temperature. Such pressure may be obtained through an appropriate method such as applying pressure to a reactor by use of gas inert to the polymerization reaction.

In the present invention, the modifying agent mentioned hereinbelow is caused to react with the thus-produced polymer having an active end. The amount of the modifying agent reacted with the active end is preferably a stoichiometric amount or more with respect to the amount of the active end of the polymer.

As a modifying agent for efficiently incorporating a primary amino group into an active end, an alkoxysilane compound including a precursor that can form a primary amino group through hydrolysis is employed.

Examples of the modifying agent include N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, and N,N-bis(trimethylsilyl)aminoethylmethyldiethoxysilane. Among them, N,N-bis(trimethylsilyl)aminopropylmethyldimethoxysilane, N,N-bis(trimethylsilyl)aminopropylmethyldiethoxysilane, and 1-trimethylsilyl-2,2-dimethoxy-1-aza-2-silacyclopentane are preferred.

These modifying agents may be used singly or in combination of two or more species, and may be a partial condensate.

As used herein, the term "partial condensate" means a condensation product in which a part (not entirety) of SiOR moieties are condensed to form Si—O—Si bonds.

During modification reaction, the above modifying agent is preferably employed in an amount of 0.5 to 200 mmol/kg (conjugated diene-based polymer), more preferably 1 to 100 mmol/kg (conjugated diene-based polymer), particularly preferably 2 to 50 mmol/kg (conjugated diene-based polymer). In the unit of the amount, the "conjugated diene-based polymer" means the mass of polymer not containing additives such as an anti-aging agent added during or after the production of the diene polymer. Through controlling the amount of the modifying agent employed so as to fall within the above ranges, high dispersibility of carbon black can be attained, and mechanical characteristics, wear resistance, and heat-buildup-suppressing performance after vulcanization can be enhanced.

No particular limitation is imposed on the method of adding the above modifying agent, and one batch addition, divided addition, continuous addition, etc. may be employed. Among them, one batch addition is preferred.

The modifying agent may be also bonded to any polymer backbone or side chain other than a polymerization initiation end or a polymerization termination end. Preferably, the modifying agent is incorporated into a polymerization initiation end or a polymerization termination end, since the energy loss from the polymer ends is suppressed, to thereby improve heat-buildup-suppression performance.

In the present invention, a specific condensation-accelerating agent is preferably used for accelerating condensation reaction involving an alkoxysilane compound including a precursor that can form a primary amino group through hydrolysis serving as a modifying agent.

The condensation-accelerating agent employed may be a compound having a tertiary amino group or an organic compound containing at least one elements belonging to the Group 3, Group 4, Group 5, Group 12, Group 13, Group 14, and Group 15 of the periodic (long period) table. The condensation-accelerating agent is preferably a metal alkoxide, a carboxylic acid salt, a trialkylsiloxane, or an acetylacetonato complex containing at least one species selected from the group consisting of titanium (Ti), zirconium (Zr), bismuth (Bi), aluminum (Al), and tin (Sn).

The condensation-accelerating agent employed in the condensation reaction may be added before start of condensation reaction. However, the agent is preferably added during or after completion of the modification reaction. When the agent is added before modification reaction, in some cases, the agent is directly reacted with the active end, thereby failing to incorporate a hydrocarbyloxy group into the active end including a precursor that can form a primary amino group through hydrolysis.

The timing of addition of the condensation-accelerating agent is generally 5 minutes to 5 hours after the start of modification reaction, preferably 15 minutes to 1 hour after the start of modification reaction.

Specific examples of the Ti-containing condensation-accelerating agent, Sn-containing condensation-accelerating agent, Al-containing condensation-accelerating agent, Bi-containing condensation-accelerating agent, and Zr-containing condensation-accelerating agent include the same as described in relation to the method of the present invention for producing a modified conjugated diene (co)polymer.

Among these condensation-accelerating agents, titanium compounds are preferred, with titanium alkoxides, titanium carboxylic acid salts, and titanium acetylacetonato complexes are particularly preferred.

The amount (by mole ratio) of the condensation-accelerating agent used in the reaction system is preferably 0.1 to 10 with respect to the total amount of hydrocarbyloxy groups present in the reaction system, particularly preferably 0.5 to 5. Through controlling the amount of the condensation-accelerating agent to fall within the ranges, condensation reaction efficiently proceeds.

In the present invention, the condensation reaction proceeds in the presence of the aforementioned condensation-accelerating agent and steam or water. In the case where steam is used, the solvent-removal treatment is performed through, for example, steam stripping. In this case, the condensation reaction proceeds in the course of steam stripping.

The condensation reaction may be carried out in a dispersion system in which water droplets are dispersed in organic solvent, or in an aqueous solution. The condensation reaction temperature is preferably 20 to 180° C., more preferably 30 to 170° C., particularly preferably 50 to 170° C., particularly preferably 80 to 150° C.

Through controlling the temperature during condensation reaction to fall within the above range, condensation reaction can be effectively completed, whereby aging reaction as elapse of time or other deterioration in quality of the produced modified conjugated diene-based polymer can be prevented.

The condensation reaction is generally about 5 minutes to about 10 hours, preferably about 15 minutes to about 5 hours. Through controlling the condensation reaction time to fall within the above range, condensation reaction can be smoothly completed.

The pressure of the reaction system during condensation reaction is generally 0.01 to 20 MPa, preferably 0.05 to 10 MPa.

No particular limitation is imposed on the mode of condensation reaction in aqueous solution, and a batch-type reactor may be employed. Alternatively, the reaction may be carried out in a continuous manner by means of an apparatus such as a multi-step continuous reactor. In the course of condensation reaction, removal of solvent may be simultaneously performed.

The primary amino group of the modified conjugated diene-based polymer III of the present invention, which group is derived from the modifying agent, is formed through the aforementioned hydrolysis treatment. Specifically, the precursor that can form a primary amino group through hydrolysis is hydrolyzed, to thereby remove the protective group of the protected primary amino group and form a primary amino group. In addition to the aforementioned solvent-removal treatment employing steam (e.g., steam stripping), if required, the precursor that can form a primary amino group through hydrolysis, which group is derived from the modifying agent, may be hydrolyzed (i.e., deprotection of the protected primary amino group) at any step from the steps including condensation to solvent removal to dry the polymer. However, for the aforementioned reason, hydrolysis of the precursor that can form a primary amino group of the modified conjugated diene-based polymer through hydrolysis may be omitted.

If the aforementioned condensation reaction is not performed, the alkoxysilane-modified butadiene-based polymer generates a considerably large amount of VOC. In contrast, the alkoxysilane-modified butadiene-based polymer of the present invention, which is produced via the condensation reaction, reduces the amount of volatile organic compounds (VOCs). Therefore, excellent processability (e.g., prevention of pores in an extrusion step) can be attained, and does not impose a heavy load on the environment.

A generally employed phenolic anti-aging agent (e.g., (N-(1,3-dimethylbutyl)-N'-phenyl-p-phenylenediamine or BHT) may be added at any step after the modification step.

The thus-produced modified conjugated diene-based polymer III preferably has a Mooney viscosity ($ML_{1+4}$, 100° C.) of 10 to 150, more preferably 15 to 100. When the Mooney viscosity is less than 10, rubber characteristics including break resistance are insufficient, whereas when it is in excess of 150, processability is impaired, resulting in difficulty in kneading.

The unvulcanized rubber composition of the present invention containing the modified conjugated diene-based polymer preferably has a Mooney viscosity ($ML_{1+4}$, 130° C.) of 10 to 150, more preferably 15 to 100.

The modified conjugated diene-based polymer III employed in the rubber composition III of the present invention preferably has a ratio (Mw)/(Mn) (Mw: weight average molecular weight, Mn: number average molecular weight, measured through gel permeation chromatography before modification and as reduced to polystyrene) of 1.02 to 2.0, more preferably 1.02 to 1.5.

Through controlling the molecular weight distribution factor (Mw/Mn) of the modified conjugated diene-based polymer III measured before modification to fall within the aforementioned ranges, a rubber composition containing the modified polybutadiene rubber can be easily kneaded without impairing the processability of the rubber composition, thereby sufficiently improving the physical properties of the rubber composition.

As used herein, the term "before modification" refers to the case where the polymer is isolated through a routine method before reaction between the active end of the unmodified conjugated diene-based polymer and a polymerization terminator or a modifying agent. An example of the "routine method" may be removal of the unmodified conjugated diene-based polymer in an amount required for the measurement from the polymerization reaction mixture.

The modified conjugated diene-based polymer III employed in the rubber composition III of the present invention preferably has a number average molecular weight (Mn) before modification of 100,000 to 500,000, more preferably 120,000 to 300,000. Through controlling the number average molecular weight of the modified conjugated diene-based polymer III measured before modification to fall within the aforementioned ranges, excellent break resistance can be attained with suppressing a drop in elastic modulus of the vulcanized product and a rise in hysteresis loss, and excellent kneadability of the rubber composition containing the modified conjugated diene-based polymer can be attained.

The modified conjugated diene-based polymers III may be used singly or in combination of two or more species in the rubber composition III of the present invention. Examples of the rubber ingredient used in combination with the modified conjugated diene-based polymer III include natural rubber and other dienic synthetic rubber. Examples of the dienic rubber include styrene-butadiene copolymer (SBR), polybutadiene (BR), polyisoprene (IR), styrene-isoprene copolymer (SIR), butyl rubber (IIR), halo-butyl rubber, ethylene-propylene-diene terpolymer (EPDM), and mixtures thereof.

In the rubber composition III of the present invention, carbon black having a nitrogen adsorption specific area ($N_2SA$) of 20 to 90 $m^2/g$ is used as a reinforcing filler. Examples of the carbon black filler include GPF, FEF, SRF, and HAF. The nitrogen adsorption specific area of carbon black is preferably 25 to 90 $m^2/g$, particularly preferably 35 to 90 $m^2/g$. The amount of carbon black incorporated into 100 parts by mass of the rubber ingredient is 10 to 100 parts by mass, preferably 30 to 90 parts by mass. Through use of carbon black in such an amount, physical properties of the rubber composition are remarkably improved. Particularly, use of HAF or FEF is preferred, from the viewpoints of break resistance and heat-buildup-suppressing performance (low fuel consumption).

Generally, as the nitrogen adsorption specific area of carbon black decreases, the heat-buildup-suppressing performance (low fuel consumption) of the composition is enhanced. When such carbon black is added to the modified conjugated diene-based polymer that has been produced through incorporating a primary amino group into the active end and adding a condensation-accelerating agent to the modification reaction system in the course of and/or after the modification reaction, excellent characteristics can be attained, as compared with the unmodified conjugated diene-based polymer in consideration of the effect of carbon black. That is, as the nitrogen adsorption specific area of carbon black decreases, the heat-buildup-suppressing performance (low fuel consumption) and break resistance of the rubber composition of the present invention are improved.

The rubber composition III of the present invention is cross-linkable by sulfur, and sulfur is preferably used as a vulcanizing agent. The amount of vulcanizer is preferably 1 to 10 parts by mass as sulfur content (the total amount of sulfur and a sulfur-donor), with respect to 100 parts by mass of the rubber ingredient. When the sulfur content is less than 1 part by mass, cross-linking is insufficient, break resistance is impaired, whereas when the sulfur content in excess of 10 parts by mass, heat resistance is impaired. From the viewpoints, the sulfur content is particularly preferably 2 to 8 parts by mass.

So long as the objects of the present invention are not impeded, the rubber composition III of the present invention may further contain, in accordance with needs, a variety of chemicals usually used in the rubber industry. Examples of the chemicals include vulcanizing agents (other than sulfur), vulcanization-accelerators, process oils, plasticizers, anti-aging agents, scorch preventives, zinc oxide, stearic acid, thermosetting resins, and thermoplastic resins.

No particular limitation is imposed on the vulcanization-accelerator which may be used in the present invention. Examples of the vulcanization-accelerator include thiazoles such as M (2-mercaptobenzothiazole), DM (dibenzothiazyl disulfide), CZ (N-cyclohexyl-2-benzothiazylsulfenamide), and guanidines such as DPG (diphenylguanidine). The amount of vulcanization-accelerator is preferably 0.1 to 6.0 parts by mass with respect to 100 parts by mass of the rubber ingredient, more preferably 0.2 to 4.0 parts by mass.

Examples of the process oil serving as a softening agent which may be used in the rubber composition III of the present invention include paraffin oil, naphthene oil, and aromatic oil. For the purpose of tensile strength and wear resistance, aromatic oil is employed, and for the purpose of hysteresis loss and low-temperature characteristics, naphthene oil or paraffin oil is employed. The amount of process oil is preferably 0 to 50 parts by mass with respect to 100 parts by mass of the rubber ingredient. When the amount is 50 parts by mass or less, impairment in tensile strength of vulcanized rubber and in heat-buildup-suppressing performance (low fuel consumption) can be prevented.

Examples of the anti-aging agent which may be used in the rubber composition III of the present invention include 3C(N-isopropyl-N'-phenyl-p-phenylenediamine, 6C [N-(1, 3-dimethylbutyl)-N'-phenyl-p-phenylenediamine], AW (6-ethoxy-2,2,4-trimethyl-1,2-dihydroquinoline), and diphenylamine-acetone high-temperature condensate. The amount of anti-aging agent is preferably 0.1 to 5.0 parts by mass with respect to 100 parts by mass of the rubber ingredient, more preferably 0.3 to 4.0 parts by mass.

The rubber composition III of the present invention can be formed through kneading the aforementioned ingredients by means of a kneader such as a Banbury mixer, a roller, or an internal mixer. After molding, the product is vulcanized, to thereby provide a side-reinforcing layer 8 and/or a bead filler 7 of a tire shown in FIG. 1.

The tire III of the present invention is produced through a conventional method for producing run-flat tires, employing the rubber composition III of the present invention for forming the side-reinforcing layer 8 and/or a bead filler 7. Specifically, the rubber composition of the present invention containing the aforementioned chemicals, in an unvulcanized state, is worked to form tire members. The composition is applied onto a tire-forming machine through a conventional method, whereby a green tire is formed. The green tire is heated under pressure in by means of a vulcanization apparatus, to thereby produce the tire III.

The thus-produced tire III of the present invention exhibits excellent durability in a run-flat running state and reduced rolling resistance during normal running conditions.

EXAMPLES

The present invention will next be described in more detail by way of examples, which should not be construed as limiting the invention thereto.

The amount of alcohol volatilized from each of the modified conjugated diene (co)polymers produced in the Examples, percent silanol formation of each modified conjugated diene (co)polymer, and dynamic loss tangent (tan δ) of each vulcanized rubber composition were determined through the following methods.

(1) Volatilized Alcohol Amount

A sample is treated with a siloxane-hydrolyzing reagent (0.2 mol/L-toluenesulfonic acid/0.24 mol/L-water) in a solvent (15 mass % n-butanol and 85 mass % toluene). The amount of ethanol is stoichiometrically calculated from [EtOSi] (remaining in an unvulcanized rubber composition) values determined through head space/gas chromatography.

(2) Percent Silanol Formation of Modified Conjugated Diene (Co)Polymer

The amounts of hydrolyzed alkoxysilane groups will be described, taking an ethoxysilyl group as an example. The alkoxysilane content M (%) of a polymer was calculated from a $^1$H-NMR multiplette peak (about 3.6 to about 3.7 ppm) attributed to $SiOCH_2CH_3$ of a modified polymer and a number average molecular weight of a base portion. The relative uncoupled ingredient content $R_{GPC}\%$ was obtained through GPC from the peak area of injected sample and that of base. In order to remove a post-reaction (e.g., coupling) component, the difference between M (%) and $R_{GPC}\%$ was calculated, and the difference was employed as amount of formed silanol (100). The number average molecular weight employed for calculating percent silanol formation was obtained through GPC and calibrated by the Mark-Houwink's equation.

(3) Dynamic Loss Tangent (tan δ)

By means of a viscoelastometer (Rheometrics), tan δ was measured at 60° C., a strain of 5%, and a frequency of 15 Hz. In Table 1, tan δ values of the Examples are given as relative index values with respect to tan δ of Comparative Example 1 as 100 and calculated by the following formula. The smaller the index, the higher the heat-buildup-suppressing performance and the smaller the hysteresis loss.

Dynamic loss tangent (tan δ) index={(tan δ of tested vulcanized rubber composition)/(tan δ of vulcanized rubber composition of Comparative Example 1}×100

The bonded vinyl content, bonded styrene content, weight average molecular weight (Mw), number average molecular weight (Mn), and molecular weight distribution factor (Mw/Mn) of the unmodified conjugated diene (co)polymers and the modified conjugated diene (co)polymers produced in the following Examples were measured through the following methods.

(4) Bonded Vinyl Content (% With Respect to the Entire Diene Portion)

Measured through 270 MHz $^1$H-NMR.

(5) Bonded Styrene Content (Mass % in Polymer)

Measured through 270 MHz $^1$H-NMR.

(6) Mn, Mw, and Mw/Mn

The Mn, Mw, and Mw/Mn were determined by means of a GPC (HLC-8220, product of Tosoh Corporation) with a refractometer as a detector. The values were reduced to single-peak-profile polystyrene as a standard. The column employed is GMHXL (product of Tosoh Corporation), and the eluent employed is tetrahydrofuran.

Synthesis Example 1

Synthesis of Organic Silane Compound a Employed in Modification Reaction Step

In a dried and nitrogen-purged glass pressure vessel (capacity: 300 mL), a 1-mol/L solution of N-(1,3-dimethylbutylidene)-3-(triethoxysilyl)-1-propanamine in cyclohexane was prepared. To the solution, a 2-mol/L solution of methyllithium (MeLi) in diethyl ether was added dropwise in such an amount that the ratio of Li/Si (mole) was adjusted to 2, and the mixture was sufficiently stirred, to thereby prepare modifying agent solution (a) of organic silane compound a; i.e., N-(1,3-dimethylbutylidene)-3-(dimethylethoxysilyl)-1-propanamine.

Note that N-(1,3-dimethylbutylidene)-3-(triethoxysilyl)-1-propanamine employed was "Sila-ace S340" (trademark, Chisso Corporation).

Synthesis Example 2

Synthesis of Organic Silane Compound B Employed in Modification Reaction Step

In a dried and nitrogen-purged glass pressure vessel (capacity: 300 mL), a 1-mol/L solution of 3-dimethylaminopropyltrimethoxysilane in cyclohexane was prepared. To the solution, a 1-mol/L solution of methyllithium (MeLi) in diethyl ether was added dropwise in such an amount that the ratio of Li/Si (mole) was adjusted to 2, and the mixture was sufficiently stirred, to thereby prepare modifying agent solution (b) of organic silane compound b; i.e., 3-dimethylaminopropyl(dimethoxy)methylsilane.

Synthesis Example 3

Synthesis of Organic Silane Compound c Employed in Modification Reaction Step

In a dried and nitrogen-purged glass pressure vessel (capacity: 300 mL), a 1-mol/L solution of N-(3-triethoxysilylpropyl]-4,5-dihydroimidazole in cyclohexane was prepared. To the solution, a 1-mol/L solution of methyllithium (MeLi) in diethyl ether was added dropwise in such an amount that the ratio of Li/Si (mole) was adjusted to 1, and the mixture was sufficiently stirred, to thereby prepare modifying agent solution (c) of organic silane compound c; i.e., N-(3-methyldiethoxysilylpropyl]-4,5-dihydroimidazole.

Synthesis Example 4

Synthesis of Organic Silane Compound d Employed in Modification Reaction Step

In a dried and nitrogen-purged glass pressure vessel (capacity: 300 mL), a 1-mol/L solution of 3-glycidoxypropyltrimethoxysilane in cyclohexane was prepared. To the solution, a 2-mol/L solution of methyllithium (MeLi) in diethyl ether was added dropwise in such an amount that the ratio of Li/Si (mole) was adjusted to 2, and the mixture was sufficiently stirred, to thereby prepare modifying agent solution (d) of organic silane compound d; i.e., (3-glycidoxypropyl)dimethylmethoxysilane.

Synthesis Example 5

Synthesis of Organic Silane Compound e Employed in Modification Reaction Step

Under nitrogen, 3-aminopropylmethyldiethoxysilane (product of Gelest) (36 g) serving as an aminosilane moiety source was added to dichloromethane solvent (400 mL) placed in a glass flask equipped with a stirrer. Subsequently, trimethylsilane chloride (product of Aldrich) (48 mL) serving as a protective moiety source and triethylamine (53 mL) were added to the solution, and the mixture was stirred at room temperature for 17 hours. The solvent of the mixture was removed by means of an evaporator, to thereby recover a reaction mixture. The reaction mixture was distilled under reduced pressure at 5 mm/Hg, to thereby yield 40 g of organic silane compound e; i.e., N,N-bis(trimethylsilyl)aminopropylmethyldiethoxysilane as a 130 to 135° C. fraction.

Synthesis Example 6

Synthesis of Organic Silane Compound f Employed in Modification Reaction Step

The procedure of Synthesis Example 4 was repeated, except that 2-cyanoethyltriethoxysilane was used as a starting material instead of 3-glycidoxypropyltrimethoxysilane, to thereby prepare modifying agent solution (f) of silane compound f; i.e., 2-cyanoethyldimethylethoxysilane.

Production Example 1

Production of Modified Conjugated Diene Copolymer A

<Production of Conjugated Diene Copolymer Having an Active End>

In a dried and nitrogen-purged glass pressure vessel (capacity: 800 mL), solution of 1,3-butadiene in cyclohexane and solution of styrene in cyclohexane were added so that the amounts of 1,3-butadiene and styrene were adjusted to 60 g and 15 g, respectively. Subsequently, 2,2-ditetrahydrofurylpropane (0.70 mmol) and n-butyllithium (BuLi) (0.70 mmol) were sequentially added the vessel, and the mixture was allowed to polymerize on a hot-water bath (50° C.) for 1.5 hours. Percent conversion (polymerization) was found to be about 100%.

<Modification Reaction Step>

Next, the organic silane compound a produced in Synthesis Example 1 was added to the polymerization reaction system in such an amount that the ratio of Li/Si (mole) was adjusted to 1, and modification reaction was performed at 50° C. for 30 minutes.

<Hydrolyzation Step and Subsequent Step>

Thereafter, dilute hydrochloric acid (1.5 mL) was gradually added to the polymerization reaction system, and water in an amount by mole 3 times that lithium (Li) was further added, followed by stirring for 30 minutes. Subsequently, a solution of 2,6-di-t-butyl-p-cresol (BHT) in isopropanol was added to the polymerization reaction system, to thereby terminate the polymerization reaction. Thereafter, a solvent removal treatment (steam stripping) (i.e., partial pressure of the solvent is reduced by feeding steam into the reaction mixture) and a vacuum drying treatment were performed, to thereby yield modified conjugated diene copolymer A. Table 1 shows the styrene content, vinyl bond content in butadiene segment, and weight average molecular weight of the yielded modified conjugated diene copolymer A.

The weight average molecular weight (Mw) was determined by means of a GPC (HLC-8020, product of Tosoh Corporation) with a refractometer as a detector. The value was reduced to single-peak-profile polystyrene as a standard. The column employed was GMHXL (product of Tosoh Corporation), and the eluent employed was tetrahydrofuran.

Production Example 2

Production of Modified Conjugated Diene Copolymer B

The procedure of Production Example 1 was repeated, except that organic silane compound b employed in Synthesis Example 2 was used instead of organic silane compound a employed in Production Example 1, to thereby yield modified conjugated diene copolymer B. The styrene content, vinyl bond content in butadiene segment, and weight average molecular weight of the thus-yielded modified conjugated diene copolymer B are shown in Table 1.

Production Example 3

Production of Modified Conjugated Diene Copolymer C

The procedure of Production Example 1 was repeated, except that organic silane compound c employed in Synthesis Example 3 was used instead of organic silane compound a employed in Production Example 1, to thereby yield modified conjugated diene copolymer C. The styrene content, vinyl bond content in butadiene segment, and weight average molecular weight of the thus-yielded modified conjugated diene copolymer C are shown in Table 1.

Production Example 4

Production of Modified Conjugated Diene Copolymer D

The procedure of Production Example 1 was repeated, except that organic silane compound e employed in Synthesis Example 5 was used instead of organic silane compound a employed in Production Example 1, to thereby yield modified conjugated diene copolymer D. The styrene content, vinyl bond content in butadiene segment, and weight average molecular weight of the thus-yielded modified conjugated diene copolymer D are shown in Table 1.

Production Example 5

Production of Modified Conjugated Diene Polymer E

<Preparation of Catalyst>

To a dried and nitrogen-purged glass bottle (capacity: 100 mL) equipped with a rubber stopper, the following ingredients were sequentially added: a solution of butadiene in cyclohexane (15.2 wt. %) (7.11 g), a solution of neodymium neodecanoate in cyclohexane (0.56 M) (0.59 mL), a solution of methylaluminoxane MAO (PMAO, product of Tosoh Akzo) in toluene (aluminum concentration: 3.23 M) (10.32 mL), and a solution of diisobutylaluminum hydride (product of Kanto Chemical Co., Inc.) in hexane (0.90 M) (7.77 mL). The mixture was aged at room temperature for two minutes, and then a solution of diethylaluminum chloride (product of Kanto Chemical Co., Inc.) in hexane (0.95 M) (1.45 mL) was added thereto. The mixture was aged for 15 minutes, while it was intermittently stirred. The thus-produced catalyst solution was found to have a neodymium concentration of 0.011 M (mol/L).

<Production of Conjugated Diene Polymer Having an Active End>

The inside of a glass bottle (capacity: about 900 mL) equipped with a rubber stopper was dried and nitrogen-purged, and dried and purified solution of butadiene in cyclohexane and dried cyclohexane were added thereto (i.e., 12.5-wt. % solution of butadiene in cyclohexane (400 g)). Subsequently, the above-prepared catalyst solution (2.28 mL, 0.025 mmol as reduced to neodymium), and polymerization was performed on a hot-water bath (50° C.) for 1.0 hour.

<Modification Reaction Step>

Next, the organic silane compound d produced in Synthesis Example 4 was added to the polymerization reaction system in such an amount that the ratio of Nd/Si (mole) was adjusted to 1, and modification reaction was performed at 50° C. for 60 minutes.

<Hydrolyzation Step and Subsequent Step>

Thereafter, 1-mol/L aqueous sodium hydroxide (NaOH) solution was gradually added to the polymerization reaction system. When the pH of the system reached to 10.5, water in an amount by mole 3 times that neodymium was further added, followed by stirring for 30 minutes (hydrolyzation step). Subsequently, a 5% solution (2 mL) of an anti-aging agent (2,2'-methylene-bis(4-ethyl-6-t-butylphenol) (NS-5)) in isopropanol was added to the polymerization reaction system, to thereby terminate the polymerization reaction. The product was re-precipitated in isopropanol containing a trace amount of NS-5, and the precipitate was dried by means of a drum, to thereby yield modified conjugated diene polymer E. The vinyl bond content and weight average molecular weight of the yielded modified conjugated diene polymer E are shown in Table 2.

Comparative Production Example 1

Production of Non-Modified Conjugated Diene Copolymer F

In a dried and nitrogen-purged glass pressure vessel (capacity: 800 mL), solution of 1,3-butadiene in cyclohexane and solution of styrene in cyclohexane were added so that the amounts of 1,3-butadiene and styrene were adjusted to 60 g and 15 g, respectively. Subsequently, 2,2-ditetrahydrofurylpropane (0.70 mmol) and n-butyl-lithium (BuLi) (0.70 mmol) were sequentially added the vessel, and the mixture was allowed to polymerize on a hot-water bath (50° C.) for 1.5 hours. Percent conversion (polymerization) was found to be about 100%. Subsequently, a solution of 2,6-di-tert-butyl-p-cresol (BHT) in isopropanol was added to the polymerization reaction system, to thereby terminate the polymerization reaction, followed by vacuum drying, to thereby yield non-modified conjugated diene copolymer F. Table 1 shows the styrene content, vinyl bond content in butadiene segment, and weight average molecular weight of the yielded non-modified conjugated diene copolymer F.

Comparative Production Example 2

Production of Modified Conjugated Diene Copolymer G

In a dried and nitrogen-purged glass pressure vessel (capacity: 800 mL), solution of 1,3-butadiene in cyclohexane and solution of styrene in cyclohexane were added so that the amounts of 1,3-butadiene and styrene were adjusted to 60 g and 15 g, respectively. Subsequently, 2,2-ditetrahydrofurylpropane (0.70 mmol) and n-butyllithium (BuLi) (0.70 mmol) were sequentially added the vessel, and the mixture was allowed to polymerize on a hot-water bath (50° C.) for 1.5 hours. Percent conversion (polymerization) was found to be about 100%. Next, dimethyldichlorosilane was added to the polymerization reaction system in such an amount that the ratio of Li/Si (mole) was adjusted to 1, and modification reaction was performed at 50° C. for 30 minutes. Subsequently, a solution of 2,6-di-tert-butyl-p-cresol (BHT) in isopropanol was added to the polymerization reaction system, to thereby terminate the polymerization reaction. Thereafter, a solvent removal treatment (steam stripping) (i.e., partial pressure of the solvent is reduced by feeding steam into the reaction mixture) and a vacuum drying treatment were performed, to thereby yield modified conjugated diene copolymer G. Table 1 shows the styrene content, vinyl bond content in butadiene segment, and weight average molecular weight of the yielded modified conjugated diene copolymer G.

Comparative Production Example 3

Production of Modified Conjugated Diene Copolymer H

In a dried and nitrogen-purged glass pressure vessel (capacity: 800 mL), solution of 1,3-butadiene in cyclohexane and solution of styrene in cyclohexane were added so that the amounts of 1,3-butadiene and styrene were adjusted to 60 g and 15 g, respectively. Subsequently, 2,2-ditetrahydrofurylpropane (0.70 mmol) and n-butyllithium (BuLi) (0.70 mmol) were sequentially added the vessel, and the mixture was allowed to polymerize on a hot-water bath (50° C.) for 1.5 hours. Percent conversion (polymerization) was found to be about 100%. Next, organic silane compound a produced in Synthesis Example 1 was added to the polymerization reaction system in such an amount that the ratio of Li/Si (mole) was adjusted to 1, and modification reaction was performed at 50° C. for 30 minutes. Subsequently, a solution of 2,6-di-tert-butyl-p-cresol (BHT) in isopropanol was added to the polymerization reaction system, to thereby terminate the polymerization reaction. Thereafter, a solvent removal treatment (steam stripping) (i.e., partial pressure of the solvent is reduced by feeding steam into the reaction mixture) and a vacuum drying treatment were performed, to thereby yield modified conjugated diene copolymer H. Table 1 shows the styrene content, vinyl bond content in butadiene segment, and weight average molecular weight of the yielded modified conjugated diene copolymer H.

Comparative Production Example 4

Production of Modified Conjugated Diene Copolymer I

The procedure of Comparative Production Example 3 was repeated, except that organic silane compound b employed in Synthesis Example 2 was used instead of organic silane compound a employed in Comparative Production Example 3, to thereby yield modified conjugated diene copolymer I. Table 1 shows the styrene content, vinyl bond content in butadiene segment, and weight average molecular weight of the yielded modified conjugated diene copolymer I.

Comparative Production Example 5

Production of Modified Conjugated Diene Copolymer J

The procedure of Comparative Production Example 3 was repeated, except that organic silane compound c employed in Synthesis Example 3 was used instead of organic silane compound a employed in Comparative Production Example 3, to thereby yield modified conjugated diene copolymer J. Table 1 shows the styrene content, vinyl bond content in butadiene segment, and weight average molecular weight of the yielded modified conjugated diene copolymer J.

Comparative Production Example 6

Production of Modified Conjugated Diene Copolymer K

The procedure of Comparative Production Example 3 was repeated, except that organic silane compound e employed in Synthesis Example 5 was used instead of organic silane compound a employed in Comparative Production Example 3, to thereby yield modified conjugated diene copolymer K. Table 1 shows the styrene content, vinyl bond content in butadiene segment, and weight average molecular weight of the yielded modified conjugated diene copolymer K.

Comparative Production Example 7

Production of Modified Conjugated Diene Copolymer L

The procedure of Comparative Production Example 3 was repeated, except that tetraethoxysilane was used instead of organic silane compound a employed in Comparative Production Example 3, to thereby yield modified conjugated diene copolymer L. Table 1 shows the styrene content, vinyl bond content in butadiene segment, and weight average molecular weight of the yielded modified conjugated diene copolymer L.

Comparative Production Example 8

Production of Modified Conjugated Diene Copolymer M

The procedure of Production Example 5 (production of modified conjugated diene copolymer E) was repeated, to thereby produce a conjugated diene polymer having an active end. The produced polymer was subjected to a modification reaction step. In Comparative Production Example 8, no hydrolyzation step was performed. Instead, modification reaction was performed in the presence of sorbitan oleic acid triester (sugar ester, product of Kanto Chemical Co., Inc.) (1.2 mL) at 50° C. for one hour, and, subsequently, a 5% solution (2 mL) of an anti-ageing agent (2,2'-methylene-bis(4-ethyl-6-t-butylphenol) (NS-5)) in isopropanol was added to the polymerization system, to thereby terminate the reaction. The product was re-precipitated in isopropanol containing a trace amount of NS-5, and the precipitate was dried by means of a drum, to thereby yield modified conjugated diene polymer M. The vinyl bond content and weight average molecular weight of the yielded modified conjugated diene polymer M are shown in Table 2.

Examples 1 to 5 and Comparative Examples 1 to 8

The volatilized alcohol amount and percent silanol formation were measured of each of the modified conjugated diene copolymers A to D and G to L produced in Production Examples 1 to 4 and Comparative Production Examples 2 to 7, and the unmodified conjugated diene copolymer F produced in Comparative Production Example 1. According to the formulations shown in Tables 3 and 4, 22 rubber compositions of Examples 1 to 4 and Comparative Examples 1 to 7 were prepared. Each of the 22 unvulcanized rubber compositions was vulcanized at 165° C. for 15 minutes, and dynamic loss tangent (tan δ) was determined. Table 1 shows the results.

The volatilized alcohol amount of each of the modified conjugated diene polymers E and M produced in Production Example 5 and Comparative Production Example 8 were measured. According to the formulations shown in Tables 3 and 4, two rubber compositions of Example 5 and Comparative Example 8 were prepared. Both unvulcanized rubber compositions were vulcanized at 165° C. for 15 minutes, and dynamic loss tangent (tan δ) was determined. Table 2 shows the results.

TABLE 2

|  | Ex. 5 | Comp. Ex. 8 |
|---|---|---|
| Modified conjugated diene copolymer | E | M |
| Vinyl bond content (%) | 1 | 1 |
| Wt. av. mol. wt. (Mw) | $375 \times 10^3$ | $377 \times 10^3$ |
| Silanol formation (%) | 70 | 1 |
| Alcohol volatilized from modified conjugated diene copolymer | 0.0 | 7.2 |
| tanδ Index of vulcanized rubber composition (Table 3, silica) | 93 | 100 |
| tanδ Index of vulcanized rubber composition (Table 4, carbon black) | 98 | 100 |
| Modifying agent | d | d |
| Hydrolysis | yes | no |

TABLE 1

|  | Examples |  |  |  |
|---|---|---|---|---|
|  | 1 | 2 | 3 | 4 |
| Modified conjugated diene copolymer | A | B | C | D |
| Styrene content/vinyl bond content (St/Vi) (mass %) | 20/54 | 20/54 | 20/56 | 20/56 |
| Wt. av. mol. wt. (Mw) | $184 \times 10^3$ | $185 \times 10^3$ | $183 \times 10^3$ | $186 \times 10^3$ |
| Alcohol volatilized from modified conjugated diene copolymer | 0.0 | 0.0 | 0.0 | 0.0 |
| Silanol formation (%) | 72 | 70 | 68 | 70 |
| tanδ Index of vulcanized rubber composition (Table 3, silica) | 83 | 78 | 80 | 75 |
| tanδ Index of vulcanized rubber composition (Table 4, carbon black) | 90 | 85 | 87 | 80 |
| Modifying agent | a | b | c | e |
| Hydrolysis | yes | yes | yes | yes |

|  | Comparative Examples |  |  |  |  |  |  |
|---|---|---|---|---|---|---|---|
|  | 1 | 2 | 3 | 4 | 5 | 6 | 7 |
| Modified conjugated diene copolymer | F | G | H | I | J | K | L |
| Styrene content/vinyl bond content (St/Vi) (mass %) | 20/55 | 20/54 | 20/56 | 20/55 | 20/55 | 20/56 | 20/53 |
| Wt. av. mol. wt. (Mw) | $188 \times 10^3$ | $283 \times 10^3$ | $187 \times 10^3$ | $190 \times 10^3$ | $186 \times 10^3$ | $190 \times 10^3$ | $322 \times 10^3$ |
| Alcohol volatilized from modified conjugated diene copolymer | 0.0 | 0.0 | 7.2 | 6.9 | 7.5 | 6.7 | 19.4 |
| Silanol formation (%) | — | — | 1 | 2 | 1 | 0 | 2 |
| tanδ Index of vulcanized rubber composition (Table 3, silica) | 100 | 97 | 86 | 83 | 98 | 80 | 98 |
| tanδ Index of vulcanized rubber composition (Table 4, carbon black) | 100 | 102 | 90 | 85 | 99 | 80 | 100 |
| Modifying agent | no | Me$_2$SiCl$_2$ | a | b | c | e | Si(EtO)$_4$ |
| Hydrolysis | no | no | no | no | no | no | no |

TABLE 3

| Silica formulation | | parts by mass |
|---|---|---|
| 1st kneading stage | Modified conjugated diene (co)polymer[1] | 80 |
| | Polyisoprene rubber[2] | 20 |
| | Aromatic oil[3] | 10 |
| | Silica[4] | 55 |
| | Silane coupling agent[5] | 5.5 |
| | Stearic acid | 2.0 |
| | Antiaging agent 6C[6] | 1.0 |
| 2nd kneading stage | Zinc flower | 3.0 |
| | Vulcanization accelerator DPG[7] | 1.0 |
| | Vulcanization accelerator DM[8] | 1.0 |
| | Vulcanization accelerator CZ[9] | 1.0 |
| | Sulfur | 1.5 |

[Note]
[1] Modified conjugated diene (co)polymers: modified conjugated diene copolymers A to D and F to K produced in Production Examples 1 to 4 and Comparative Production Examples 2 to 7; non-modified conjugated diene copolymer F produced in Comparative Production Example 1; and modified conjugated diene copolymers E and M produced in Production Example 5 and Comparative Production Example 8.
[2] Polyisoprene rubber: IR2200, product of JSR
[3] Aromatic oil: Aromax #3 (trademark), product of Fuji Kosan Co., Ltd.
[4] Silica: Nipsil AQ (trademark), products of Tosoh Silica Corporation
[5] Silane coupling agent: bis(3-triethoxysilylpropyl) tetrasulfide, Si69 (trademark), product of Degussa
[6] Anti-aging agent 6C: N-(1,3-dimethylbutyl)-N'-phenyl-p-phenylenediamine, Ozonone 6C (trademark), product of Seiko Chemical CO., Ltd.
[7] Vulcanization accelerator DPG: diphenylguanidine, Nocceler D (trademark), product of Ouchi Sinko Chemical Industrial Co., Ltd.
[8] Vulcanization accelerator DM: dibenzothiazyl disulfide, Nocceler DM (trademark), product of Ouchi Sinko Chemical Industrial Co., Ltd.
[9] Vulcanization accelerator CZ: N-cyclohexyl-2-benzothiazylsulfenamide, Nocceler CZ (trademark), product of Ouchi Sinko Chemical Industrial Co., Ltd.

TABLE 4

| Carbon black formulation | | parts by mass |
|---|---|---|
| 1st kneading stage | Modified conjugated diene (co)polymer[1] | 80 |
| | Polyisoprene rubber[2] | 20 |
| | Aromatic oil[3] | 10 |
| | Carbon black[4] | 50 |
| | Stearic acid | 2.0 |
| | Antiaging agent 6C[6] | 1.0 |
| 2nd kneading stage | Zinc flower | 3.0 |
| | Vulcanization accelerator DPG[7] | 0.5 |
| | Vulcanization accelerator DM[8] | 0.5 |
| | Vulcanization accelerator CZ[9] | 0.5 |
| | Sulfur | 1.5 |

[Note]
[1] to [3], [6] to [9] See Table 3.
[4] Carbon black: Asahi #80 (trademark), ISAF {$N_2SA(m^2/g)$ = 115($m^2/g$)}, product of Asahi Carbon Co., Ltd.

As is clear from Table 1, the modified conjugated diene copolymers of Examples 1 to 4 according to the present invention generated no volatilized alcohol. In contrast, the modified conjugated diene copolymers of Comparative Examples 3 to 7 generated volatilized alcohol in a large amount.

Since the modified conjugated diene copolymer of the present invention has a silanol group and a functional group which promotes reaction between the silanol group and a reinforcing filler, the rubber compositions of Examples 1 to 4 exhibited smaller tan δ indices (i.e., smaller tan δ) and more improved heat-buildup-suppression performance in the case where either silica or carbon black was used as a filler, as compared with the rubber compositions of Comparative Examples 1, 2, and 7. Furthermore, in the case where silica was used as a filler, smaller tan δ indices (i.e., smaller tan δ) and more improved heat-buildup-suppression performance were attained by the rubber compositions of Examples 1, 2, 3, and 4, as compared with the rubber compositions of Comparative Examples 3, 4, 5, and 6, respectively.

Next, each of the 22 rubber compositions was applied to the cap tread (tread on the road side) of a pneumatic tire, and a pneumatic tire for automobiles having a tire size of 215/45ZR17 was produced through a conventional method. The 22 types of pneumatic tires were evaluated in terms of rolling resistance determined in accordance with SAE J2452. The pneumatic tires of Examples 1 to 4 exhibited lower rolling resistance and smaller fuel consumption in the case where silica was used as a filler, as compared with the pneumatic tires of Comparative Examples 1, 2, and 4 to 7. In the case where carbon black was used as a filler, rolling resistance was equal to or less, and fuel consumption was small. The pneumatic tire of Example 1 exhibited lower rolling resistance and smaller fuel consumption in the case where silica was used as a filler, as compared with the pneumatic tire of Comparative Example 3.

As is clear from Table 2, the modified conjugated diene copolymer of Example 5 according to the present invention generated no volatilized alcohol. In contrast, the modified conjugated diene copolymer of Comparative Example 8 generated volatilized alcohol in a large amount.

Since the modified conjugated diene copolymer of the present invention has a silanol group and a functional group which promotes reaction between the silanol group and a reinforcing filler, the rubber composition of Example 5 exhibited smaller tan δ indices (i.e., smaller tan δ) and more improved heat-buildup-suppression performance in the case where either silica or carbon black was used as a filler, as compared with the rubber composition of Comparative Example 8.

Next, each of the two rubber compositions was applied to the cap tread (tread on the road side) of a pneumatic tire, and a pneumatic tire for automobiles having a tire size of 215/45ZR17 was produced through a conventional method. The two types of pneumatic tires were evaluated in terms of rolling resistance determined in accordance with SAE J2452. The pneumatic tire of Example 5 exhibited lower rolling resistance and smaller fuel consumption in the case where either silica or carbon black was used as a filler, as compared with the pneumatic tire of Comparative Example 8.

Example 6

Production of Conjugated Diene Copolymer Having an Active End as an Active Site

In a dried and nitrogen-purged glass pressure vessel (capacity: 800 mL), solution of 1,3-butadiene in cyclohexane and solution of styrene in cyclohexane were added so that the amounts of 1,3-butadiene and styrene were adjusted to 60 g and 15 g, respectively. Subsequently, 2,2-ditetrahydrofurylpropane (0.70 mmol) and n-butyllithium (BuLi) (0.70 mmol) were sequentially added the vessel, and the mixture was allowed to polymerize on a hot-water bath (50° C.) for 1.5 hours. Percent conversion (polymerization) was found to be about 100%.

<Modification Reaction Step>

Next, the organic silane compound b produced in Synthesis Example 2 was added to the polymerization reaction system in such an amount that the ratio of Li/Si (mole) was adjusted to 1, and modification reaction was performed at 50° C. for 30 minutes.

<Hydrolyzation Step>

Thereafter, dilute hydrochloric acid (1.5 mL) was gradually added to the polymerization reaction system, and water in an amount by mole 3 times that lithium (Li) was further added, followed by stirring for 30 minutes (hydrolyzation step).

After completion of hydrolysis, a solution of 2,6-di-tert-butyl-p-cresol (BHT) in isopropanol was added to the polymerization reaction system. Thereafter, a solvent removal treatment (steam stripping) (i.e., partial pressure of the solvent is reduced by feeding steam into the reaction mixture) and a vacuum drying treatment were performed, to thereby yield a modified conjugated diene copolymer.

The volatilized alcohol amount of the modified conjugated diene polymer were measured. According to the formulation shown in Table 5, silica and $Sn(EHA)_2$ serving as a condensation-accelerating agent were added to a rubber ingredient, to thereby prepare a rubber composition. This rubber composition was vulcanized at 165° C. for 15 minutes, and dynamic loss tangent (tan δ) was determined.

The obtained tan δ was compared with that obtained by a similar modified conjugated diene-based polymer produced in the absence of a condensation-accelerating agent, whereby a change in tan δ attributable to the condensation-accelerating agent was determined. Table 6 shows the results.

Example 7

The procedure of Example 6 was repeated, except that $Ti(EHDO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 8

The procedure of Example 6 was repeated, except that $Ti(EHO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 9

The procedure of Example 6 was repeated, except that $ZrO(EHA)_2$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 10

The procedure of Example 6 was repeated, except that silane compound a was used as an organic silane compound and $Ti(EHO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 11

The procedure of Example 6 was repeated, except that silane compound e was used as an organic silane compound and $Ti(EHO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 12

The procedure of Example 6 was repeated, except that silane compound c was used as an organic silane compound and $Ti(EHO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Example 13

The procedure of Example 6 was repeated, except that silane compound f was used as an organic silane compound and $Ti(EHO)_4$ was used as a condensation-accelerating agent in the preparation of the rubber composition, to thereby produce a modified conjugated diene-based polymer and a rubber composition. The same evaluation as employed in Example 6 was performed. Table 6 shows the results.

Comparative Example 9

The procedure of Example 6 was repeated, except that tin tetrachloride was used as a modifying agent, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 10

The procedure of Example 6 was repeated, except that silane compound a was used as an organic silane compound, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 11

The procedure of Example 6 was repeated, except that silane compound b was used as an organic silane compound, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 12

The procedure of Example 6 was repeated, except that silane compound c was used as an organic silane compound, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 13

The procedure of Example 6 was repeated, except that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 14

The procedure of Example 6 was repeated, except that silane compound f was used as an organic silane compound, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 15

The procedure of Example 6 was repeated, except that STO was used as a modifying agent, that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

Comparative Example 16

The procedure of Example 18 was repeated, except that no hydrolyzation step or condensation step was performed, and that no condensation-accelerating agent was added in the preparation of the rubber composition, to thereby produce a modified conjugated diene-based polymer and a rubber composition. The same evaluation as employed in Example 6 was performed. Table 7 shows the results.

TABLE 5

| | | Silica formulation (parts by mass) | |
|---|---|---|---|
| 1st stage | Modified conjugated diene-based or non-modified polymer | | 80 |
| | Polyisoprene rubber | | 20 |
| | Aromatic oil | | 10 |
| | Silica | | 55 |
| | Silane coupling agent | | 5.5 |
| | Condensation-accelerating agent | | 2 |
| | Stearic acid | | 2.0 |
| | Antiaging agent 6C | | 1.0 |
| 2nd stage | Zinc flower | | 3.0 |
| | Vulcanization accelerator | DPG | 1.0 |
| | | DM | 1.0 |
| | | NS | 1.0 |
| | Sulfur | | 1.5 |

[Note]
1) Modified conjugated diene-based or non-modified conjugated diene-based polymer: Polymer undergone modification reaction step or non-modified polymer
2) Polyisoprene rubber: IR2200, product of JSR
3) Aromatic oil: Aromax #3 (trademark), product of Fuji Kosan Co., Ltd.
4) Silica: Nipsil AQ (trademark), products of Tosoh Silica Corporation
5) Silane coupling agent: bis(3-triethoxysilylpropyl) tetrasulfide, Si69 (trademark), product of Degussa
6) Anti-aging agent 6C: N-(1,3-dimethylbutyl)-N'-phenyl-p-phenylenediamine, Ozonone 6C (trademark), product of Seiko Chemical CO., Ltd.
7) Vulcanization accelerator DPG: diphenylguanidine, Nocceler D (trademark), product of Ouchi Sinko Chemical Industrial Co., Ltd.
8) Vulcanization accelerator DM: dibenzothiazyl disulfide, Nocceler DM (trademark), product of Ouchi Sinko Chemical Industrial Co., Ltd.
9) Vulcanization accelerator NS: N-t-butyl-2-benzothiadylsulfenamide

TABLE 6

| | | Condensation-accelerating agent | | tanδ (index) | | | |
|---|---|---|---|---|---|---|---|
| | Modifying agent | Type | Content (parts by mass) | Filler [silica] | Change by condensation-accelerating agent | Amount of volatilized alcohol | Silanol formation (%) |
| Ex. 6 | b | Sn(EHA)$_2$ | 2 | 61 | 17 | 0 | 70 |
| Ex. 7 | b | Ti(EHDO)$_4$ | 2 | 64 | 14 | 0 | 70 |
| Ex. 8 | b | Ti(EHO)$_4$ | 2 | 59 | 19 | 0 | 70 |
| Ex. 9 | b | ZrO(EHA)$_2$ | 2 | 66 | 12 | 0 | 70 |
| Ex. 10 | a | Ti(EHO)$_4$ | 2 | 65 | 18 | 0 | 72 |
| Ex. 11 | e | Ti(EHO)$_4$ | 2 | 59 | 16 | 0 | 70 |
| Ex. 12 | c | Ti(EHO)$_4$ | 2 | 64 | 16 | 0 | 69 |
| Ex. 13 | f | Ti(EHO)$_4$ | 2 | 60 | 18 | 0 | 70 |

[Exs. 6 to 13: condensation-accelerating agent added in the preparation of rubber composition]
[Note]
1) Modifying agent e: Silane compound e produced in Synthesis Example 5, N,N-bis(trimethylsilyl)aminopropyl-methyldiethoxysilane
2) Modifying agent a: Silane compound a produced in Synthesis Example 1, N-(1,3-dimethylbutylidene)-3-(dimethylethoxysilyl)-1-propanamine
3) Modifying agent b: Silane compound b produced in Synthesis Example 2, 3-dimethylaminopropyl(dimethoxy)methylsilane
4) Modifying agent c: Silane compound c produced in Synthesis Example 3, N-(3-methyldiethoxysilylpropyl)-4,5-dihydroimidazole
5) Modifying agent f: Silane compound f produced in Synthesis Example 6, 2-cyanoethyldimethylethoxysilane
6) Modifying agent d: Silane compound d produced in Synthesis Example 4, (3-glycidoxypropyl)dimethylmethoxysilane
7) Sn(EHA)$_2$: Bis(2-ethylhexanoato)tin (product of Gelest)
8) Ti(EHDO)$_4$: Tetrakis(2-ethyl-1,3-hexanediolato)titanium
9) Ti(EHO)$_4$: Tetrakis(2-ethylhexyloxy)titanium
10) ZrO(EHA)$_2$: Bis(2-ethylhexanoato)zirconium oxide In Table 6, each condensation-accelerating agent content is a value with respect to 100 parts by mass of the rubber ingredient contained in each rubber composition.

The tan δ values are indices with respect to the tan δ of the rubber composition of Comparative Example 1 as 100.

As is clear from Table 6, the rubber compositions of Examples 6 to 18 exhibited a volatilized alcohol amount of 0. By virtue of the presence of the condensation-accelerating agent, tan δ index values of these composition were considerably reduced, as compared containing no condensation-accelerating agent.

TABLE 7

|  | Modifying agent | Condensation-accelerating agent Type | Content (parts by mass) | tanδ (index) Filler [silica] | Change by condensation-accelerating agent | Amount of volatilized alcohol |
|---|---|---|---|---|---|---|
| Comp. Ex. 1 | no | — | — | 100 | — | 0 |
| Comp. Ex. 9 | i | — | — | 100 | — | 0 |
| Comp. Ex. 10 | a | — | — | 83 | — | 0 |
| Comp. Ex. 11 | b | — | — | 78 | — | 0 |
| Comp. Ex. 12 | c | — | — | 80 | — | 0 |
| Comp. Ex. 13 | e | — | — | 75 | — | 0 |
| Comp. Ex. 14 | f | — | — | 78 | — | 0 |
| Comp. Ex. 15 | j | — | — | 100 | — | 7.2 |
| Comp. Ex. 16 | d | — | — | 93 | — | 0 |

[Note]
1) The same modifying agents a to f as shown in Table 6.
2) i: Tin tetrachloride (product of Kanto Chemical Co., Inc.)
3) j: Sorbitan trioleic acid ester (STO, product of Kanto Chemical Co., Inc.)

In Table 7, each condensation-accelerating agent content is a value with respect to 100 parts by mass of the rubber ingredient contained in each rubber composition.

As is clear from Table 7, the rubber compositions of Comparative Examples 9 to 16 exhibited larger tan δ values, as compared with the rubber compositions of Examples 6 to 13 shown in Table 6. The modified conjugated diene-based polymer of Example 15 produced with sorbitan trioleic acid ester as a modifying agent generated a large amount of volatilized alcohol.

The 3% dynamic loss tangent (tan δ) of each of the vulcanized rubber compositions produced in the Examples, and the amount of volatile organic compound (VOC) generated from each of the unvulcanized rubber compositions were determined through the following methods.

(1) 3% Dynamic Loss Tangent (tan δ)

By means of a viscoelastometer (Rheometrics), tan δ was measured at 60° C., a strain of 3%, and a frequency of 15 Hz. The tan δ values are relative index values with respect to tan δ of Comparative Example 19, 21, or 22 as 100 and calculated by the following formula. The smaller the index, the higher the heat-buildup-suppressing performance and the smaller the hysteresis loss.

3% Dynamic loss tangent (tan δ) index={(3% tan δ of tested vulcanized rubber composition)/(3% tan δ of vulcanized rubber composition of Comparative Example 19, 21, or 22}×100

(2) Amount of VOC Generated from Unvulcanized Rubber Composition

A sample is treated with a siloxane-hydrolyzing reagent (0.2 mol/L-toluenesulfonic acid/0.24 mol/L-water) in a solvent (15 mass % n-butanol and 85 mass % toluene). The amount of ethanol is stoichiometrically calculated from [EtOSi] (remaining in an unvulcanized rubber composition) values determined through head space/gas chromatography.

Production Example 1

Production of Modified BR-a

To an autoclave (capacity: 5 L) purged with nitrogen, cyclohexane (1.4 kg), 1,3-butadiene (250 g), and 2,2-ditetrahydrofurylpropane (0.0285 mmol) (as cyclohexane solution) were fed under nitrogen. n-Butyllithium (BuLi) (2.85 mmol) was added to the mixture. The resultant mixture was allowed polymerize for 4.5 hours on a hot bath (50° C.) equipped with a stirrer. Percent conversion of 1,3-butadiene was about 100%. Subsequently, the polymer solution was maintained at 60° C., and N,N-bis(trimethylsilyl)aminopropylmethyldiethoxysilane (2.85 mmol) was added to the solution. The mixture was allowed to react for 15 minutes. While this polymer solution was maintained at 60° C., tetrakis(2-ethyl-1,3-hexanediolato)titanium (2.85 mmol) was further added to the solution, and the mixture allowed react for 15 minutes under stirring. Thereafter, the reaction mixture was transferred to a methanol solution containing 2,6-di-tert-butyl-p-cresol (1.3 g), to thereby terminate polymerization. The solvent was removed from the mixture through steam stripping, and the product was dried by means of a roller at 110° C., to thereby produce modified BR-a.

Production Example 2

Production of Modified BR-b

The procedure of Production Example 1 was repeated, except that tin 2-ethylhexanoate (2.85 mmol) was used instead of tetrakis(2-ethyl-1,3-hexanediolato)titanium (2.85 mmol), to thereby produce modified BR-b.

Production Example 3

Production of Modified BR-c

The procedure of Production Example 1 was repeated, except that tris(stearato)aluminum (2.85 mmol) was used instead of tetrakis(2-ethyl-1,3-hexanediolato)titanium (2.85 mmol), to thereby produce modified BR-c.

Production Example 4

Production of Modified BR-d

To an autoclave (capacity: 5 L) purged with nitrogen, cyclohexane (1.4 kg), 1,3-butadiene (250 g), and 2,2-ditetrahydrofurylpropane (0.0285 mmol) (as cyclohexane solution) were fed under nitrogen. n-Butyllithium (BuLi) (2.85 mmol) was added to the mixture. The resultant mixture was allowed polymerize for 4.5 hours on a hot bath (50° C.) equipped with a stirrer. Percent conversion of 1,3-butadiene was about 100%. Subsequently, the polymer solution was maintained at 60° C., and N,N-bis(trimethylsilyl)aminopropylmethyldiethoxysilane (2.85 mmol) was added to the solution. The mixture was allowed to react for 30 minutes. To the polymerization reaction system, 1-mol/L aqueous sodium hydroxide (NaOH) solution was gradually added. When the pH of the reaction system reached 10.5, water was added in an amount by mole tree times the amount by mole of lithium (Li), followed by stirring for 30 minutes. Thereafter, the reaction mixture was transferred to a methanol solution containing 2,6-di-tert-butyl-p-cresol (1.3 g), to thereby terminate polymerization. The solvent was removed from the mixture through steam stripping, and the product was dried by means of a roller at 110° C., to thereby produce modified BR-d.

Production Example 5

Production of Modified BR-e

To an autoclave (capacity: 5 L) purged with nitrogen, cyclohexane (1.4 kg), 1,3-butadiene (250 g), and 2,2-ditetrahydrofurylpropane (0.0285 mmol) (as cyclohexane solution) were fed under nitrogen. n-Butyllithium (BuLi) (2.85 mmol) was added to the mixture. The resultant mixture was allowed polymerize for 4.5 hours on a hot bath (50° C.) equipped with a stirrer. Percent conversion of 1,3-butadiene was about 100%. Subsequently, the polymer solution was maintained at 60° C., and N,N-bis(trimethylsilyl)aminopropylmethyldiethoxysilane (2.85 mmol) was added to the solution. The mixture was allowed to react for 30 minutes. Thereafter, the reaction mixture was transferred to a methanol solution containing 2,6-di-tert-butyl-p-cresol (1.3 g), to thereby terminate polymerization. The solvent was removed from the mixture through steam stripping, and the product was dried by means of a roller at 110° C., to thereby produce modified BR-e.

Production Example 6

Production of Modified BR-f

The procedure of Production Example 5 was repeated, except that 4,4'-bis(diethylamino)benzophenone (2.85 mmol) was used instead of N,N-bis(trimethylsilyl)aminopropylmethyldiethoxysilane (2.85 mmol), to thereby produce modified BR-f.

Production Example 7

Production of Unmodified BR-g

To an autoclave (capacity: 5 L) purged with nitrogen, cyclohexane (1.4 kg), 1,3-butadiene (250 g), and 2,2-ditetrahydrofurylpropane (0.0285 mmol) (as cyclohexane solution) were fed under nitrogen. n-Butyllithium (BuLi) (2.85 mmol) was added to the mixture. The resultant mixture was allowed polymerize for 4.5 hours on a hot bath (50° C.) equipped with a stirrer. Percent conversion of 1,3-butadiene was about 100%. Subsequently, the polymer solution was transferred to a methanol solution containing 2,6-di-tert-butyl-p-cresol (1.3 g), to thereby terminate polymerization. The solvent was removed from the mixture through steam stripping, and the product was dried by means of a roller at 110° C., to thereby produce modified BR-g.

Examples 14 to 18 and Comparative Examples 17 to 22

The 1st-kneading stage ingredients shown in Table 8 were kneaded in accordance with the compositional proportions specified in Table 8. The 2nd-kneading stage ingredients of the compositional proportions specified in Table 8 were added to the 1st stage kneaded product, to thereby produce 11 rubber compositions of Examples 14 to 18 and Comparative Examples 17 to 22. The amount of VOC generated from each of the 11 unvulcanized rubber compositions was measured.

These 11 unvulcanized rubber compositions were vulcanized at 165° C. for 15 minutes, and 3% dynamic loss tangent (tan δ) was measured. Tables 9 to 11 show the results.

TABLE 8

| | | parts by mass |
|---|---|---|
| 1st kneading stage | BR[1] | 50.0 |
| | Natural rubber[2] | 50.0 |
| | Carbon black[3] | 50.0 |
| | Stearic acid | 2.0 |
| | Antiaging agent 6C[4] | 3.5 |
| 2nd kneading stage | Zinc flower | 3.0 |
| | Vulcanization accelerator RD[5] | 1.0 |
| | Vulcanization accelerator CBS[6] | 0.4 |
| | Vulcanization accelerator MBTS[7] | 0.2 |
| | Sulfur | 1.4 |

[Note]
[1] BR: Modified BR-a to BR-f produced in Production Examples 1 to 6 and Unmodified BR-g produced in Production Example 7.
[2] Natural rubber: RSS#3
[3] Carbon black: (i) $N_2SA$: 42 m$^2$/g, Table 9, carbon black FEF, Seast SO (trademark), product of Tokai Carbon Co., Ltd. (ii) $N_2SA$: 118 m$^2$/g, Table 10, carbon black ISAF, Seast 6 (trademark), product of Tokai Carbon Co., Ltd. (iii) $N_2SA$: 97 m$^2$/g, Table 11, carbon black IISAF-HS (N285), Diablack II (trademark), product of Mitsubishi Chemical Co., Ltd.
[4] Anti-aging agent 6C: N-(1,3-dimethylbutyl)-N'-phnyl-p-phenylenediamine, Nocrac 6C (trademark), product of Ouchi Sinko Chemical Industrial Co., Ltd.
[5] Anti-aging agent RD: 2,2,4-trimethyl-1,2-dihydroquinoline polymer, Nocrac 224 (trademark), product of Ouchi Sinko Chemical Industrial Co., Ltd.
[6] Vulcanization accelerator CBS: N-cyclohexyl-2-benzothiazylsulfenamide, Nocceler CZ (trademark), product of Ouchi Sinko Chemical Industrial Co., Ltd.
[7] Vulcanization accelerator MBTS: dibenzothiazyl disulfide, Nocceler DM (trademark), product of Ouchi Sinko Chemical Industrial Co., Ltd.

TABLE 9

| | Examples | | | | Comparative Examples | | |
|---|---|---|---|---|---|---|---|
| | 14 | 15 | 16 | 17 | 17 | 18 | 19 |
| Polymer | modified BR-a | modified BR-b | modified BR-c | modified BR-d | modified BR-e | modified BR-f | un-modified BR-g |
| Modifying agent | e[1] | e[1] | e[1] | e[1] (hydrolyzed) | e[1] (not hydrolyzed) | k[2] | no |
| Condensation-accelerating agent | Ti[3] | Sn[4] | Al[5] | no | no | no | no |
| Wt. av. mol. wt. (Mw) (×10$^3$) before modification | 181 | 179 | 180 | 180 | 178 | 179 | 181 |
| N$_2$SA (m$^2$/g) of carbon black | 42 | 42 | 42 | 42 | 42 | 42 | 42 |
| 3% tanδ (index) | 68 | 70 | 75 | 64 | 80 | 98 | 100 |
| VOC[6] level (mmol/kg) | 1.5 | 1.2 | 1.5 | 0.3 | 6.3 | 0.2 | 0.4 |
| Relative VOC[6] level (%) vs. current level | 24 | 20 | 25 | 5 | 100 | 4 | 4 |

[Note]
[1] e: N,N-bis(trimethylsilyl)aminopropylmethyldiethoxysilane
[2] k: 2,2'-diethylaminobenzophenone
[3] Ti-type: tetrakis(2-ethyl-1,3-hexanediolato)titanium
[4] Sn-type: tin 2-ethylhexanoate
[5] Al-type: tris(stearato)aluminum
[6] VOC: Volatile organic compound

TABLE 10

| | Comparative Examples | |
|---|---|---|
| | 20 | 21 |
| Polymer | modified BR-a | un-modified BR-g |
| Modifying agent | e[1] | no |
| Condensation-accelerating agent | Ti[3] | no |
| Wt. av. mol. wt. (Mw) (×10$^3$) before modification | 181 | 181 |
| N$_2$SA (m$^2$/g) of carbon black | 118 | 118 |
| 3% tanδ (index) | 86 | 100 |
| VOC[6] level (mmol/kg) | 0.9 | 0.2 |
| Relative VOC[6] level (%) vs. current level | 14 | 2 |

[Note]
[1], [3], and [6] The same as the note of Table 9.

TABLE 11

| | Ex. 18 | Comp. Ex. 22 |
|---|---|---|
| Polymer | modified BR-a | un-modified BR-g |
| Modifying agent | e[1] | no |
| Condensation-accelerating agent | Ti[3] | no |
| Wt. av. mol. wt. (Mw) (×10$^3$) before modification | 181 | 181 |
| N$_2$SA (m$^2$/g) of carbon black | 97 | 97 |
| 3% tanδ (index) | 78 | 100 |
| VOC[6] level (mmol/kg) | 1.0 | 0.3 |
| Relative VOC[6] level (%) vs. current level | 12 | 2 |

[Note]
[1], [3], and [6] The same as the note of Table 9.

As shown in Table 9, modified BR-a to BR-d were produced by use of N,N-bis(trimethylsilyl)aminopropylmethyldiethoxysilane as a modifying agent. That is, the unvulcanized rubber compositions of Examples 14 to 17 employing modified BR-a to BR-d were produced by use of N,N-bis(trimethylsilyl)aminopropylmethyldiethoxysilane as a modifying agent. These unvulcanized rubber compositions generated a smaller amount of VOC, as compared with the unvulcanized rubber composition of Comparative Example 17 employing modified BR-e, which was produced in the absence of a condensation-accelerating agent without undergoing hydrolysis treatment.

As is clear from Table 9, the unvulcanized rubber compositions of Examples 14 to 17 employing modified conjugated diene-based polymers produced through the production method of the present invention exhibited low 3% tan δ indices and excellent heat-buildup-suppressing performance, as compared with the rubber compositions of Comparative Examples 17 to 19.

As shown in Tables 9 to 11, the rubber composition of Comparative Example 20 shown in Table 10 containing the same amount of modified BR-a and carbon black having an N$_2$SA higher than 100 m$^2$/g exhibited smaller decrease in 3% tan δ, as compared with the rubber composition employing unmodified BR-g. Thus, when the N$_2$SA of carbon black exceeds 100 m$^2$/g, the effect of modified BR cannot fully be attained.

In the following Examples, physical properties of unmodified or modified conjugated diene-based polymers, carbon black, and unvulcanized rubber compositions, and run-flat durability and rolling resistance of tires produced therefrom were determined through the following methods.

<<Physical Properties of Unmodified or Modified Conjugated Diene-Based Polymers>>

<Determination of Number Average Molecular Weight (Mn), Weight Average Molecular Weight (Mw), and Molecular Weight Distribution Factor (Mw/Mn)>

The Mn, Mw, and Mw/Mn were determined by means of a GPC (HLC-8220, product of Tosoh Corporation) with a refractometer as a detector. The values were reduced to single-peak-profile polystyrene as a standard. The column employed is GMHXL (product of Tosoh Corporation), and the eluent employed is tetrahydrofuran.

<Amount of Volatile Organic Compound (VOC)>

A sample is treated with a siloxane-hydrolyzing reagent (0.2 mol/L-toluenesulfonic acid/0.24 mol/L-water) in a solvent (15 mass % n-butanol and 85 mass % toluene). The amount of ethanol is stoichiometrically calculated from [EtOSi] (remaining in an unvulcanized rubber composition) values determined through head space/gas chromatography.

<Determination of Primary Amino Group Content (mmol/kg)>

Firstly, each polymer was dissolved in toluene, and the polymer was precipitated in a large amount of methanol, whereby an amino-group-containing compound which was not bonded to the polymer was removed from rubber. After drying, the thus-treated polymer was employed as a sample. The total amino group content of the sample was determined through the "total amine value testing method" described in JIS K7237. Then, the secondary amino group content and the tertiary amino group content of the thus-treated sample were determined through the "acetylacetone blocked method." The solvent for dissolving the sample was o-nitrotoluene. Specifically, acetylacetone was added to the sample solution, and amino groups were quantified through potentiometric titration in acetic acid solution by perchloric acid. The primary amino group content (mmol) was obtained by subtracting the secondary amino group content and the tertiary amino group content from the total amino group content. The thus-obtained difference was divided by the mass of the analyzed polymer, to thereby obtain the amount of primary amino groups bonded to the polymer (mmol/kg).

<<Physical Properties of Carbon Black>>

<Nitrogen Adsorption Specific Area>

Measured according to JIS K 6217-2: 2001.

<<Physical Properties of Unvulcanized Rubber Composition>>

<Mooney Viscosity>

Measured according to JIS K 6300-1: 2001, under $ML_{1+4}$ conditions at 130° C.

<<Evaluation of Tires>>

<Run-Flat Durability>

Each sample tire (tire size: 215/45ZR17) was assembled with a rim under atmospheric pressure. The tire was inflated to an inside pressure of 230 kPa, and left to stand in a room at 38° C. for 24 hours. Then, the bulb core was removed, to thereby adjust the inside pressure of the tire to atmospheric pressure. In this state, the tire was subjected to drum running test (load: 4.17 kN (425 kg), speed: 89 km/h, and room temperature: 38° C.). The running distance of the tire until the tire was damaged was measured. The distance was represented by an index with respect to the running distance of the tire of Comparative Example 23 or 27 as 100, according to the following relationship. The greater the index, the more excellent the run-flat durability.

Run-flat durability (index)=(running distance of tested tire/running distance of tire of Comparative Example 23 or 27)°100

<Rolling Resistance>

The rolling resistance of a pneumatic radial tire was determined according to SAE J2452. The resistance value was represented by an index with respect to the rolling resistance of the tire of Comparative Example 23 or 27 as 100, according to the following relationship. The smaller the index, the more excellent (smaller) the rolling resistance.

Rolling resistance (index)=(rolling resistance of tested tire/rolling resistance of tire of Comparative Example 23 or 27)×100

Production Example 8

Production of Polymer A-1

To an autoclave (capacity: 5 L) purged with nitrogen, cyclohexane (1.4 kg), 1,3-butadiene (250 g), and 2,2-ditetrahydrofurylpropane (0.0285 mmol) (as cyclohexane solution) were fed under nitrogen. n-Butyllithium (BuLi) (2.85 mmol) was added to the mixture. The resultant mixture was allowed polymerize for 4.5 hours on a hot bath (50° C.) equipped with a stirrer. Percent conversion of 1,3-butadiene was about 100%. Subsequently, a methanol solution containing 2,6-di-tert-butyl-p-cresol (1.3 g) was added to the polymer solution, to thereby terminate polymerization. The solvent was removed from the mixture through steam stripping, and the product was dried by means of a roller at 110° C., to thereby produce polymer A-1. The molecular weight (Mw) and molecular weight distribution factor (Mw/Mn) of the polymer A-1 before termination of polymerization were determined. Tables 12 and 13 show the results.

Production Example 9

Production of Modified Polymer B-1

The same unmodified polymer was produced through the method for producing the aforementioned polymer A-1. Subsequently, while the activity of the polymerization catalyst was maintained, the polymerization solution was maintained at 50° C., and N,N-bis(trimethylsilyl)aminopropylmethyldiethoxysilane (1.129 mg) containing a precursor that can form a primary amino group through hydrolysis was added to the solution. Modification reaction was performed for 15 minutes. In production Example 9, no condensation-accelerating agent was added. To the polymer solution after completion of the final reaction, 2,6-di-tert-butyl-p-cresol was added. Then, through steam stripping, solvent removal and hydrolysis of the aforementioned precursor that can form a primary amino group through hydrolysis were preformed. The product was dried by means of a roller at 110° C., to thereby produce modified polymer B-1. The molecular weight (Mw) and molecular weight distribution factor (Mw/Mn) of the modified polymer B-1 before termination of polymerization, and the primary amino group content of the modified polymer B-1 were determined. Tables 12 and 13 show the results.

Production Example 10

Production of Modified Polymer C-1

The same unmodified polymer was produced through the method for producing the aforementioned polymer A-1. Subsequently, while the activity of the polymerization catalyst was maintained, the polymerization solution was maintained at 50° C., and N,N-bis(trimethylsilyl)aminopropylmethyldiethoxysilane (1,129 mg) containing a precursor that can form a primary amino group through hydrolysis was added to the solution. Modification reaction was performed for 15 minutes. Thereafter, tetrakis(2-ethyl-1,3-hexanediolato)titanium (8.11 g) serving as a condensation-accelerating agent was added to the modification reaction mixture, followed by stirring for 15 minutes. To the polymer solution after completion of the final reaction, 2,6-di-tert-butyl-p-cresol was added. Then, through steam stripping, solvent removal and hydrolysis of the aforementioned precursor that can form a primary amino group through hydrolysis were preformed. The product was dried by means of a roller at 110° C., to thereby produce modified polymer C-1. The molecular weight (Mw) and molecular weight distribution factor (Mw/Mn) of the modified polymer C-1 before termination of polymerization, and the primary amino group content of the modified polymer C-1 were determined. Tables 12 and 13 show the results.

Production Example 11

Production of Modified Polymer D-1

Into a dried and nitrogen-purged pressure reactor (capacity: 8 L) equipped with a jacket for controlling temperature, cyclohexane (3 kg), butadiene monomer (500 g), and 0.2 mmol ditetrahydrofurylpropane were fed. n-Butyllithium (BuLi) (4 mmol) was added to the reactor, and the mixture was allowed to polymerize at an initiation temperature of 40° C. for one hour. The polymerization was performed under temperature elevation conditions, and the jacket temperature was adjusted so that the final temperature did not exceed 75° C. From initiation to termination, no precipitation was observed in the polymerization system. That is, the polymerization was uniformly clear. Percent conversion of butadiene was about 1000. To the polymerization system, $SnCl_4$ (1 mol/L cyclohexane solution) (0.8 mL) serving as an end-modifying agent was added, and modification reaction was performed for 30 minutes. Then, 5 mass % solution (0.5 mL) of 2,6-di-t-butyl-p-cresol (BHT) in isopropanol was added to the polymerization system, to thereby terminate reaction, and the polymer was dried through a routine method, to thereby yield modified polymer D-1. The molecular weight (Mw) and molecular weight distribution factor (Mw/Mn) of the modified polymer D-1 before termination of polymerization were determined. Tables 12 and 13 show the results.

Production Example 12

Production of Modified Polymer E-1

A solution of the modified polymer C-1 produced in Production Example 10 and a solution of the modified polymer D-1 produced in Production Example 11 were mixed at a ratio (modified polymer C-1/modified polymer D-1) of 7/3, to thereby produce modified polymer E-1. The primary amino group content of the produced modified polymer E-1 was measured. The results are shown in Table 12.

Production Example 13

Synthesis of N,N-bis(trimethylsilyl)aminopropylmethyldiethoxysilane

Under nitrogen, dichloromethane solvent (400 mL) was placed in a glass flask equipped with a stirrer. To the flask, 3-aminopropylmethyldiethoxysilane (product of Gelest) (36 g) for forming an aminosilane moiety was added. Then, trimethylsilane chloride (product of Aldrich) (48 mL) for forming a protection moiety and triethylamine (53 mL) were added to the solution, and the mixture was stirred at room temperature for 17 hours. The reaction mixture was evaporated to remove solvent, and the recovered reaction was distilled under reduced pressure at 5 mm/Hg, to thereby yield 40 g of N,N-bis(trimethylsilyl)aminopropylmethyldiethoxysilane as a 130-135° C. fraction. This N,N-bis(trimethylsilyl)aminopropylmethyldiethoxysilane was used in Production Examples 9 and 10 (Production of modified polymers B-1 and C-1).

Examples 19 to 21 and Comparative Examples 23 to 24

According to the formulation shown in Table 12, five rubber compositions were prepared from unmodified polybutadiene rubber A-1 produced in Production Example 8 and modified polybutadiene rubbers B-1 to E-1 produced in Production Examples 9 to 12. The Mooney viscosity of the five unvulcanized rubber compositions was measured. Table 12 shows the results.

Then, each of the five rubber compositions was formed into a side-reinforcing layer 8 shown in FIG. 1, and a pneumatic run-flat tire (tire size: 215/45ZR17) for passenger cars was produced through a routine method. The produced five tires were evaluated in terms of run-flat durability and rolling resistance. Table 12 shows the results.

TABLE 12

|  |  | Comp. Ex. 23 | Ex. 19 | Ex. 20 | Ex. 21 | Comp. Ex. 24 |
|---|---|---|---|---|---|---|
| Polymers (poybutadiene) of Production Exs.: A-1 to E-1 | | A-1 | B-1 | C-1 | E-1 | D-1 |
| Nitrogen adsorption specific area ($N_2SA$) ($m^2/g$) of carbon black | | 77 | 77 | 77 | 77 | 77 |
| Formulation (parts by mass) | Polymer (polybutadiene)*[1] | 60 | 60 | 60 | 60 | 60 |
| | Natural rubber | 40 | 40 | 40 | 40 | 40 |
| | Carbon black*[2] | 55 | 55 | 55 | 55 | 55 |
| | Softening agent*[3] | 5 | 5 | 5 | 5 | 5 |
| | Zinc flower | 4.5 | 4.5 | 4.5 | 4.5 | 4.5 |
| | Stearic acid | 1 | 1 | 1 | 1 | 1 |
| | Antiaging agent 6C*[4] | 2 | 2 | 2 | 2 | 2 |
| | Vulcanization accelerator CZ*[5] | 2.5 | 2.5 | 2.5 | 2.5 | 2.5 |
| | Sulfur | 3 | 3 | 3 | 3 | 3 |
| Primary amino group content (mmol/kg) | | — | 4.0 | 4.0 | 1.1 | — |
| Mol. wt. distribution (Mw/Mn) of polybutadiene | | 1.1 | 1.2 | 2.0 | | 1.8 |
| Number av. mol. wt. of polybutadiene ($Mn \times 10^{-3}$) | | 150 | 150 | 150 | — | 361 |
| VOC level (mmol/kg) | | 0 | 7.9 | 4.3 | 1.3 | 0 |
| Mooney viscosity of unvulcanized rubber composition (ML1 + 4, 130° C.) | | 63 | 65 | 72 | 70 | 66 |

TABLE 12-continued

|  |  | Comp. Ex. 23 | Ex. 19 | Ex. 20 | Ex. 21 | Comp. Ex. 24 |
|---|---|---|---|---|---|---|
| Application of rubber composition to tire | Side-reinforcing layer | yes | yes | yes | yes | yes |
|  | Bead filler | no | no | no | no | no |
| Evaluation of tire | Run-flat durability (index) | 100 | 103 | 120 | 117 | 102 |
|  | Rolling resistance (index) | 100 | 98 | 92 | 94 | 99.5 |

[Note]
*[1]Polymer (polybutadiene): Polybutadiene rubber A produced in Production Example 8 and modified polybutadiene rubbers B-1 to E-1 produced in Production Examples 9 to 12.
*[2]Carbon black: Asahi #70 (trademark), HAF {$N_2SA(m^2/g)$ = 77($m^2/g$)}, product of Asahi Carbon Co., Ltd.
*[3]Softening agent: aromatic oil, Aromax #3 (trademark), product of Fuji Kosan Co., Ltd.
*[4]Anti-aging agent 6C: N-(1,3-dimethylbutyl)-N'-phenyl-p-phenylenediamine, Ozonone 6C (trademark), product of Seiko Chemical CO., Ltd.
*[5]Vulcanization accelerator CZ: N-cyclohexyl-2-benzothiazylsulfenamide, Nocceler CZ (trademark), product of Ouchi Sinko Chemical Industrial Co., Ltd.

Examples 22 to 27 and Comparative Examples 25 to 33

According to the formulation shown in Table 13, 15 rubber compositions were prepared from unmodified polybutadiene rubber A-1 produced in Production Example 8 and modified polybutadiene rubbers B-1 to E-1 produced in Production Examples 9 to 12. The Mooney viscosity of the 15 unvulcanized rubber compositions was measured. Table 13 shows the results.

Then, each of the 15 rubber compositions was formed into a side-reinforcing layer 8 and a bead filler 7 shown in FIG. 1, and an automobile pneumatic run-flat tire (tire size: 215/45ZR17) was produced through a routine method. The produced 15 tires were evaluated in terms of run-flat durability and rolling resistance. Table 13 shows the results.

TABLE 13

|  |  | Comp. Ex. 25 | Ex. 22 | Ex. 23 | Ex. 24 | Comp. Ex. 26 |
|---|---|---|---|---|---|---|
| Polymers (poybutadiene) of Production Exs.: A to E |  | A-1 | B-1 | C-1 | E-1 | D-1 |
| Nitrogen adsorption specific area ($N_2SA$) ($m^2/g$) of carbon black |  | 40 | 40 | 40 | 40 | 40 |
| Formulation (parts by mass) | Polymer (polybutadiene)*[1] | 75 | 75 | 75 | 75 | 75 |
|  | Natural rubber | 25 | 25 | 25 | 25 | 25 |
|  | Carbon black*[2-4] | 65 | 65 | 65 | 65 | 65 |
|  | Softening agent*[5] | 5 | 5 | 5 | 5 | 5 |
|  | Zinc flower | 4.5 | 4.5 | 4.5 | 4.5 | 4.5 |
|  | Stearic acid | 1 | 1 | 1 | 1 | 1 |
|  | Antiaging agent 6C*[6] | 2 | 2 | 2 | 2 | 2 |
|  | Vulcanization accelerator CZ*[7] | 2.5 | 2.5 | 2.5 | 2.5 | 2.5 |
|  | Sulfur | 5 | 5 | 5 | 5 | 5 |
| Primary amino group content (mmol/kg) |  | — | 4.0 | 4.0 | 1.1 | — |
| Mol. wt. distribution (Mw/Mn) of polybutadiene |  | 1.1 | 1.2 | 2.0 | — | 1.8 |
| Number av. mol. wt. of polybutadiene (Mn × $10^{-3}$) |  | 150 | 150 | 150 | — | 361 |
| Mooney viscosity of unvulcanized rubber composition (ML1 + 4, 130° C.) |  | 55 | 58 | 71 | 68 | 62 |
| Application of rubber composition to tire | Side-reinforcing layer | yes | yes | yes | yes | yes |
|  | Bead filler | yes | yes | yes | yes | yes |
| Evaluation of tire | Run-flat durability (index) | 120 | 137 | 152 | 145 | 128 |
|  | Rolling resistance (index) | 94 | 86 | 68 | 75 | 88 |

|  |  | Comp. Ex. 27 | Ex. 25 | Ex. 26 | Ex. 27 | Comp. Ex. 28 |
|---|---|---|---|---|---|---|
| Polymers (poybutadiene) of Production Exs.: A to E |  | A-1 | B-1 | C-1 | E-1 | D-1 |
| Nitrogen adsorption specific area ($N_2SA$) ($m^2/g$) of carbon black |  | 77 | 77 | 77 | 77 | 77 |
| Formulation (parts by mass) | Polymer (polybutadiene)*[1] | 75 | 75 | 75 | 75 | 75 |
|  | Natural rubber | 25 | 25 | 25 | 25 | 25 |
|  | Carbon black*[2-4] | 65 | 65 | 65 | 65 | 65 |
|  | Softening agent*[5] | 5 | 5 | 5 | 5 | 5 |
|  | Zinc flower | 4.5 | 4.5 | 4.5 | 4.5 | 4.5 |
|  | Stearic acid | 1 | 1 | 1 | 1 | 1 |
|  | Antiaging agent 6C*[6] | 2 | 2 | 2 | 2 | 2 |
|  | Vulcanization accelerator CZ*[7] | 2.5 | 2.5 | 2.5 | 2.5 | 2.5 |
|  | Sulfur | 5 | 5 | 5 | 5 | 5 |
| Primary amino group content (mmol/kg) |  | — | 4.0 | 4.0 | 1.1 | — |
| Mol. wt. distribution (Mw/Mn) of polybutadiene |  | 1.1 | 1.2 | 2.0 | — | 1.8 |

TABLE 13-continued

|  |  |  |  |  |  |  |
|---|---|---|---|---|---|---|
| Number av. mol. wt. of polybutadiene (Mn × $10^{-3}$) | | 150 | 150 | 150 | — | 361 |
| Mooney viscosity of unvulcanized rubber composition (ML1 + 4, 130° C.) | | 67 | 70 | 83 | 79 | 69 |
| Application of rubber composition to tire | Side-reinforcing layer | yes | yes | yes | yes | yes |
| | Bead filler | yes | yes | yes | yes | yes |
| Evaluation of tire | Run-flat durability (index) | 100 | 111 | 123 | 115 | 106 |
| | Rolleing resistance (index) | 100 | 97 | 92 | 93 | 97 |

|  |  | Comp. Ex. 29 | Comp. Ex. 30 | Comp. Ex. 31 | Comp. Ex. 32 | Comp. Ex. 33 |
|---|---|---|---|---|---|---|
| Polymers (poybutadiene) of Production Exs.: A to E | | A-1 | B-1 | C-1 | E-1 | D-1 |
| Nitrogen adsorption specific area ($N_2SA$) ($m^2/g$) of carbon black | | 115 | 115 | 115 | 115 | 115 |
| Formulation (parts by mass) | Polymer (polybutadiene)*[1] | 75 | 75 | 75 | 75 | 75 |
| | Natural rubber | 25 | 25 | 25 | 25 | 25 |
| | Carbon black*[2-4] | 65 | 65 | 65 | 65 | 65 |
| | Softening agent*[5] | 5 | 5 | 5 | 5 | 5 |
| | Zinc flower | 4.5 | 4.5 | 4.5 | 4.5 | 4.5 |
| | Stearic acid | 1 | 1 | 1 | 1 | 1 |
| | Antiaging agent 6C*[6] | 2 | 2 | 2 | 2 | 2 |
| | Vulcanization accelerator CZ*[7] | 2.5 | 2.5 | 2.5 | 2.5 | 2.5 |
| | Sulfur | 5 | 5 | 5 | 5 | 5 |
| Primary amino group content (mmol/kg) | | — | 4.0 | 4.0 | 1.1 | — |
| Mol. wt. distribution (Mw/Mn) of polybutadiene | | 1.1 | 1.2 | 2.0 | — | 1.8 |
| Number av. mol. wt. of polybutadiene (Mn × $10^{-3}$) | | 150 | 150 | 150 | — | 361 |
| Mooney viscosity of unvulcanized rubber composition (ML1 + 4, 130° C.) | | 76 | 77 | 90 | 88 | 82 |
| Application of rubber composition to tire | Side-reinforcing layer | yes | yes | yes | yes | yes |
| | Bead filler | yes | yes | yes | yes | yes |
| Evaluation of tire | Run-flat durability (index) | 82 | 84 | 85 | 84 | 83 |
| | Rolleing resistance (index) | 135 | 130 | 128 | 133 | 132 |

[Note]
*[1]Polymer (polybutadiene): Polybutadiene rubber A-1 produced in Production Example 8 and modified polybutadiene rubbers B-1 to E-1 produced in Production Examples 9 to 12.
*[2]Carbon black: Asahi #60 (trademark), FEF {$N_2SA(m^2/g) = 40(m^2/g)$}, product of Asahi Carbon Co., Ltd.
*[3]Carbon black: Asahi #70 (trademark), HAF {$N_2SA(m^2/g) = 77(m^2/g)$}, product of Asahi Carbon Co., Ltd.
*[4]Carbon black: Asahi #80 (trademark), ISFA {$N_2SA(m^2/g) = 115(m^2/g)$}, product of Asahi Carbon Co., Ltd.
*[5]Softening agent: aromatic oil, Aromax #3 (trademark), product of Fuji Kosan Co., Ltd.
*[6]Anti-aging agent 6C: N-(1,3-dimethylbutyl)-N'-phenyl-p-phenylenediamine, Ozonone 6C (trademark), product of Seiko Chemical CO., Ltd.
*[7]Vulcanization accelerator CZ: N-cyclohexyl-2-benzothiazylsulfenamide, Nocceler CZ (trademark), product of Ouchi Sinko Chemical Industrial Co., Ltd.

As is clear from Tables 12 and 13, the tires of Examples 19 to 27 falling within the scope of the present invention exhibited remarkably enhanced run-flat durability and rolling resistance, as compared with the tires of Comparative Examples 23 to 33. Notably, the tires of the present invention employed a conjugated diene-based polymer that had been produced through incorporating a primary amino group into the active end; optionally performing hydrolysis after modification; adding a condensation-accelerating agent to the modification reaction system in the course of and/or after the modification reaction; and performing further hydrolysis, and adding carbon black having small nitrogen adsorption specific area thereto.

As shown in Table 12, the modified polymer C-1 (see Example 20) produced in produced in Production Example 10 generated smaller amount of VOC, as compared with the modified polymer B-1 (see Example 19) produced in produced in Production Example 9. Thus, the modified polymer C-1 has excellent operability and does not impose a heavy load to the environment.

When Example 19, 22, and 25 are compared with Example 20, 23, and 26, respectively, the modified polymer B-1 exhibited excellent tire evaluation scores, as compared with the modified polymer C-1. Notably, the modified polymer C-1 was produced through a method including, after modification reaction, adding a condensation-accelerating agent and performing hydrolysis (steam stripping), whereas the modified polymer B-1 was produced through a method including, after modification reaction, adding no condensation-accelerating agent and performing hydrolysis (steam stripping).

INDUSTRIAL APPLICABILITY

The modified conjugated diene (co)polymer produced through the production method of the present invention is preferably used as a variety of members such as treads (e.g., cap treads), sidewalls, and stiffeners (bead fillers) of pneumatic tires for passenger cars, light cars, light trucks, truck/buses, and off-the-road uses. The modified conjugated diene (co)polymer is also preferably used as members of various industrial rubber products such as a belt-conveyer and rubber hoses.

The rubber composition of the present invention generates a reduced amount of volatile organic compound (VOC) during preparation thereof (e.g., kneading), and exhibits excellent heat-buildup-suppressing performance (low fuel consumption). Thus, the composition is preferably used as tire members such as sidewalls, side-reinforcing layers, and bead fillers.

The tire of the present invention formed from a specific modified conjugated diene-based polymer and specific carbon black is preferably used as a tire (particularly a pneumatic run-flat tire) for passenger cars, light cars, light trucks, and truck/buses.

The invention claimed is:

1. A modified conjugated diene (co)polymer having, at a molecular end of the conjugated diene (co)polymer, a silanol group, and a functional group being within a distance from the silanol group equivalent to 1 to 20 carbon atoms, the functional group accelerating reaction between the silanol group and a reinforcing filler,
wherein the modified conjugated diene (co)polymer is produced by a method comprising:
a modification reaction step including causing a conjugated diene (co)polymer having an active site to react with an organic silane compound at the active site, the organic silane compound having a characteristic group for forming a silanol group through hydrolysis and, within a distance from the characteristic group equivalent to 1 to 20 carbon atoms, (i) a functional group which binds the organic silane compound to the conjugated diene (co)polymer via addition to or substitution at the active site and which promotes reaction between the silanol group and the reinforcing filler after the addition or substitution reaction, or (ii) a functional group which promotes reaction between the silanol group and the reinforcing filler, and
a hydrolyzation step performed after the modification reaction step,
wherein the characteristic group for forming the silanol group through hydrolysis is an alkoxysilane group, and 10% or more in number of the alkoxysilane groups form silanol groups through hydrolysis.

2. A modified conjugated diene (co)polymer represented by formula (3):

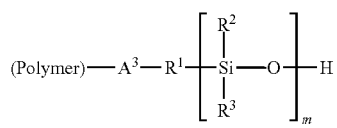

(wherein $R^1$ represents a single bond or a C1 to C20 divalent hydrocarbon group; each of $R^2$ and $R^3$ represents a hydrogen atom or a C1 to C20 monovalent hydrocarbon group; $A^3$ represents a functional group which promotes reaction between a silanol group and a reinforcing filler; and m is an integer of 1 to 10) or a modified conjugated diene (co)polymer represented by formula (4):

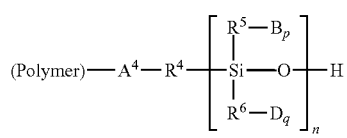

(wherein $R^4$ represents a single bond or a C1 to C20 hydrocarbon group; each of $R^5$ and $R^6$ represents a single bond, a hydrogen atom, or a C1 to C20 hydrocarbon group; $A^4$ represents a single bond, a C1 to C20 hydrocarbon group, or a functional group which promotes reaction between a silanol group and a reinforcing filler; each of B and D represents a group containing at least one functional group which promotes reaction between the silanol group and the reinforcing filler; each of p and q is an integer of 0 to 5; (p+q) is 1 or more; and n is an integer of 1 to 10),
wherein the modified conjugated diene (co)polymer is obtained by hydrolysis performed on a (co)polymer having alkoxysilane groups, wherein 68% or more in number of the alkoxysilane groups form silanol groups through hydrolysis.

3. A modified conjugated diene (co)polymer according to claim 2, wherein each of the functional groups $A^3$ and $A^4$ in formula (3) or (4) which promote reaction between the silanol group and the reinforcing filler is at least one divalent functional group selected from among divalent functional groups having at least one member selected from among a (thio)ether bond, a (thio)urethane bond, an imino bond, and an amido bond; and divalent functional groups derived from a functional group selected from among a nitrile group, a pyridyl group, an N-alkylpyrrolidonyl group, an N-alkylimidazolyl group, an N-alkylpyrazolyl group, a (thio)ketone group, a (thio)aldehyde group, an isocyanuric acid triester residue, a C1 to C20 (thio)carboxylic acid hydrocarbyl ester residue, a C1 to C20 (thio)carboxylic acid metal salt residue, a C1 to C20 carboxylic anhydride residue, a C1 to C20 carboxyl halide residue, and a carbonic acid dihydrocarbyl ester residue.

4. A modified conjugated diene (co)polymer according to claim 2 or 3, wherein each of B and D in formula (4) containing at least one functional group which promotes reaction between the silanol group and the reinforcing filler is at least one functional group selected from among a primary amino group, a secondary amino group, a protected primary or secondary amino group, a tertiary amino group, a cyclic amino group, an oxazolyl group, an imidazolyl group, an aziridinyl group, a (thio)ketone group, a (thio)aldehyde group, an amido group, a (thio)epoxy group, a (thio)isocyanato group, a nitrile group, a pyridyl group, an N-alkylpyrrolidonyl group, an N-alkylimidazolyl group, an N-alkylpyrazolyl group, an imino group, an amido group, a ketimine group, an imine residue, an isocyanuric acid triester residue, a C1 to C20 (thio)carboxylic acid hydrocarbyl ester residue, a C1 to C20 (thio)carboxylic acid metallic salt residue, a C1 to C20 carboxylic anhydride residue, a C1 to C20 carboxyl halide residue, a carbonic acid dihydrocarbyl ester residue, and functional groups represented by formula -E-F-G (wherein E represents an imino group, a divalent imine residue, a divalent pyridine residue, or a divalent amide residue; F represents a C1 to C20 alkylene group, a phenylene group, or a C8 to C20 aralkylene group; and G represents a primary amino group, a secondary amino group, a protected primary or secondary amino group, a tertiary amino group, a cyclic amino group, an oxazolyl group, an imidazolyl group, an aziridinyl group, a ketimine group, a nitrile group, an amido group, a pyridine group, or a (thio)isocyanato group).

5. A rubber composition comprising a modified conjugated diene (co)polymer as recited in claim 1.

6. A rubber composition according to claim 5, which further contains a condensation-accelerating agent.

7. A pneumatic tire formed from a rubber composition as recited in claim 5.

8. A rubber composition characterized by comprising 100 parts by mass of a rubber ingredient containing (A) a modified conjugated diene (co)polymer as recited in claim 1 or 2, and 10 to 100 parts by mass of (B) carbon black having a nitrogen adsorption specific surface area (N$_2$SA) of 20 to 100 m$^2$/g.

9. A rubber composition according to claim 8, wherein the modified conjugated diene (co)polymer (A) is a modified conjugated diene-based polymer (a-1) having a structure represented by formula (11):

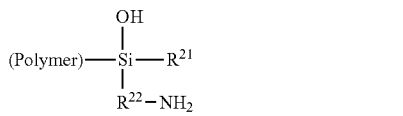
(11)

(wherein R$^{21}$ represents a C1 to C20 hydrocarbyl group and R$^{22}$ represents a C1 to C12 alkylene group) and/or a modified conjugated diene-based polymer (a-2) having a structure represented by formula (12):

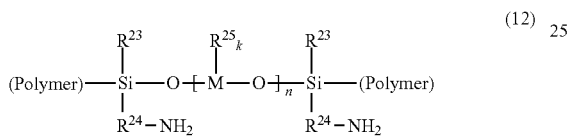
(12)

(wherein R$^{23}$ represents a C1 to C20 hydrocarbyl group; R$^{24}$ represents a C1 to C12 alkylene group; R$^{25}$ represents a C1 to C20 hydrocarbyl group, a C2 to C20 hydrocarbylcarboxyl group, a —OH group, or a C5 to C20 1,3-dicarbonyl-containing group; when a plurality of R$^{25}$ are present, they may be identical to or different from one another; M represents Ti, Sn, Al, Si, or Bi; k is (valence of M)–2; and n is 1).

10. A rubber composition according to claim 8, wherein the modified conjugated diene (co)polymer (A) is a modified conjugated diene-based polymer (a-1) having an end structure represented by formula (11):

(11)

(wherein R$^{21}$ represents a C1 to C20 hydrocarbyl group and R$^{22}$ represents a C1 to C12 alkylene group), which is produced by causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end for modification and, subsequently performing hydrolysis reaction and deprotection reaction.

11. A rubber composition according to claim 8, wherein the modified conjugated diene (co)polymer (A) is a modified conjugated diene-based polymer (a-2) represented by formula (12):

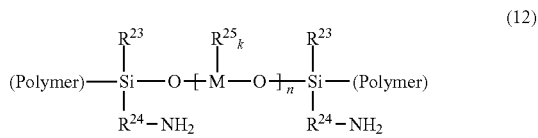
(12)

(wherein R$^{23}$ represents a C1 to C20 hydrocarbyl group; R$^{24}$ represents a C1 to C12 alkylene group; R$^{25}$ represents a C1 to C20 hydrocarbyl group, a C2 to C20 hydrocarbylcarboxyl group, a —OH group, or a C5 to C20 1,3-dicarbonyl-containing group; when a plurality of R$^{25}$ are present, they may be identical to or different from one another; M represents Ti, Sn, Al, Si, or Bi; k is (valence of M)–2; and n is 1), which is produced by performing (a) a modification step of causing a compound containing a bi-functional silicon atom to which one hydrocarbyloxy group and one reactive group are directly bonded and to which one protected primary amino group is bonded via an alkylene group, to react with an active end of a conjugate diene-based polymer having the active end; (b) a condensation reaction step of performing condensation reaction involving the compound containing a bi-functional silicon atom in the presence of at least one condensation-accelerating agent selected from among a titanium-containing agent, a tin-containing agent, an aluminum-containing agent, a silicon-containing agent, a zirconium-containing agent, and a bismuth-containing agent; and (c) a step of performing hydrolysis reaction and deprotection reaction.

12. A rubber composition according to claim 9, wherein the rubber ingredient (A) contains the modified conjugated diene-based polymer (a-1) and/or modified conjugated diene-based polymer (a-2) in an amount of 10 mass % or more.

13. A tire formed from a rubber composition as recited in claim 12.

14. A tire characterized by having a bead core, a carcass layer, a tread rubber layer, an inner liner, a side-reinforcing layer, and a bead filler, wherein the side-reinforcing layer and/or the bead filler is formed from a rubber composition comprising 100 parts by mass of a rubber ingredient containing 10 mass % or more of a modified conjugated diene (co)polymer as recited in claim 1 or 2, and 10 to 100 parts by mass of carbon black having a nitrogen adsorption specific surface area of 20 to 90 m$^2$/g.

15. A tire according to claim 14, wherein the modified conjugated diene (co)polymer is produced through modification reaction between an end of a conjugated diene-based polymer and a primary amino group or an alkoxysilane compound containing a precursor that can form a primary amino group through hydrolysis, to thereby incorporate into the end the primary amino group or the precursor that can form a primary amino group through hydrolysis; and adding a condensation-accelerating agent to the modification reaction system in the course of and/or after the modification reaction.

16. A tire according to claim 15, wherein the alkoxysilane compound including a precursor that can form a primary amino group through hydrolysis is N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)

aminoethyltrimethoxysilane, N,N-bis(trimethylsilyl)aminoethyltriethoxysilane, N,N-bis(trimethylsilyl)aminoethylmethyldimethoxysilane, or N,N-bis(trimethylsilyl)aminoethylmethyldiethoxysilane.

17. A modified conjugated diene (co)polymer according to claim 1, wherein 68% or more in number of the alkoxysilane groups form silanol groups through hydrolysis.

* * * * *